(12) United States Patent
Issachar

(10) Patent No.: US 6,218,949 B1
(45) Date of Patent: Apr. 17, 2001

(54) LIQUID LEVEL MONITORING AND CONTROL APPARATUS

(76) Inventor: David Issachar, 14 Wilkomitch St., Rehovot 76448 (IL)

(*) Notice: Subject to any disclaimer, the term of this patent is extended or adjusted under 35 U.S.C. 154(b) by 0 days.

(21) Appl. No.: 09/327,354

(22) Filed: Jun. 8, 1999

Related U.S. Application Data

(63) Continuation-in-part of application No. 08/991,882, filed on Dec. 16, 1997, now Pat. No. 6,028,521.

(51) Int. Cl.[7] .................................................. G08B 21/00
(52) U.S. Cl. .................... 340/624; 340/623; 340/618; 340/603; 340/619; 340/244
(58) Field of Search .................................. 340/624, 623, 340/618, 603, 619, 244

(56) References Cited

U.S. PATENT DOCUMENTS

| | | | |
|---|---|---|---|
| 2,726,296 | 12/1955 | Hanson et al. | |
| 3,696,362 | 10/1972 | Sieron | 340/244 |
| 3,702,910 | 11/1972 | Akeley | 200/84 R |
| 3,703,246 | 11/1972 | Horak | 222/17 |
| 3,823,328 | 7/1974 | Barton et al. | 307/118 |
| 3,848,563 | 11/1974 | Brown | 116/118 R |
| 3,849,771 | 11/1974 | Applin | 340/245 |
| 3,944,845 | 3/1976 | Luteran | 307/118 |
| 3,978,299 | 8/1976 | Takai | 200/84 C |
| 3,997,744 | 12/1976 | Higo | 200/84 C |
| 4,035,789 | 7/1977 | Akita et al. | 340/244 R |
| 4,066,858 | 1/1978 | Piper et al. | 200/84 R |
| 4,354,180 | 10/1982 | Harding | 340/619 |
| 4,395,605 | 7/1983 | Weston | 200/84 C |
| 4,458,118 | 7/1984 | Tsubouchi | 200/84 C |
| 4,459,584 | 7/1984 | Clarkson | 340/624 |
| 4,499,348 | 2/1985 | Gismervik et al. | 200/84 C |
| 4,609,796 | 9/1986 | Bergsma | 200/84 C |
| 4,673,925 | 6/1987 | Whitman | 340/603 |
| 4,748,299 | 5/1988 | Custer | 200/84 C |
| 4,748,300 | 5/1988 | Anderson | 200/84 C |
| 4,771,272 | 9/1988 | Barnes | 340/624 |
| 4,771,804 | * 9/1988 | Morales | 137/412 |
| 4,804,944 | * 2/1989 | Golladay et al. | 340/624 |
| 4,848,149 | 7/1989 | Fiorentino et al. | 73/293 |
| 4,865,073 | 9/1989 | Kocher | 137/412 |

(List continued on next page.)

FOREIGN PATENT DOCUMENTS

| | | |
|---|---|---|
| 41 28 178 A1 | 2/1993 | (DE) . |
| 0 764 835 A2 | 3/1997 | (EP) . |
| 2 003 723 | 3/1979 | (GB) . |

Primary Examiner—Daniel J. Wu
Assistant Examiner—Tai T. Nguyen
(74) Attorney, Agent, or Firm—Nath & Associates PLLC; Gary M. Nath; Harold L. Novick

(57) ABSTRACT

A liquid level monitoring and control apparatus is described, which generates an alarm signal or a safety signal, discontinuing an operation such as heating, when the liquid level in a controlled vessel has reached a predetermined level. Several signals, similar or different, may be generated at different liquid levels. The operation of the. apparatus may be based on various physical properties, such as optical, magnetic, acoustic, electrical and conductivity properties. The apparatus comprises a floating actuator, the level of which is determined by the level of the liquid in the vessel, a sensing assembly comprising at least a member which can be actuated by the actuator, means for guiding the vertical displacement of the actuator and means for issuing the desired signal or signals when the actuator reaches a level close to that of the actuatable member. The actuatable member can be displaced to set the predetermined level of the liquid as desired by the user. The apparatus can be so designed as to constitute a transportable kit comprising the actuator and the actuatable member. In a form of the invention, the actuator is mounted on a floating rod. In another modification of the apparatus, the meniscus of said liquid serves as the actuator.

80 Claims, 41 Drawing Sheets

U.S. PATENT DOCUMENTS

| | | | |
|---|---|---|---|
| 4,989,452 | 2/1991 | Toon et al. | 73/293 |
| 5,103,673 | 4/1992 | Sawada et al. | 73/313 |
| 5,224,379 | 7/1993 | Koebernik et al. | 73/308 |
| 5,229,751 | 7/1993 | Chandler et al. | 340/618 |
| 5,262,604 * | 11/1993 | Powell | 200/84 C |
| 5,314,313 | 5/1994 | Janesky | 417/63 |
| 5,341,728 | 8/1994 | Ejiri et al. | 99/336 |
| 5,426,271 | 6/1995 | Clark et al. | 200/84 C |
| 5,562,003 | 10/1996 | Lefebvre | 73/308 |
| 5,565,607 | 10/1996 | Maekawa et al. | 560/223 |
| 5,565,687 | 10/1996 | Berrill | 250/577 |
| 5,744,701 * | 4/1998 | Peterson et al. | 73/49.2 |

\* cited by examiner

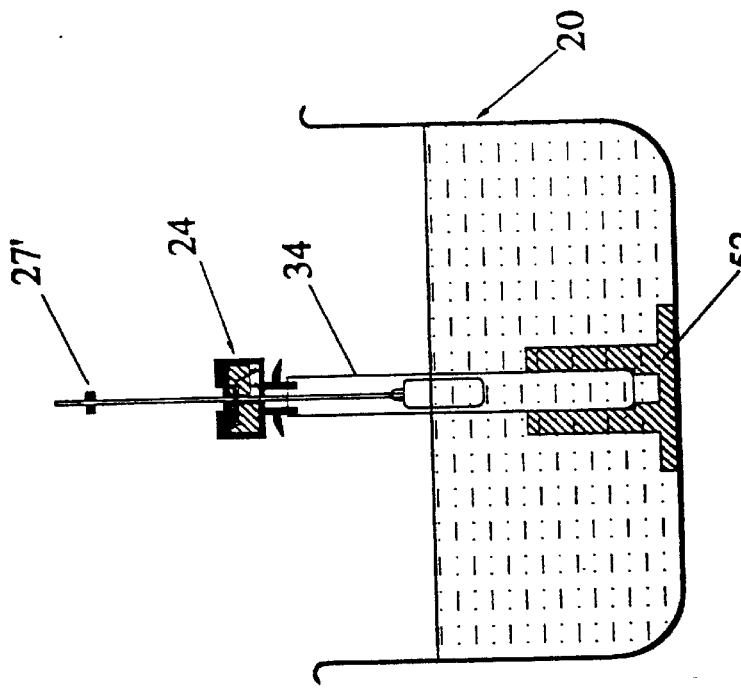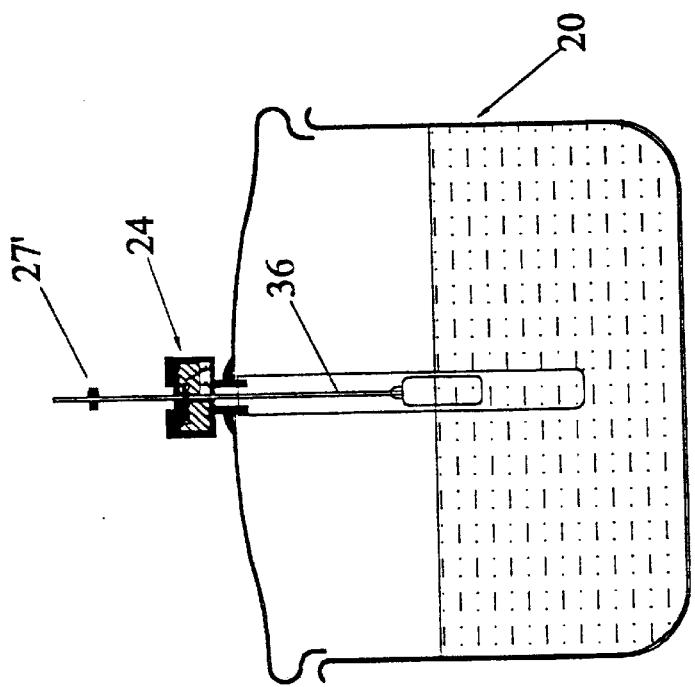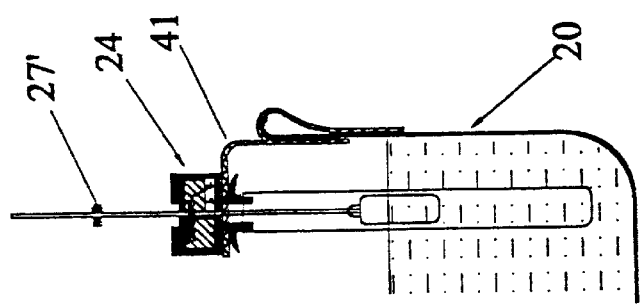

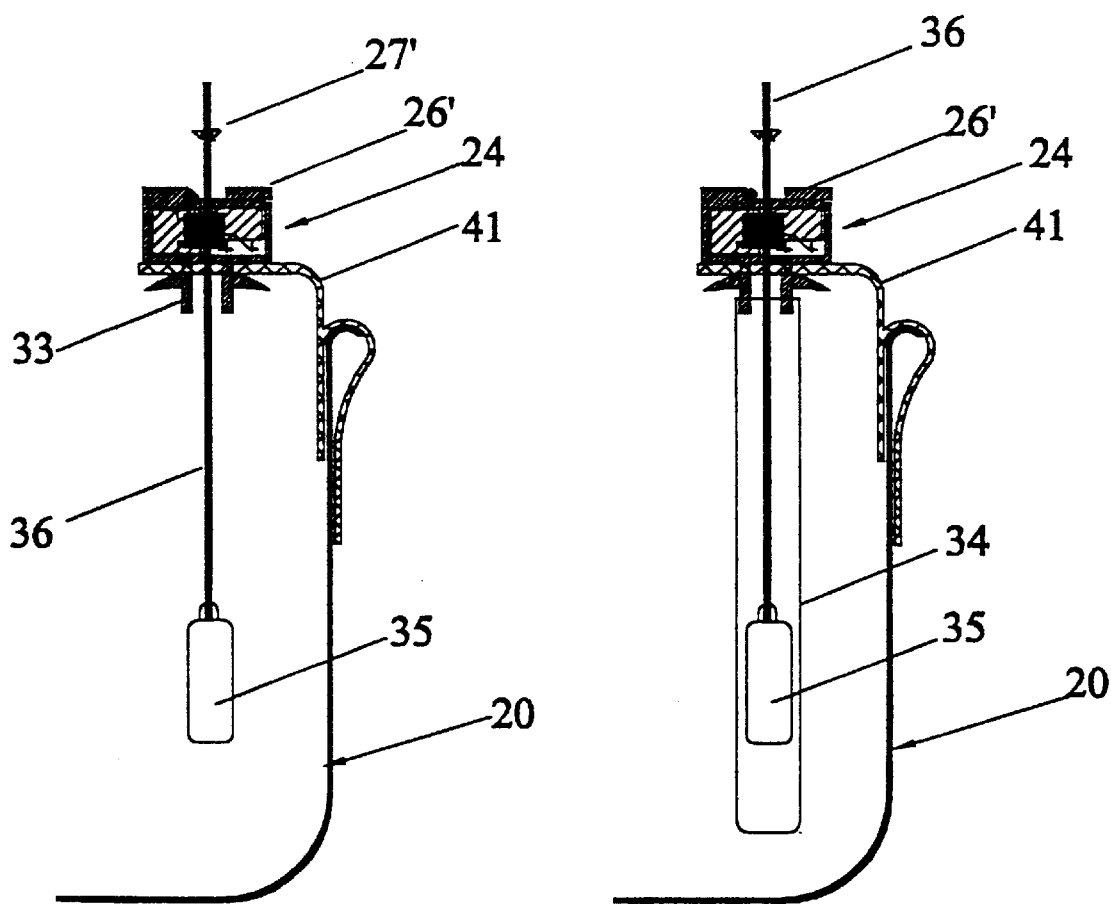

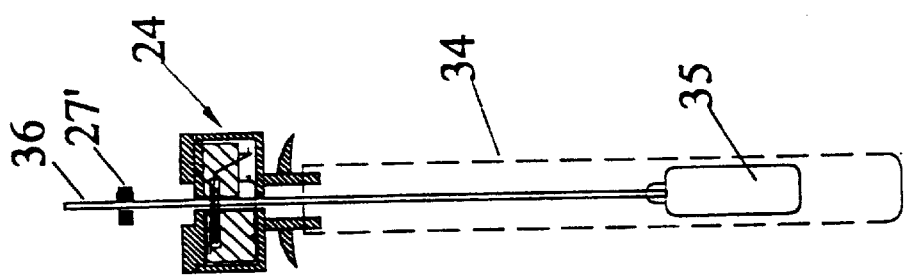
Fig. 7A1   Fig. 7A2
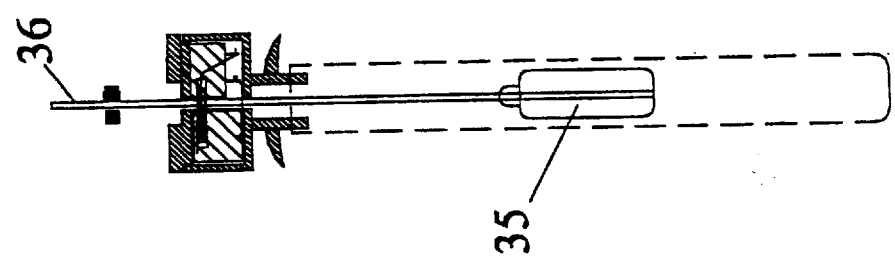
Fig. 7B1   Fig. 7B2

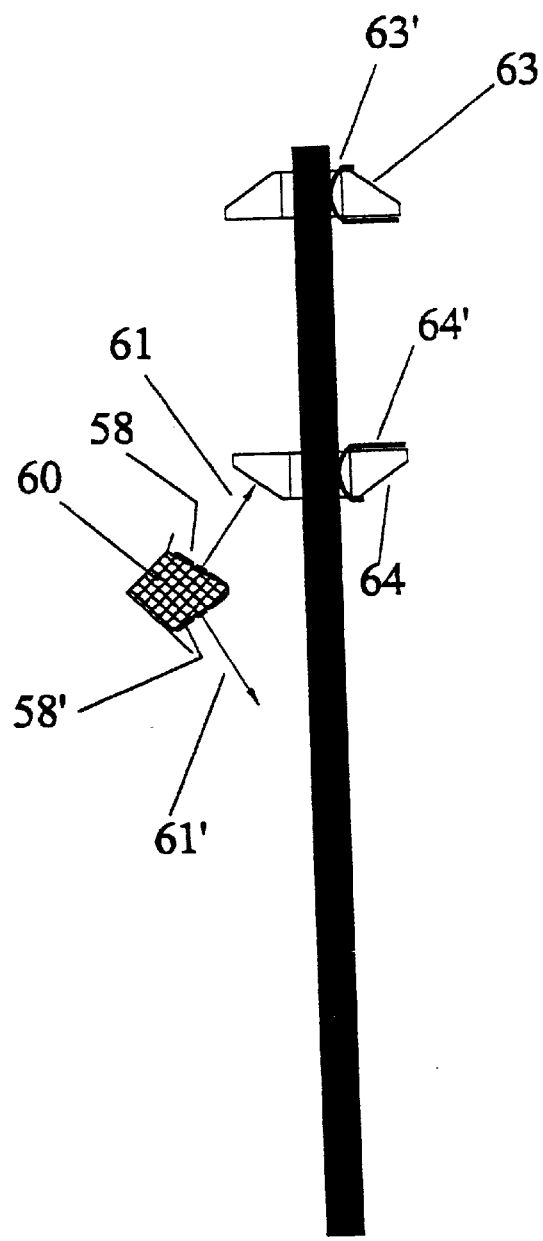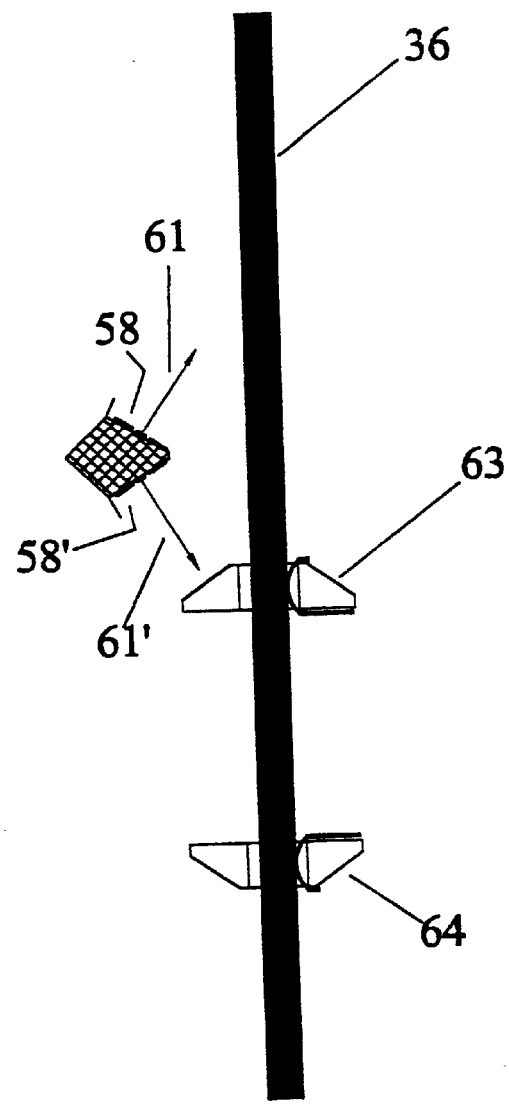
Fig. 8C1      Fig. 8C2

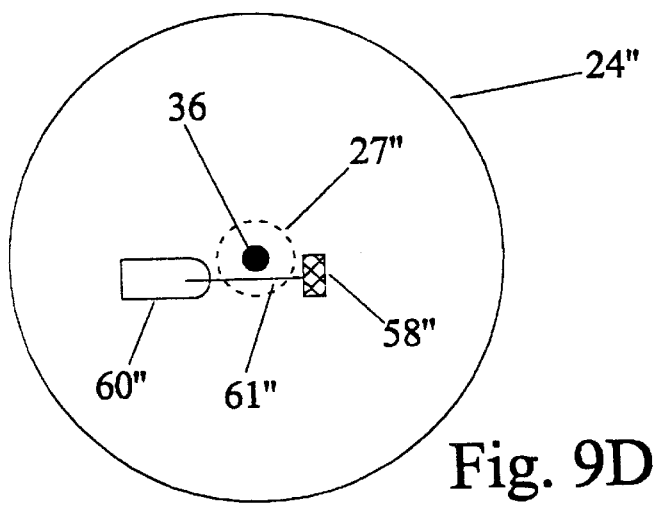
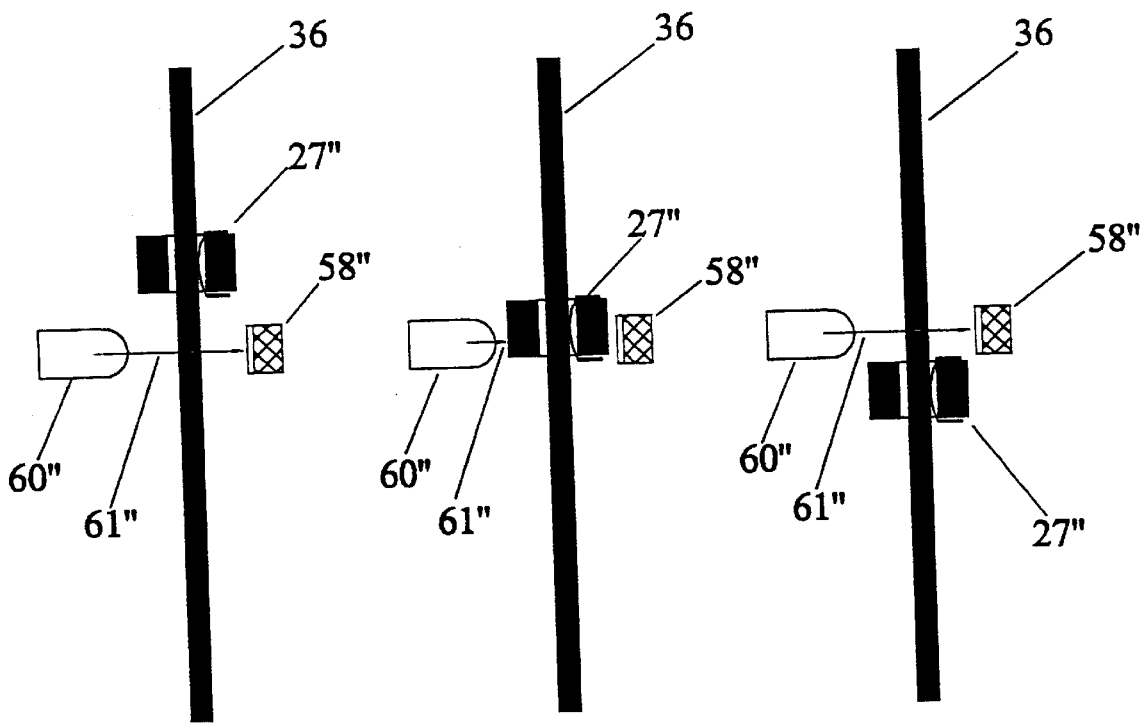
Fig. 9A  Fig. 9B  Fig. 9C

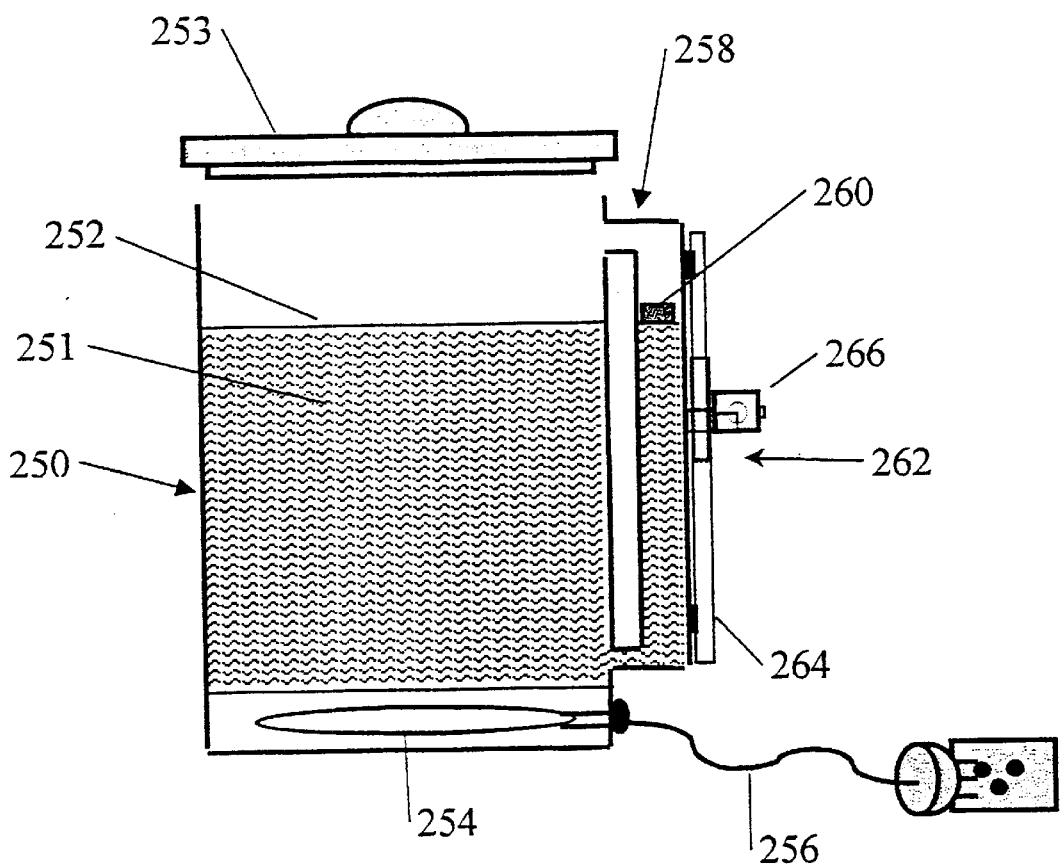
Fig. 18
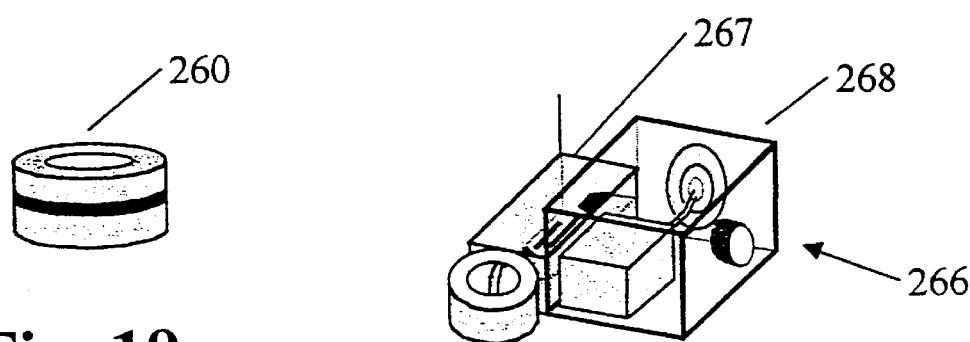
Fig. 19
Fig. 20

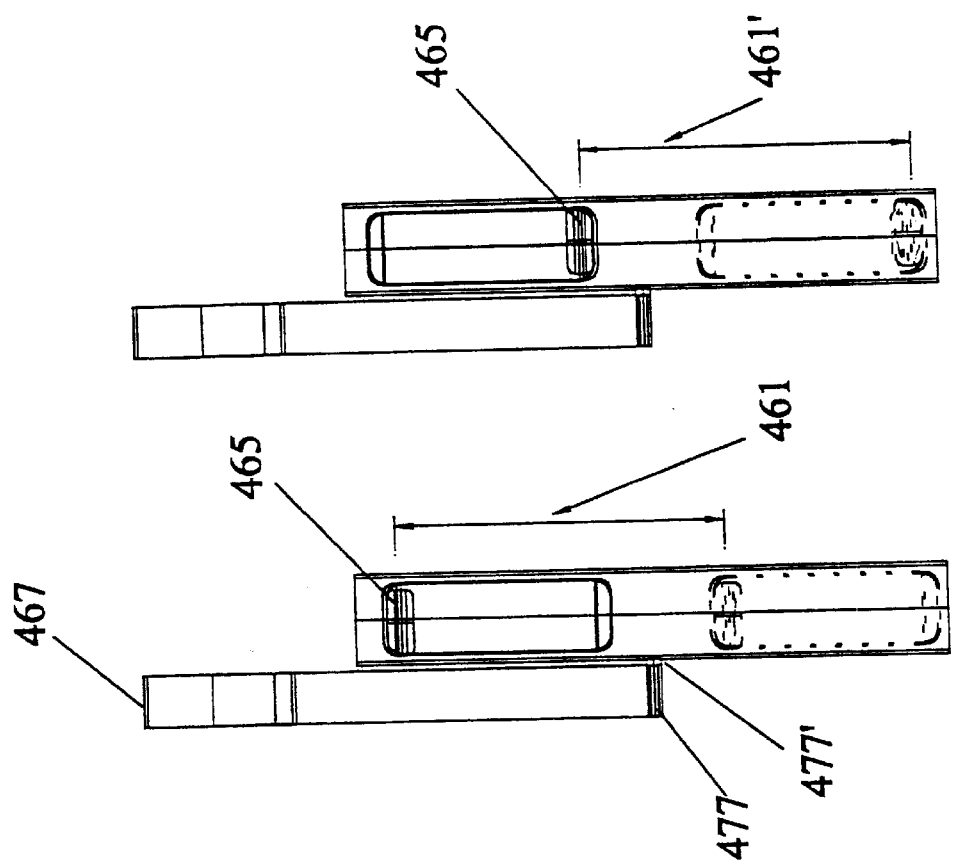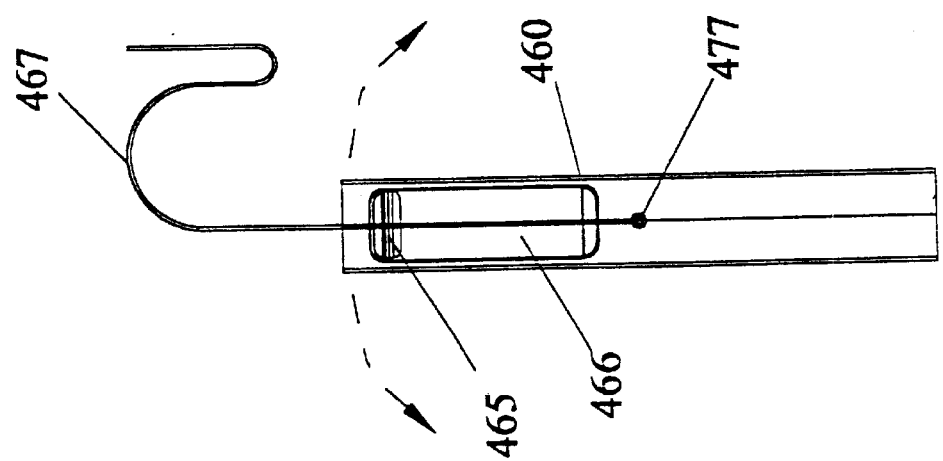

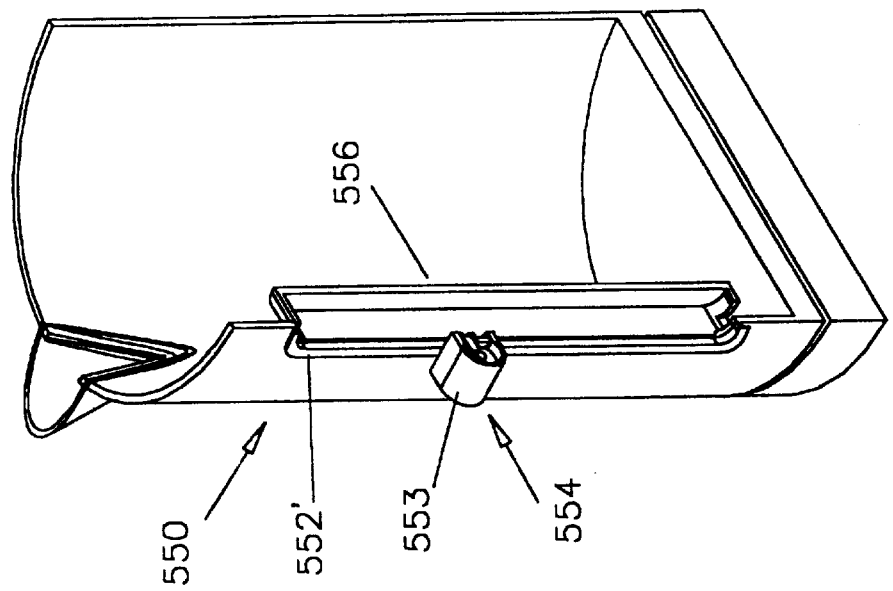
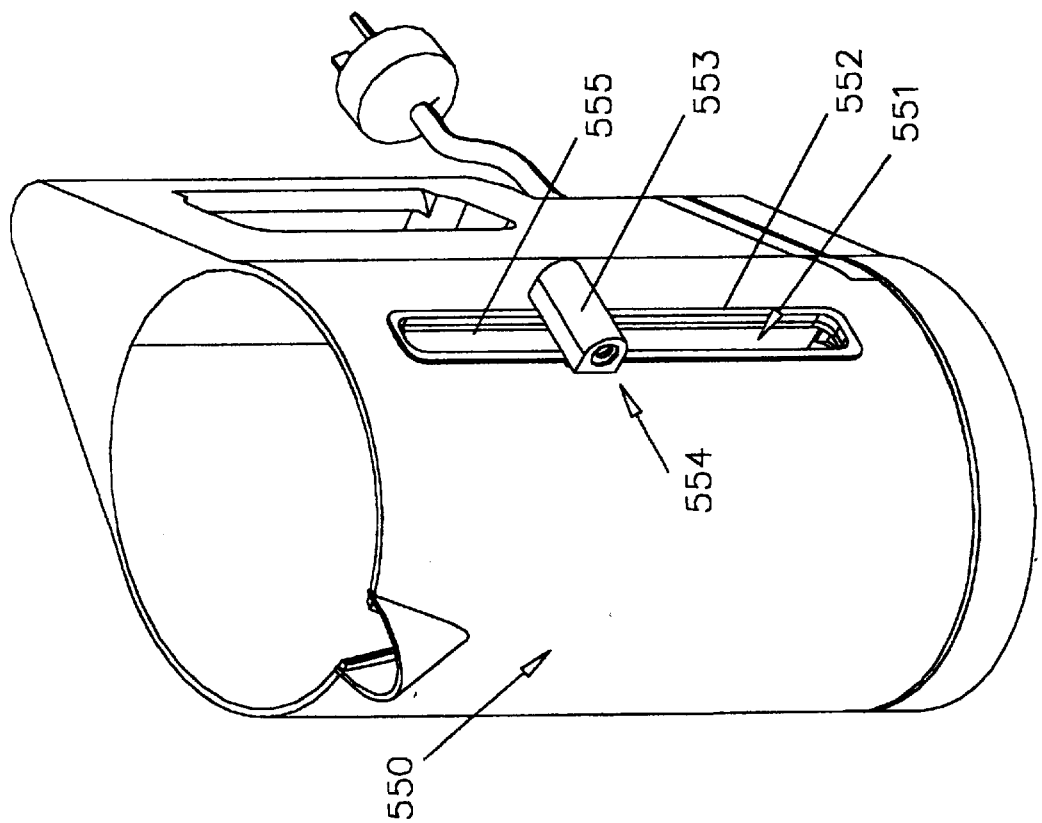

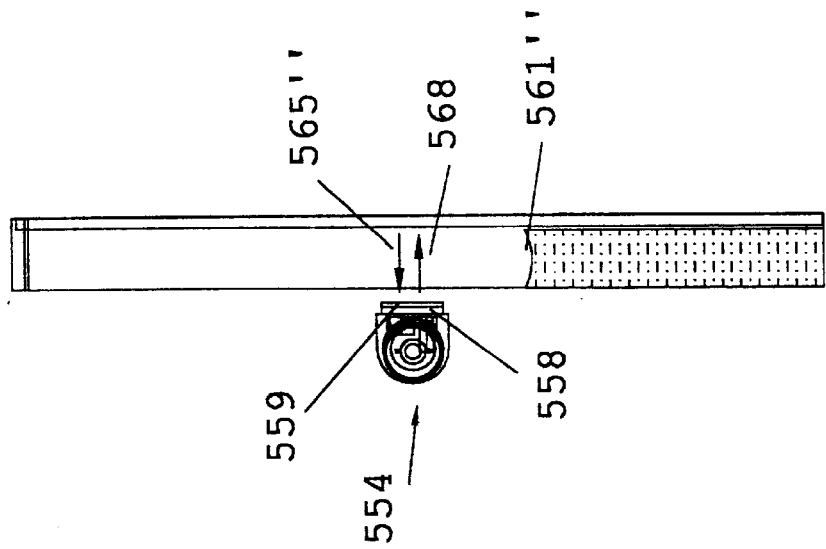
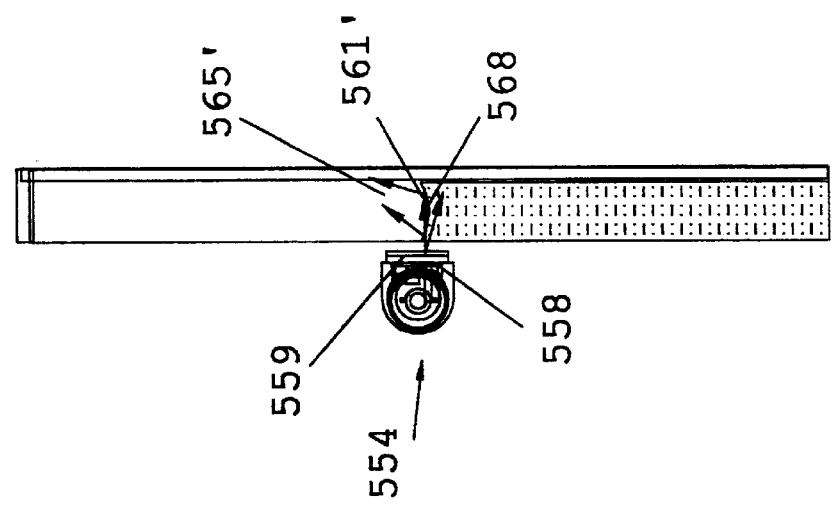
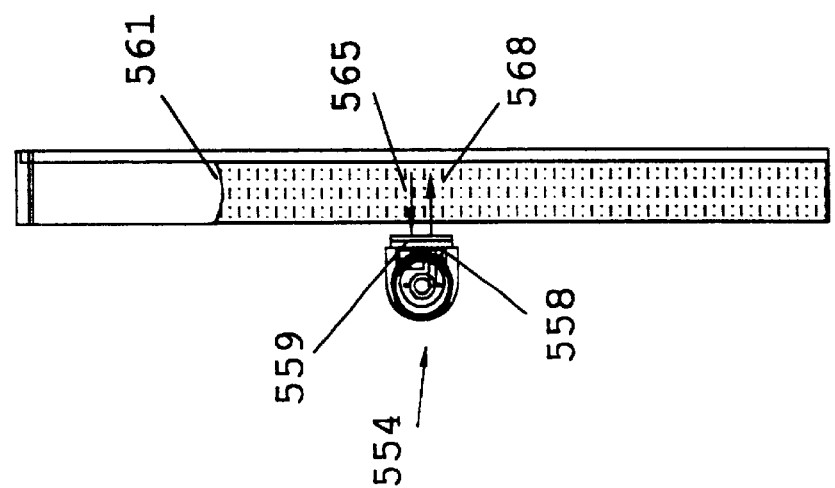

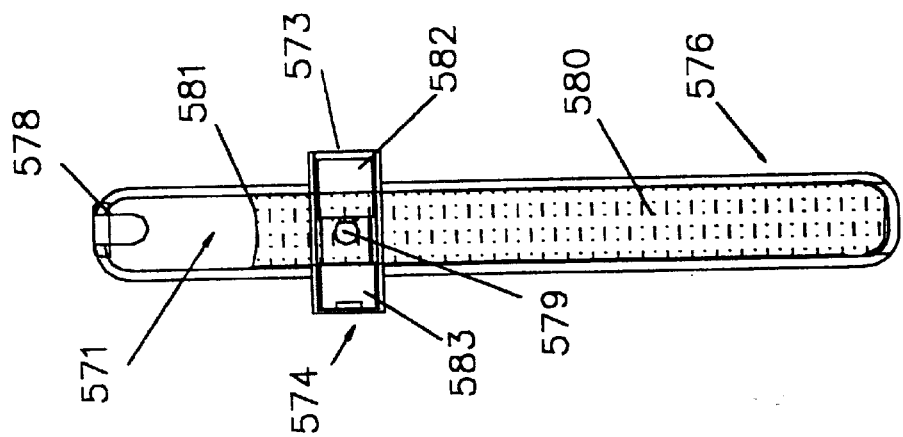
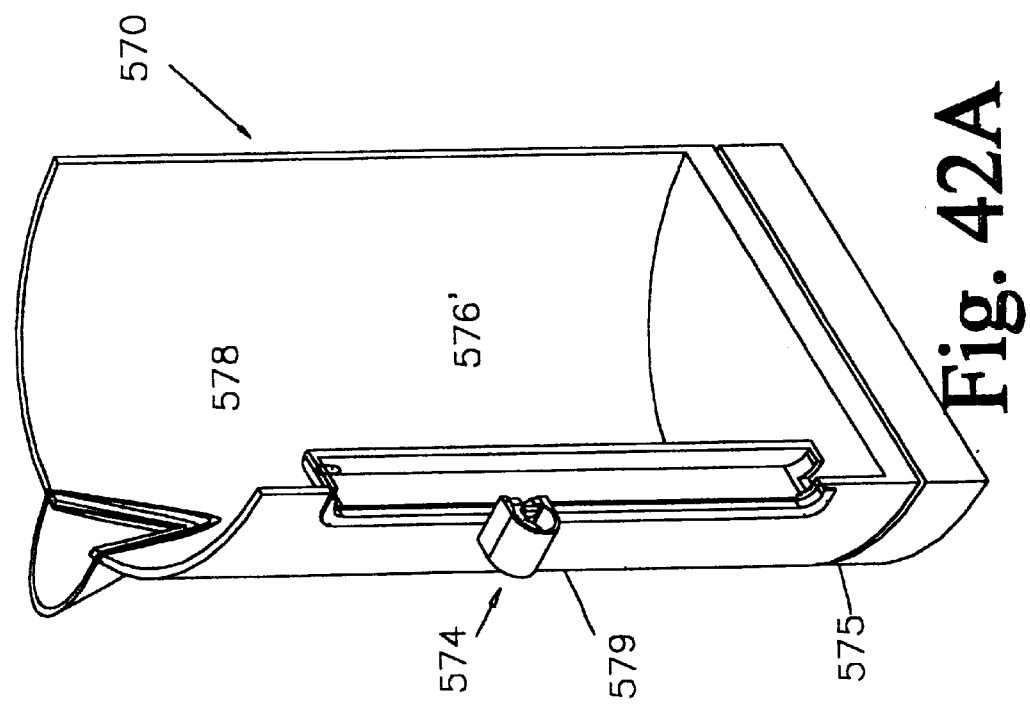

LIQUID LEVEL MONITORING AND CONTROL APPARATUS

This application is a continuation-in-part application of U.S. patent application Ser. No. 08/991,882, filed Dec. 16, 1997, now U.S. Pat. No. 6,028,521, the entire contents of which are hereby incorporated in their entirety.

FIELD OF THE INVENTION

This invention generally relates to liquid level monitoring and control apparatus, and particularly relates to such an apparatus that generates an alarm or other output signal when the liquid level reaches a predetermined level or when an actuator and an appropriate actuatable-switch are positioned within their actuation-range.

BACKGROUND OF THE INVENTION

Many types of liquid level sensing devices have been disclosed in the prior art. Such devices, which are usually based on magnetic, electrical conductivity, acoustic or optical parameters, enable user manipulation of the positioning of the sensing elements for either facilitating the operation of the liquid level sensor itself or the issue of a sensible output at a desired liquid level in the monitored vessel, in accordance with one or more predetermined sensing elements. Thus, for example, U.S. Pat. Nos. 3,696,362 and 3,944,845 describe conducting liquid level control devices, which indicate when the level of a conducting liquid reaches a predetermined minimum level, while U.S. Pat. No. 4,354,180 describes an optical liquid level sensing probe. U.S. Pat. Nos. 3,849,771 and 4,771,272 describe portable self-contained liquid level alarm devices having a housing in which a floating magnet actuates a reed switch. U.S. Pat. No. 3,702,910 describes a level sensing control device with a reed switch which can be rotatably adjusted to any position in respect of a magnetic member connected to a float member. Additional implementations of such magnetic devices have been described inter alia in U.S. Pat. Nos. 3,702,910; 3,823,328; 3,997,744; 3,978,299; 4,035,789; 4,066,858; 4,395,605; 4,458,118; 4,459,584; 4,499,348; 4,609,796; 4,748,299; 4,748,300; 5,103,673; 5,224,379; 5,426,271; 5,562,003; and 5,565,687.

U.S. Pat. No. 5,565,607 describes an apparatus that comprises a linear series of switches, each of which is closed when in the proximity of an actuating magnet movable along the series of switches. Movement of the magnet produces a progressive change in voltage on the output line, a resistance chain linked to the switches, as a cumulative signal indicating the position of the magnet. A cumulative signal represented in the magnet position relative to the series of switches can thus be generated.

U.S. Pat. No. 4,771,272 discloses an indicator of a liquid level which comprises a pendant liquid level sensor suspended at a desired height within a vessel by means of flexible cable, said sensor including a hollow, elongated cylindrical housing closed at both the upper and the lower end by cylindrical cups providing the perforations to permit water to enter or exit. A cylindrical float is contained coaxially within the housing, and has a permanent magnet recessed into its upper surface. The switch is closed when the magnet rises sufficiently to contact or to almost contact it.

Most of the liquid level monitoring and alarm systems described in the prior art, including those based on a floating magnet, are not versatile and usually have drawbacks and/or are not convenient for user manipulation. It is especially seen in cases in which the monitored vessel's interior is wholly inaccessible, such as the case of a sealed vessel holding hazardous material or when the content and/or prevailing conditions do not allow a simple and convenient user access and manipulation. Similar difficulties exist in the case of heated vessels, particularly in the case of a cooking pot or the like.

It is often found in everyday cooking operations that a heated liquid, e.g., soup, is left simmering on a heat source without supervision. It may happen that the cooking pot on the heat source has been forgotten, whereby the victuals being cooked or the cooking pot itself may be ruined and, more seriously, a hazardous situation may develop. There are known devices for automatically switching off an electrical water heater when the water level drops below the level of the heating element of the heater. Also, U.S. Pat. No. 4,673,925 describes an alarm device, for removably mounting onto the upper edge of a cooking pot, which provides an alarm when the liquid contents of the cooking pot begin to boil, whilst U.S. Pat. No. 5,229,751 describes a coffee pot including an integrally provided alarm device for providing a time-based alarm indication in respect of the freshness of its liquid contents. Also, U.S. Pat. No. 5,341,728 describes an alarm device, which controls the cooker and indicates the end of cooking timing.

Also, an appropriate apparatus for monitoring and controlling the liquid level in a cooking vessel is specially needed for blind or visually impaired individuals. It would be very helpful, to those individuals, to have a device by which they will be able to monitor easily the liquid level in their cooking vessel. Thus, for example, it would be very helpful to visually impaired individuals who would like to boil water for preparing a cup of coffee, if they could be provided with an appropriate and simple device by which they could, whenever they like, monitor the liquid level in the kettle.

In reality, only certain household containers, for example, electric kettles, are provided with liquid level sensors and automatic alarms or switch-off devices, while most cooking pots and pans do not include such devices. This is primarily because the liquid level sensors and/or auto-switch devices of the art consume valuable space and interfere in cooking/cleaning operations. Moreover, even liquid level sensing devices currently used for cooking apparatus do not contain a simple and convenient means allowing the user, whenever he or she desires, to easily change the level at which the sensor will activate the alarm.

It is a purpose of this invention to provide a liquid level monitoring and control apparatus that generates an alarm, a safety signal or other output signal when the liquid reaches a predetermined level or when an actuator and an appropriate actuatable-switch are positioned within their actuation range.

It is further purpose of the present invention, to provide a liquid level monitoring and control apparatus that can be used by blind or visually impaired individuals.

It is a still further object to provide such an apparatus that enables convenient user access to level setting components.

It is a still further object of the present invention to provide a liquid level sensor that is exceptionally versatile, in that the same general structure of sensor is suitable, with minor modifications, for obtaining a liquid-level apparatus whose operation can be based on various types of physical properties such as; magnetic, acoustic, electrical conductivity and electromagnetic radiation (hereinafter also "optical-radiation").

It is a still further object to provide such an apparatus that may be designed so as to be usable with a variety of vessels of different sizes and shapes, with both open and sealed vessels, and with vessels with an interior inaccessible to user manipulation.

It is a still further object to provide a novel and versatile liquid level sensor that can be readily adapted for a wide range of applications.

It is a still further object of the present invention to provide a liquid level apparatus that is applicable also for liquid containing solid materials.

It is a still further object to provide a liquid level monitoring and control apparatus that is particularly suited for use with cooking vessels.

It is a still further object to provide an alarm kit that is portable, transferable, and used interchangeably with a wide variety of vessels.

It is a still further object to provide such an apparatus that is compact and inexpensive.

It is a further object of the present invention to provide elements that are multifunction.

Other purposes and advantages of the invention will appear as the description proceeds.

SUMMARY OF THE INVENTION

The invention provides a liquid level apparatus for monitoring and control of a liquid level in a liquid-containing vessel (hereinafter briefly, "the liquid vessel" or "the vessel"), and for providing an output signal for indicating when the liquid has reached a predetermined level, and if desired, activating one or more means including safety devices.

In accordance to one aspect of the present invention the liquid level apparatus comprises:

- a floating-rod assembly comprising a rod rigidly conjugated to a float (hereinafter, briefly, "floating-rod") wherein, in operation, said floating rod floatingly moves, in response to changes in the level of said liquid, in such a way that the longitudinal axis of said rod is generally parallel to the vertical direction, and wherein the lower part of said rod is connected to said float while the upper end of said rod is exposed above said liquid.
- at least one displaceable and fixable actuator, wherein said actuator is mounted on said rod and fixable at a user selected level, and wherein said actuator is floatingly movable with said floating-rod.
- means for displacing said actuator along the longitudinal axis of said rod and fixing it at a selected position on said rod.
- a sensing assembly, comprising: a) at least one actuatable-member (hereinafter, also "actuatable-switch"), wherein said actuatable-member can be actuated by said actuator once the level of said liquid reaches a predetermined level, or when said displaceable actuator is positioned within the actuation range of said actuator; b) an indicator; and c) a power supply, wherein said power supply energizes at least part of said sensing assembly; and wherein said sensing assembly, preferably also comprising a control unit, is issuing an output signal once said actuatable-member has been actuated by said actuator.
- means for guiding and restraining the transition of said floating rod in the vertical direction.
- a support member, preferably mounted on the rim of said vessel, on which member at least part of the components, preferably all the components, of said apparatus are mounted.
- a casing member, housing at least part of the components, preferably all the components, of said apparatus.

Regarding to the actuator and actuatable-switch pair (hereinafter, briefly, "actuation pair"), various kinds of actuation pairs can be used in liquid level apparatus according to the present invention. Those pairs can be based on various types of physical properties such as magnetic, electromagnetic (UV, visible, IR) acoustic or electrical conductivity. Examples of such pairs are: a) a permanent magnet, as the actuator, and a magnetic switch, like a reed switch or a hall-effect switch (hereinafter, briefly, "magnetic switch"), as the actuatable switch, b) a reflector for electromagnetic radiation or an opaque body of that radiation, as the actuator, and an integrated detector for electromagnetic radiation (hereinafter "electromagnetic switch" also, "radiation switch" or "optical switch") as the actuatable switch.

In a preferred embodiment designed according to first aspect of the invention, the float, on which said rod is conjugated, is immersed at least in part within the liquid mass, while the actuator, which is mounted on the substantially vertically extending floating rod, and the rest of the floating-rod are exposed above the liquid mass and preferably above the lid. The sensing assembly is located above the liquid mass, particularly over the lid, and preferably comprises a guide passage or passages for the floating rod. It comprises a box-like casing, which preferably encloses all components of the sensing assembly. A mutual, removable connection between said casing and said lid is preferably provided by matching the structural features of said two elements. As has been said, the term "actuator" designates a component that is capable of actuating an actuatable member, generally a switch, when it enters a certain actuation range of said member. While one of the preferred types of actuator is a magnet, and correspondingly the actuatable member is a magnetically actuatable switch, other types of actuators, e.g. electromagnetic or mechanical, are comprised within the invention, and, if such are used, the actuatable member will be respond to corresponding physical stimuli. The output signal generated by the apparatus may be an indication signal, such as a blinking light or an audio alarm, that indicates that the level of the liquid has gone below a pre-selected level. Also, the output signal may be a signal to a device, e.g. a pump or a heating device, associated with the liquid vessel, to stop the action which caused the liquid level to become too low or another action which has become undesirable or dangerous.

In one mode of operation, after the lid has been set on the rim of a vessel containing liquid, the apparatus is mounted at the center of said lid (preferably through an aperture at the center of the lid) keeping the longitudinal axis of the floating-rod close to the vertical position. At this stage, the floating-rod, which the lower part of it is immersed in the liquid, starts to float. Now, the exposed upper part of the floating rod, which is above the lid, provides the user a continuous visual monitoring and indication about the liquid level within said vessel. Knowing the level of the liquid in the vessel allows the user to select the liquid-evel at which he or she would like the actuation to occur. According to that selection the displaceable actuator will be moved by the user, along the floating rod, to fix it at the corresponding position on said rod An apparatus designed according to this aspect of the invention is especially simple and versatile. Thus, e.g., very similar embodiments can be designed that can operate on the basis of various physical properties. In many cases, in order to change the sensing principle of the apparatus from one physical property to another one, it suffices to replace the appropriate actuation pair, while leaving the other components of the apparatus unchanged. In other wards, the same general structure of apparatus, or, as may be said, the same backbone, is suitable, with minor modifications, to be used with various types of physical principles (electromagnetic, magnetic, acoustic, electrical conductivity, etc.), thereby providing an exceptional degree of versatility.

In a number of embodiments of the present invention, a single actuator can actuate a single actuatable switch at least at two, significantly different, pre-selected actuation levels of the liquid. The expression "two significantly different actuation levels" means two positions, along the transition path of the actuator, in which the actuatable switch can be actuated by said actuator, but between these two positions there is a position along said transition path where said actuatable switch is not actuated by said actuator. Therefore, instead of using multiple actuators or multiple switches for generating signals at more than one pre-selected liquid level, a single set of actuation pair can cause actuation of output signals at more than one pre-selected level of said liquid. Thus, e.g., when such an apparatus is applied to a cooking pot, an indication signal, such as an alarm, is generated when the liquid level drops to a first pre-selected level, and a signal to shut-down the electrical heating of said vessel is generated when the liquid level drops further to a second pre-selected level.

In order to apply the same apparatus for vessels of significantly different depth or liquid level, a long or an extendable floating rod is conveniently used. The extendibility of the rod can be achieved in various ways, e.g. by using a telescopic rod or by changing the position at which the rod is connected to the float.

In principle, an apparatus designed according to such embodiment can function properly without any filtering unit. However, in cases where the vessel contains, in addition to liquid, solid materials that might disturb the free vertical transition of the floating rod, an appropriate filter is used in order to keep those solid materials out of the transition path of the floating rod. The mesh of said filter will be determined, mainly, according to the specific content of said vessel.

Also, when such an apparatus is used in a heated vessel containing liquid and when a lid covers the vessel, as is the usual case in cooking pots, vapor might be accumulated above the liquid. In such cases, accumulation of liquid vapor around the passage of the floating rod might plug or disturb the free vertical transition of the rod, thereby causing malfunction of the apparatus. In order to prevent such plugging an appropriate outlet is preferably provided in the apparatus.

An apparatus according to this aspect of the invention is mounted preferably on the lid of the vessel, but it can be mounted in the vessel by other means. Thus, for example, it can be hung on the upper rim of the vessel, or be appropriately supported at the bottom of the inside of the vessel.

According to other, second, aspect of the present invention the liquid level apparatus comprises:

a floating-actuator assembly comprising a floating actuator member accommodated within said vessel or in a liquid duct that is in liquid communication with said vessel, wherein said floating actuator floats on said liquid and is guided to move with the liquid level in a vertical path, proximal to an internal wall of said vessel or said duct; and a sensing assembly, preferably located outside of said vessel, comprising; a) at least one displaceable and fixable actuatable member (hereinafter, also "actuatable switch" or briefly "switch"), wherein said switch is fixable at a user-selected level preferably proximal to the vessel's exterior surface and parallel to said vertical path of said actuator, and wherein said actuatable switch can be actuated by said actuator once the level of said liquid reaches a predetermined level, or once said actuatable switch is positioned within an actuation range of said floating actuator; and said sensing assembly preferably also comprising b) an indicator; a power supply; and a control-unit; wherein said sensing assembly is issuing an output signal once said actuatable member has been actuated by said actuator.

In one of the apparatus embodiments according to this aspect of the present invention, the floating actuator floatingly moves downwards or upwards, in response to the liquid level, along the interior wall of said vessel or said duct, for actuating the actuatable switch upon reaching a user-selected liquid level, to provide an output signal. Also, an output signal, such as an alarm, can be generated when the actuatable switch is vertically displaced, manually or electronically, along the vessel's wall and enters into the actuation range of the actuator, to indicate the liquid level in that vessel. There are two main configurations (modes) to constrain the transition of the floating actuator in close proximity to the vessel's interior wall surface and juxtaposed to said switches, located outside the vessel. According to one of the configurations (Mode A), which is particularly suitable for a large diameter vessel, the floating actuator is located within a sleeve-like filter which has free liquid flow communication with said vessel. According to mode-A configuration, the sleeve-like member is of a filtering type and has dual functions. In addition to serving as a guide for the vertical transition of the actuator, it is also serves as a filtering unit for preventing solid materials, that might be present in the vessel, from entering inside the sleeve and disturbing the free transition of the floating actuator inside said sleeve. The sleeve-like member may be disposed within the vessel, or it may be positioned outside it, as a separate duct, but in flow communication with the vessel, so that the level of the liquid therein is essentially the same as in the vessel. According to another configuration (Mode B), which is particularly applicable to a vessel having a small cross-section, said actuator has a shape and dimension such that its outer rims are proximal to the interior side wall of the vessel, e.g., it may be an O-ring shaped actuator device disposed in a cylindrical vessel. In such a configuration (Mode B), the transition of the floating actuator is constrained by the vessel's interior wall to be generally vertical. As will be appreciated, Mode A or Mode B configuration may be chosen on the basis of the intended application. Thus, for example, while Mode A configuration will be typically applicable to large reservoirs, as well as to small vessels such as a cooking pot in a domestic kitchen, Mode B configuration is typically applicable to a vessel with a small cross-section. Also in this case, the actuation pair can be based on various physical properties, such as an acoustic, electromagnetic or magnetic, although in the preferred embodiment a magnetic or an electromagnetic actuation pair (hereinafter, also, "optical actuation pair") will the used.

There are cases in which the sensing assembly may comprise two or even more actuatable switches. For example, in the case of a sensing assembly comprising two magnetic switches, the first of the two may be positioned at a first level along the vessel's wall, and the second may be positioned at a second level, below the first level. Each of said switches issues a signal to the control unit when the liquid level is such so as to bring a floating magnet to the level of that magnetic switch. The signal issued by the control unit may be different with respect to the two different levels. For example, when the liquid level reaches the first switch, an alarm may be generated, and when the liquid level reaches the second switch, the control unit may issue a signal to stop the action which causes the liquid level to go down, e.g., stop the heating in the case of a cooking pot of kettle.

On the basis of an embodiment according to the second aspect of the present invention, a magnet-based liquid level control kit with an alarm is provided, as an example. Said kit is comprised of two main units: a magnet assembly located inside the liquid vessel, and a sensing assembly attached, usually but not necessary, to the exterior wall of said vessel, wherein the magnet assembly and the sensing assembly can be attached to each other before applying them to the vessel or be packed as separate units. Said sensing assembly may include a control device, optionally, an alarm generating circuit, and a support rack, on which one or more displaceable magnetic switches are positioned. Said kit can be portable, transferable, and used interchangeably with a wide variety of vessels.

Regardless of the configuration (Mode A or Mode B), there are various means for positioning and displacing said displaceable actuatable switch and fixing it at a user selected level. Thus, for example, the actuatable switch can be positioned on a support rack juxtaposed adjacent to said vessel's side wall exterior surface and displaceable along said support rack; or, alternatively, it can be attached directly onto the vessel's side wall exterior surface by attaching it at different levels along the side wall, e.g., by use of a hook and pile type fastener (e.g., VELCRO-type).

In a number of apparatus embodiments, designed according to the present invention, it is possible that under controlled parameters a single actuatable switch can be actuated by the same actuator at least at two, significantly different, pre-selected liquid levels. In this case, the expression "two significantly different actuation levels" means two positions, along the transition path of the actuator, in which the actutatable switch can be activated by said actuator, but between these two positions there is a position along said transition path where said actuatable switch is not actuated by said actuator. In such cases, instead of using multiple switches or multiple actuators, for generating signals at more than one pre-selected liquid-level, a single actuation pair may suffice. Thus, for example, under a controlled magnetic parameters, such as poles direction, actuatable actuator distance and magnetic field strength, a single magnetic actuation pair can cause actuation of output signals at more than one pre-selected level of said liquid. When such actuation pair is applied to a cooking pot, an indication signal, such as an alarm, is generated when the liquid level drops to a first pre-selected level, and a signal to shut down the electrical heating of said vessel is generated when the liquid level drop further to a second pre-selected level.

According to a further variant of a liquid-level apparatus, according to the present invention, an electromagnetic monitoring and control apparatus is provided for a vessel containing liquid, wherein said vessel is transparent to electromagnetic radiation, or provided with a window (hereinafter also "electromagnetic window" or "optical-window ") or with a duct that is transparent to said radiation, wherein said duct has free flow communication with said vessel, said apparatus comprising:

a sensing assembly, preferably located outside said vessel or said duct, comprising; a) at least one emitter of electromagnetic radiation; and b) at least one displaceable radiation switch; wherein the locations of said emitter and the detector of said switch are such that allow their communication with species located inside said vessel or said duct, and wherein said species can be, for example, the liquid mass itself; the gaseous phase above said liquid; the meniscus of said liquid; the wall of said vessel or said duct, radiation reflector; fluorescent body; or the like; wherein said emitter emits radiation that interacts with at least one of said species, and said switch can detects radiation generated as a result of that interaction, and wherein said switch is actuated once a radiation, detected by said radiation switch, crosses a pre-determined threshold signal; and c) said sensing assembly, preferably also comprising a control unit for controlling operation of said apparatus.

a power supply;

an alarm generator;

a housing for said displaceable switch;

a support for said housing permitting vertical displacement of the displaceable switch, whereby to set it at a the pre-selected liquid level at which the apparatus will be actuated.

said alarm generator and said power supply being preferably part of said sensing assembly and preferably housed in the housing of said switch.

In contrast to the various apparatus embodiments described hereinbefore, in such liquid level apparatus no float is required for apparatus actuation. Monitoring of the liquid level relies mainly on differences in the interaction of the emitted radiation with various species related to said liquid. Such changes can be produced, for example, as a result of differences in optical interactions of electromagnetic radiation with different species, being it the liquid mass itself or the gaseous phase above said liquid. Thus, for example, the threshold signal can be defined and adjusted as the optical signal sensed, by an optical switch, after interaction of an electromagnetic radiation with the liquid mass. Such threshold signal can be maintained, for example, as long as the meniscus of said liquid is above the detection range of said optical switch. However, as soon as the liquid level drops and said meniscus is within, or is lower than, the detection range of said switch, the sensed signal is a signal which is obtained after interaction of an electromagnetic radiation, fully or partly, with the gaseous phase. In this situation, the detected signal, which can be significantly different from said threshold value, can causes actuation of said optical switch and consequently to activation of an output signal.

Regarding to electromagnetic or optical devices described hereinbefore according to the present invention, there are various ways in which their operating performance can be controlled. Thus, for example, optical reflecting body can be attached to the inner wall of said vessel or said liquid duct, to increase or decrease the amount of radiation that will be reflected to the integrated photodetector. Also, bodies coated with fluorescence material can be used for apparatus actuation.

In accordance with a further, third, aspect of the present invention, a removably mountable liquid level control apparatus is provided, wherein the control is based on measuring changes in one or more physical properties related to said liquid, be it the liquid itself or the vapor of that liquid. Examples of said physical properties are electrical conductivity, reflection or electromagnetic radiation, or the like.

According to a further aspect of the present invention, a monitoring and control liquid level apparatus is provided, comprises:

at least one displaceable and flexible sensing probe comprising a sensing tip located inside said vessel, for sensing a physical property related to said liquid, and at least one communicator, wherein said communicator communicates between said, sensing tip and a control unit, and wherein said communication is based on said physical property;

a control unit device, communicated with said sensing tip by said communicator, for issuing an output signal when the level of said liquid reaches pre-selected level or when the sensing tip senses a signal which crosses a threshold signal; and a housing of said control device comprising also: a power supply and an alarm.

a rotatable sensing tip displacement unit comprising a rotatable support for said sensing probe and means for rotating said support to pay out or withdraw said flexible sensing probe, whereby to position said sensing tip at a selected level in said vessel.

If, for example, an optical property is sensed, the sensing probe typically includes: an optical emitter which transmits optical radiation to the sensing tip; an optical receiver, which measures the reflected light coming from the sensing tip; and an optical waveguide which enables an optical communication between the sensing tip and the optical detector. The liquid level control apparatus, according to this aspect, is provided with one or more displaceable sensing tips for electromagnetic radiation, adapted for positioning at respective user-selected levels and a controller responsively coupled to said sensing tip or tips for providing an output signal for at least activating an alarm device when the level of the liquid reaches the user-selected level. The liquid level control apparatus preferably provides an additional output signal for stopping the action leading to a change in the liquid level, e.g., for switching off the heat source heating the cooking pot, thus filling an important need in both commercial and domestic kitchens for at least preventing victuals in a cooking pot from being ruined by cooking beyond a predetermined level.

Apparatus designed according to the third aspect of the present invention, can be mounted on the vessel at different ways. Thus, for example, it might be hanged on the vessel's rim or, alternatively, it can be mounted on a lid covering said vessel, wherein the lid has a small hole, preferably at the center of the lid, through which the sensing tip can reach the liquid.

Regardless of the specific aspect at which the apparatus is designed, the signal issued by the liquid level apparatus may be an alarm signal, e.g. an audio or a visual signal, to indicate to the user, for example, that the level of liquid has gone down to the selected level. Also, it may be a signal to a device associated with said vessel, to stop the action which caused the liquid level to lower, e.g. a heating device in case of a cooking pot or a kettle, a pump in case of a storage container, or both.

In addition, the liquid level monitoring and control apparatus, according to the present invention may be powered by a conventional power source (i.e. a battery or mains supply), or it may be powered by a thermoelectric power supply adapted for intimate contact with a heating source, either the heating source itself, such as an electric plate, a gas burner or the like, the hot surface of the cooking pot itself or hot surfaces, heated directly or indirectly by the heating source, and thereby produces the necessary electric power to energize at least part of the electric components of said apparatus. Such hot surfaces might be, for example, the vessel's wall or the lid that cover the heated vessel.

Among the important features which characterize a liquid level apparatus according to the present invention and regardless to any specific aspect, are included:

the apparatus can be readily adapted for a wide range of applications, and can enable convenient user access to a displaceable actuating member mounted outside the vessel, to allow placing it at a level selected by the user. The liquid level sensing system may be designed such as to be usable with a variety of vessels of different size and shape and made of various materials.

the apparatus is easily adapted for both open and sealed vessels, and vessels with an interior inaccessible to user manipulation for various reasons (e.g., vessels holding hazardous material and/or having prohibitive conditions, such as high temperatures, which do not lend themselves to convenient user manipulation of actuatable switches located within the vessel).

the liquid level monitoring apparatus preferably provides an additional output signal for stopping the action leading to a reduction in the liquid level, e.g., for switching off the heat source heating the cooking pot, thus filling an important need in both commercial and domestic kitchens for at least preventing victuals in a cooking pot from being ruined by cooking beyond a predetermined limit.

the liquid level apparatus according to the present invention, in addition to operating as a control system, also allows the user, in a simple and convenient way and whenever he likes, to monitor the liquid level in the vessel.

the liquid level apparatus according to the present invention is applicable also when the liquid contains solid particles.

the apparatus is portable and transferable between, and usable interchangeably with a wide variety of vessels, not necessarily identical in shape or depth.

the apparatus is perfectly suited to be used as a kit

These and other objects and advantages of the present invention will become more apparent upon reference to the following specification when taken in conjunction with the accompanying drawing.

BRIEF DESCRIPTION OF THE DRAWINGS

In the drawings:

FIGS. 4A, B and C illustrate different ways of supporting a liquid level apparatus, similar to that described in FIG. 1, in a liquid vessel;

FIGS. 5A, B are, respectively, illustrate two similar liquid level apparatus as described in FIG. 4B, with or without the tubular filter, while FIG. C is an enlarged, top view, of a hook by which the apparatus is mounted on the vessel's rim;

FIGS. 7A1, A2 and B1, B2 illustrate two different ways of changing the length of the floating-rod assembly; in an apparatus similar to that described in FIG. 1.

FIGS. 9A, B, C are vertical cross-sectional views and FIG. D is a top view of another type of optical actuation pair;

FIG. 18 is a vertical cross-section of an electric kettle fitted with a liquid level apparatus designed according to Mode-B configuration of the second aspect of the invention.

FIGS. 19 and 20 are enlarged perspective views of the two components, the floating magnet device and the magnetic switch respectively, of the liquid level control apparatus of FIG. 18;

FIGS. 35A, B and C are vertical cross-sectional views of the floating magnet assembly, according to Mode-A configuration, showing its ability of turning it;.

FIGS. 40A, B illustrate, respectively, in perspective view and in perspective longitudinal cross-section, a liquid level apparatus similar to FIG. 37, but with a modified embodiment in which the meniscus of the liquid is used as an actuator.

FIGS. 41A, B and C illustrate, schematically, one of the optional operation principal of the embodiment of FIG. 40A;

FIGS. 42A and 42B illustrate, respectively, cross-sectional perspective view and front view of a modified embodiment of FIG. 40A.

DETAILED DESCRIPTION OF PREFERRED EMBODIMENTS

FIGS. 1–11 illustrate several embodiments of apparatus according to one aspect of the present invention, particularly adapted to be integrated into a kit that can be portable, transferable and usable interchangeably with a wide variety of vessels.

Figure 1A:
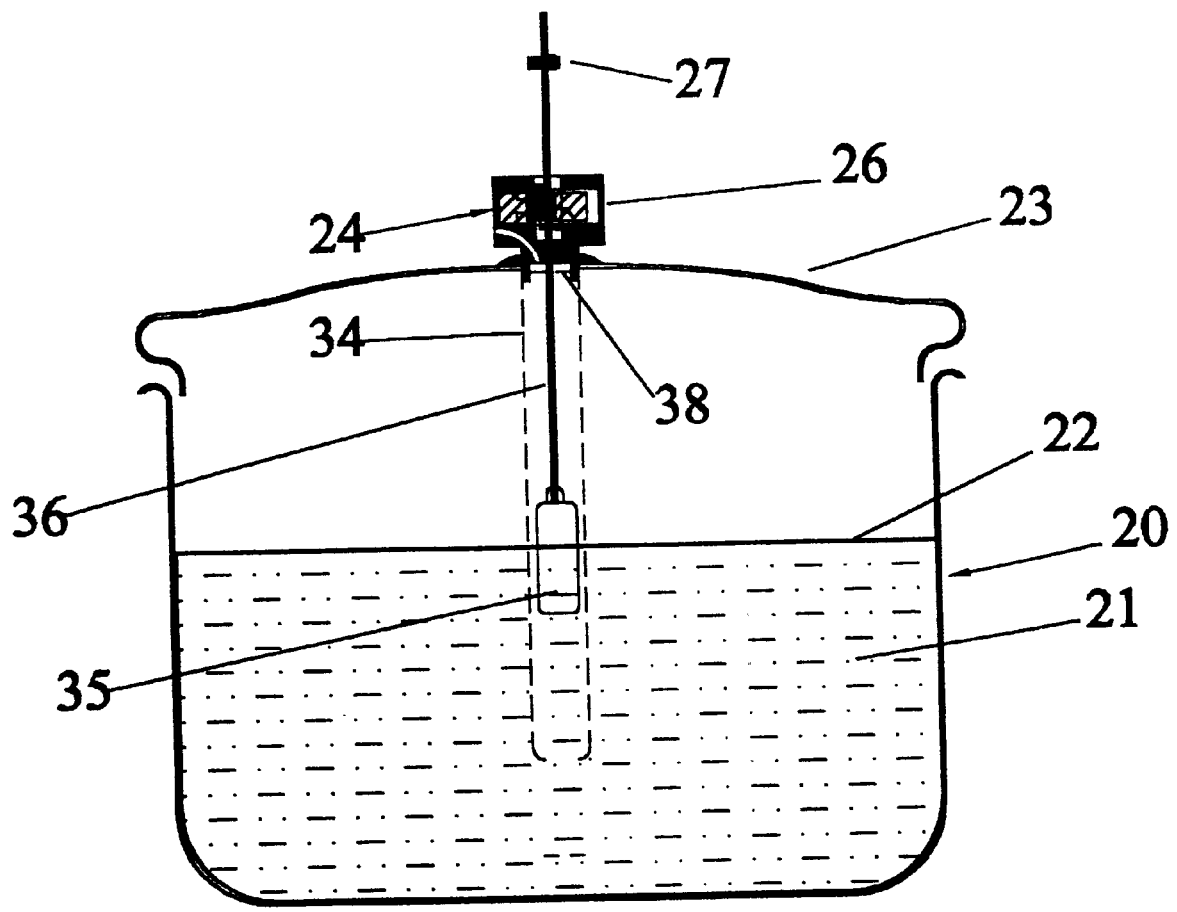
FIGS. 1A, B and C are respectively an axial cross-section of a liquid level monitoring and control apparatus embodiment designed according to one aspect of the present invention, an enlarged detailed cross-section of the sensing assembly, and a schematic horizontal cross-section of said assembly, seen from the top.

With reference now to FIGS. 1A, B and C, a cooking pot is generally indicated at 20 and contains a liquid 21 at a level 22. The pot is provided with a lid 23, at the center of which there is an aperture 38. The cooking pot is heated, e.g. by an electrical unit, not shown. A sensing assembly, generally indicated at 24, is located above the lid 23 and supported thereby. It is illustrated at a greater scale in the detail of FIG. 1B.

The sensing assembly 24 comprises a casing 26 with a cover 26', wherein within casing 26 are included the components of the sensing assembly. The displaceable actuator member 27, which is mounted on rod 36, is also displaceable along that rod and fixable at a selected level on rod 36 by the leaf-spring arrest member 44. For example, but not necessarily, the components of the sensing assembly may comprise a battery 28, a control device 29, an actuatable switch 30, and an alarm 31. The casing 26 has a downward projection 33, which passes through aperture 38 of the lid 23. It further comprises an outlet 32, which in many cases is required for minimizing of condensed vapor, of said liquid, from interfering or disturbing the free floating translation of the rod 36.

A float 35, of FIG. 1A, is rigidly attached to the rod 36, and in operation is at least partially submerged within the liquid 21. A tubular-like screen filter 34 surrounds both the float and the portion of the floating rod below the lid 23 to prevent foreign particles from interfering with the free translation of the rod 36. For this purpose, the filter member 34 is preferably made of mesh material. The rod 36 passes through cylindrical orifice 37 of casing 26, which constitutes the guide assuring the vertical orientation and motion of the rod 36. Said rod 36 carries the actuator 27, positioned above the sensing device 24. Float 35, rod 36 and actuator 27 move vertically as the liquid level 22 changes. When the liquid level has become low enough for actuator 27 to be within the actuation range of the actuatable switch 30, this latter is actuated, and in turn activates the control device 29 included in the sensing assembly 24.

Figure 1C:
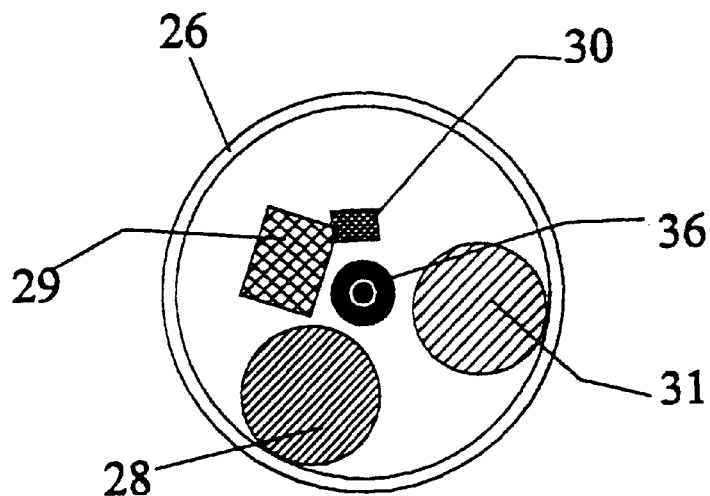
Figure 1B:
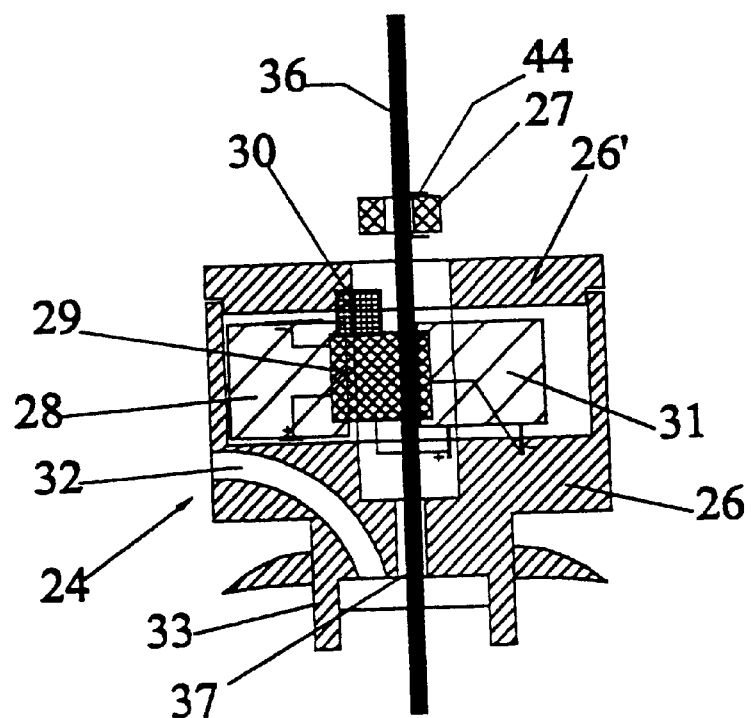
Figure 2C:
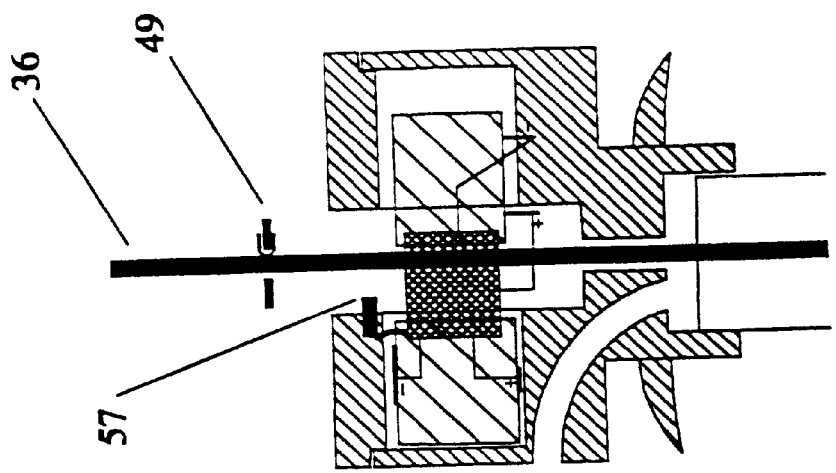
FIGS. 2A, B and C illustrate different types of actuators and correspondingly different types of actuatable switches which can be used as activation-pairs in the apparatus described in FIG. 1.
Figure 2B:
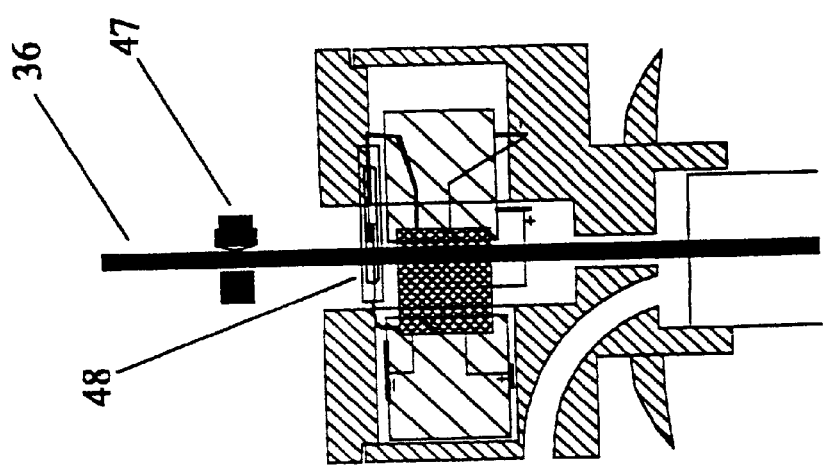
Figure 2A:
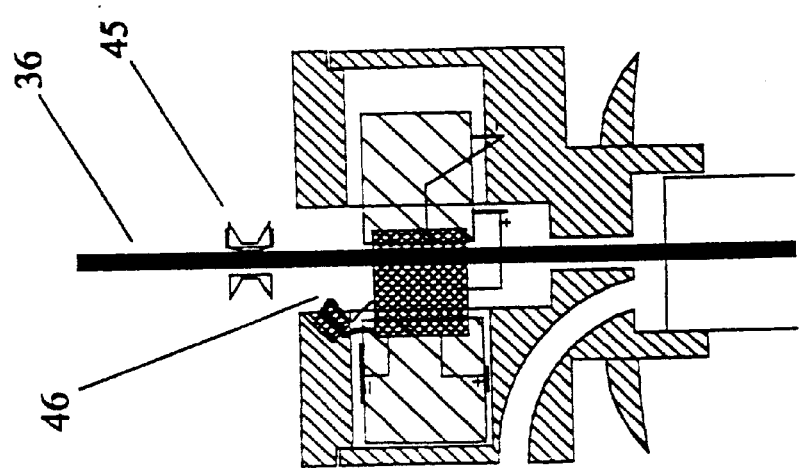

FIGS. 2A, B and C show essentially the same liquid level monitoring and control apparatus of FIG. 1, with three different options of actuation pairs, each based on different physical property. FIG. 2A, illustrates one kind of optical actuation pair which includes optical reflector 45, as an optical actuator, and integrated photodiode 46, or any other photodetector, as an optical actuatable switch. In FIG. 2B, a magnetic actuation pair is presented, with a permanent magnet 47 as an actuator and reed-switch 48 as an actuatable switch. In FIG. 2C, the actuation is mechanic, wherein the mechanical member 49 can press the actuatable electrical switch 57 to close an electrical circuit and to cause a signal activation.

Figure 3:
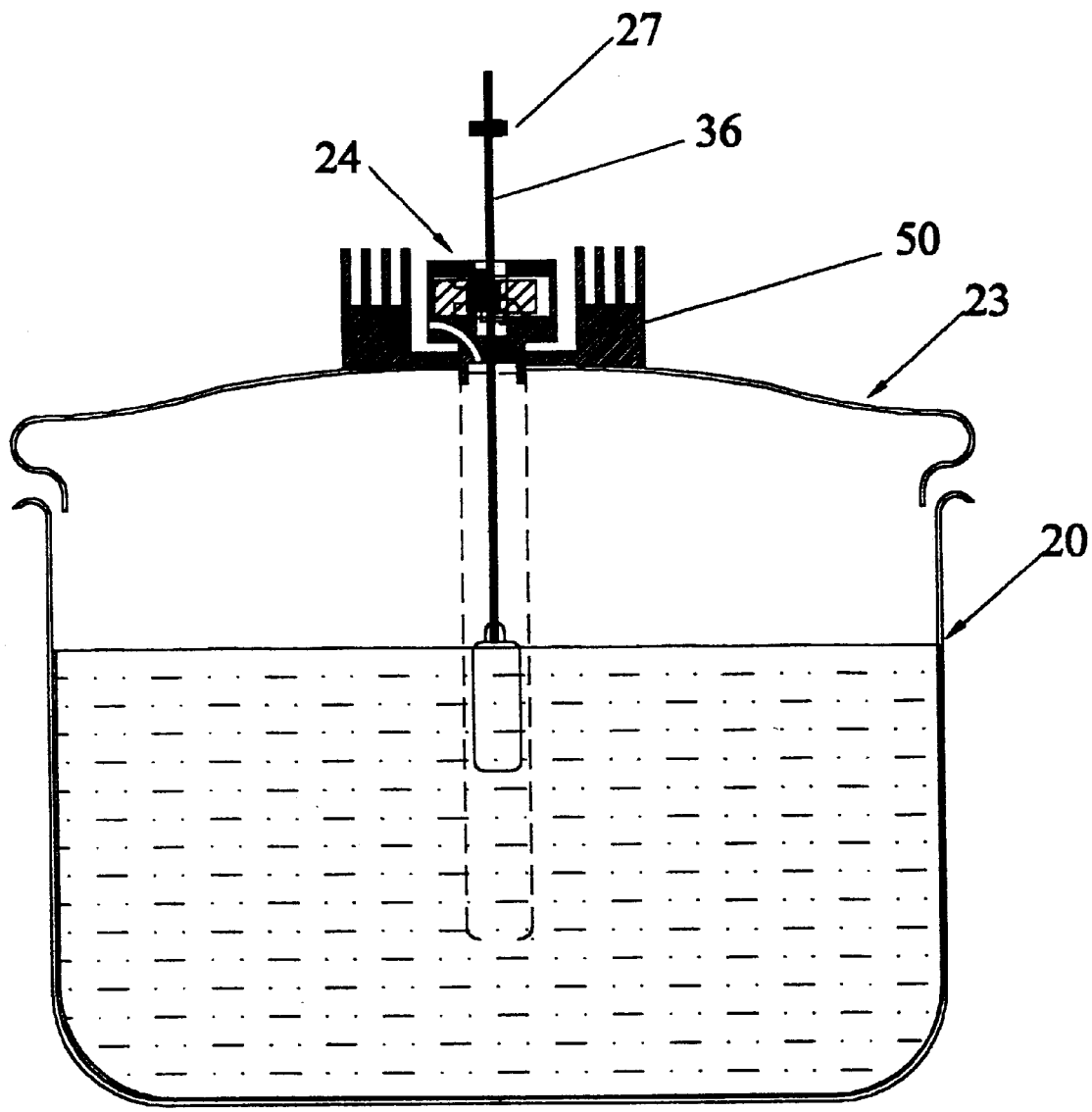
FIG. 3 is an axial cross-section of an apparatus, similar to that described in FIG. 1, comprising a thermoelectric power generator.

The embodiment of FIG. 3 differs from that of FIG. 1 essentially because a thermoelectric generator, generally indicated at 50, is connected to the sensing assembly and is applied to the lid 23 of vessel 20 to provide the required power, instead of, or in addition to, a battery.

FIG. 4, which is similar to the apparatus of FIG. 1, illustrates various ways of positioning the apparatus in a cooking vessel. In FIG. 4A, the apparatus is disposed as in FIG. 1. In FIG. 4B, the apparatus is hung on the rim of vessel 20, by the hook 41. In FIG. 4C, the apparatus is supported in quite a different way, and precisely, a base 52 is placed on the bottom of vessel 20 and serves to support the tubular filter 34 and to keep it vertical. Tubular filter 34, in turn, supports the sensing assembly 24. In these figures, the apparatus is equipped with magnetic actuation pair, with magnet 27' as an actuator member and actuatable magnetic switch.

FIGS. 5A and 5B illustrate, respectively, apparatus similar to that described in FIG. 1 with and without a tubular-like filter 34. In these embodiments, optical actuation pairs are used. FIG. 5C is a top view of the hook member 41.

Figure 6:
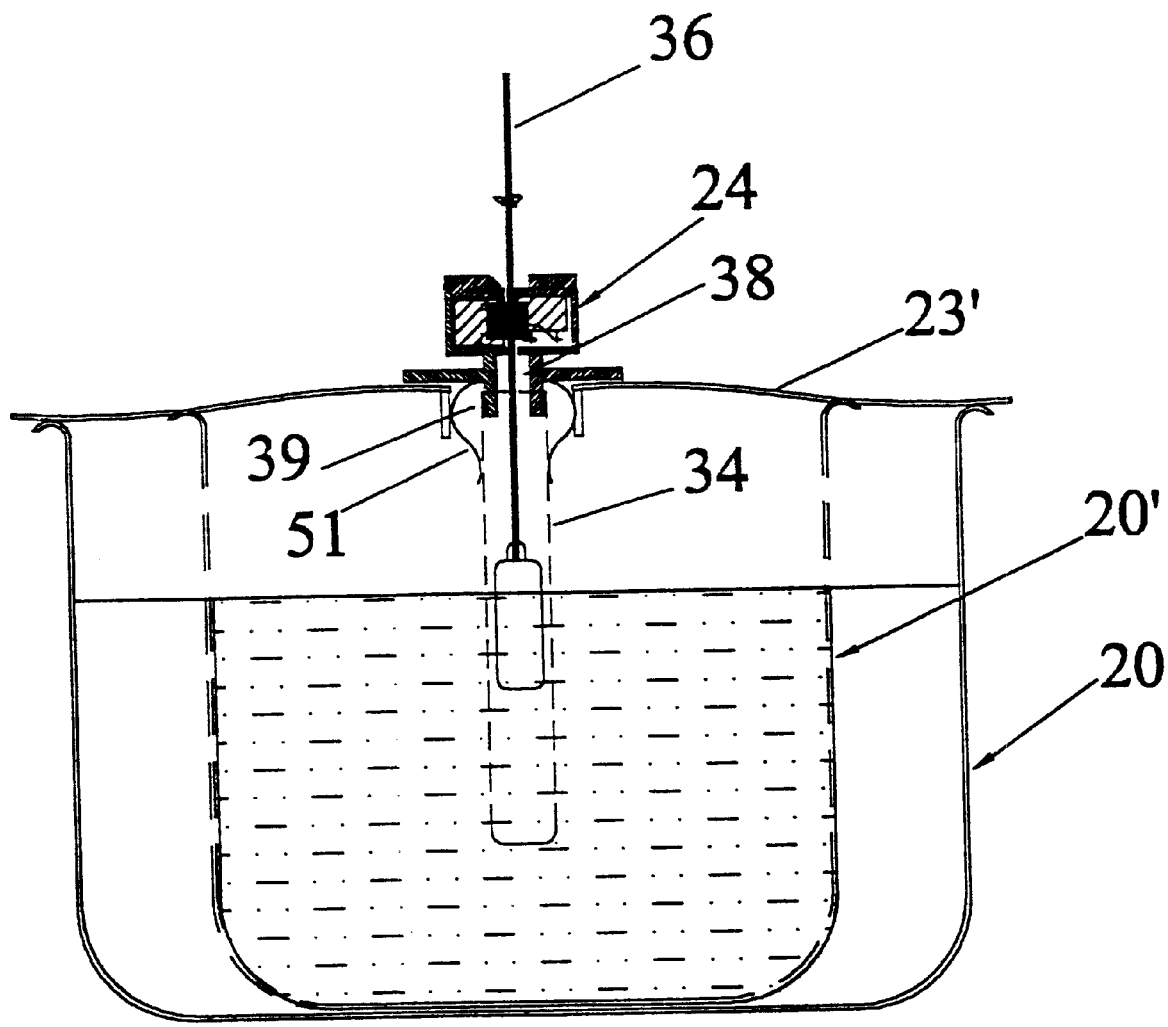
FIG. 6 illustrates the application of a liquid level apparatus, similar to that described in FIG. 1, to vessels of different sizes.

FIG. 6 is similar to FIG. 1, but shows a means for mounting the apparatus on a universal lid, wherein the universal lid 23' can be used for different sizes of vessels, though the dimensions of the liquid vessel may change. If the liquid vessel, as vessel 20, is of a size corresponding to that of the lid, the situation of FIG. 6 is similar to that of FIG. 1, but the same lid with the same liquid level apparatus can be used with a liquid vessel of smaller size, as indicated, in broken lines, by vessel 20'. Also, it is shown that by using an appropriate coupling member, like the spring-leaf 51, the apparatus can be mounted on lids with apertures of different diameter. In this embodiment, the aperture in the lid, which is indicated herein as 39, is larger than aperture 38 of FIG. 1, and, in order to firmly couple the sensing assembly 24 and the tubular-like filter 34 to lid 23', and to seal the vessel 20 at its top, a leaf spring 51 is provided.

FIGS. 7A1, A2 and 7B1 and B2 illustrate two different forms of extended floating rods by which the operation range of the apparatus can be controlled. In FIGS. 7A1 and 7A2, the floating rod has a telescopic structure, viz. comprises an outer tubular component 36' and an inner rod component 36", onto which the magnet 27' is fixed. By relatively sliding tube 36' and rod component 36", the length of the exposed rod, on which the user can displace the actuator to a selected level, can be changed. In the drawings, that length was increased from FIG. 7A1 to FIG. 7A2, and consequently, the displaceable range of the actuator along the rod was also increased. Practically, this change increases also the operation range of the apparatus.

In FIGS. 7B1 and 7B2, the same result is obtained by rendering the float 35 vertically adjustable, with respect to the rod 36. The float may be attached to an intermediate point of the rod, as seen in FIG. 7B1, or to the end thereof, as seen in FIG. 7B2, in which latter case, once again, the operation range of the apparatus can be changed. Usually, from the viewpoint of convenience, when the apparatus is not in use or when the maximum length of the extendable floating rod is not required during the operation of the apparatus, it should be kept as short as possible.

Figures 8A, 8B:
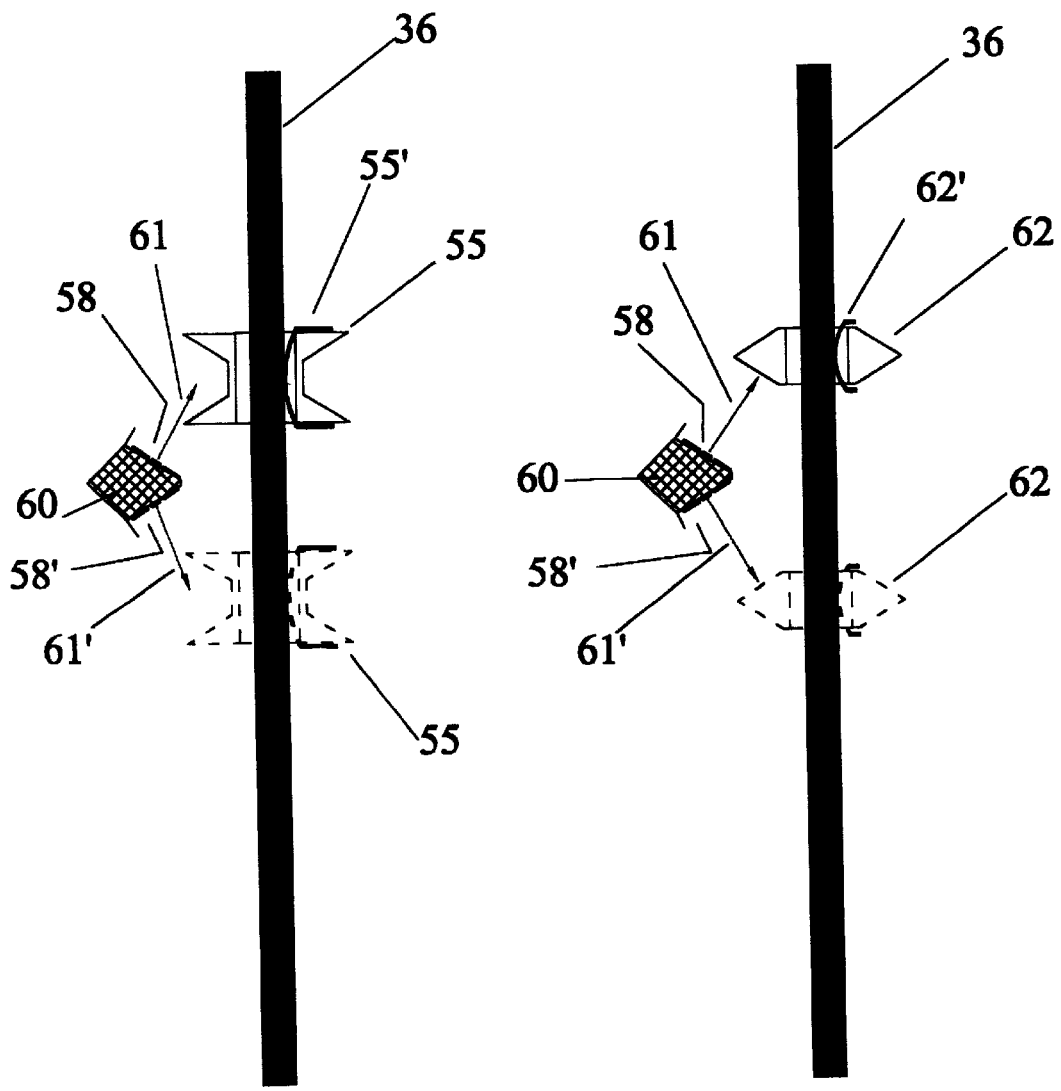
FIGS. 8A, B, C1 and C2 illustrate three different ways by which a single or double optical reflector can actuate an optical switch at two, significantly different, pre-selected levels, in an apparatus as that described in FIG. 1.

FIGS. 8A, B, C1 and C2 illustrate, as an example, the operation of three optical reflectors, each of different geometry, that can be used as optical actuators in apparatus of FIG. 1. Member 60, which is part of the sensing assembly, includes a light source, e.g. a LED in the, which emits split focused light in two different directions 61 and 61' and two integrated photodiode switches 58 and 58'. Variously shaped reflectors 55, 62 and 63–64, the last of which are a pair, operate as actuators, by reflecting the light emitted by the LED. However, while each of reflectors 55 and 62 has two optical reflection surfaces, one faced up and the other is faced down, each of reflectors 63 and 64 has only one optical reflection surface. In operation, when the reflected light, sensed by the integrated photodiode switch 60, is different from the threshold value, actuation will occur and consequently an output signal will be activated. Elastic means, such as 55', 62' and 63' and 64', hold the reflectors in position along the rod 36, while being sufficiently yieldable to permit sliding them along the rod to set the activating level or levels. If one considers FIG. 8A, it will be apparent that no reflected light is sensed by photodiode 58 as long as the reflector 55 is too high as a result of a high liquid level. However, as the liquid level decreases, reflector 55 will reach a level where the light emitted by the LED will be reflected by its upper reflection surface to hit photodiode 58 and, consequently, to activate an output signal. As the liquid level becomes still lower, no light will be sensed by photodiode 58 until reflector 55 reaches a lower position, shown as broken lines in FIG. 8A, where the light 61' will be reflected by the upper reflection surface of reflector 55, to hit photodiode 58' and consequently to activate a second output signal. Practically, the first output signal may be an alarm and the second one can be a safety signal.

The operation of the embodiment of FIG. 8B is essentially similar to that of FIG. 8A and the drawing requires no further explanation.

In the embodiment of FIG. 8C, on the other hand, two optical reflectors 63 and 64 are mounted on rod 36 at different levels and each reflector has s single reflecting surface. Once again two separate output signals are generated at two different activating levels, but greater freedom is attained in setting the activating levels, because their difference does not depend only on the angles of the reflecting surfaces, as in FIGS. 8A and B, but also on the distance between reflectors 63 and 64, which can be varied as desired.

FIGS. 9A, B, C are vertical cross-sectional views, and FIG. 9D is a top view, of another type of optical actuation-pair. FIGS. 9A, B and C illustrate, for the same sensing assembly 24", three optical situation with relative locations of the optical actuation pair, during the drop in the liquid level in the vessel (not shown). In the present optical embodiment, light source 60" and optical detector 58", which are part of the sensing assembly 24", are arranged in such way that light emitted from source 60" can reach the detector 58" when opaque body 27", the actuator, is out of the light path 61". FIG. 9A presents a situation when the liquid level, within the vessel, is such that the opaque body 27" is above the light direction 61" and light 61" hits the detector 58". FIG. 9B presents the situation when the liquid level dropped, to bring opaque body 27" to the light path 61" to stop light 61" from hitting detector 58". In such situation, the control unit, not shown, generates an output signal, such as an alarm. As the level of the liquid continues to drop, opaque body 27" reaches a lower level, presented in FIG. 9C, where it does not block, anymore, the light 61" from reaching detector 58". At this point, the control unit can generate a second output signal, for example, to shut-off the power supply of the heating source. One of the various means by which the difference in the liquid levels, corresponding to those at which the first and the second output signals will be generated, can be adjusted is by changing the length of opaque body 27".

Figures 10A, 10B:
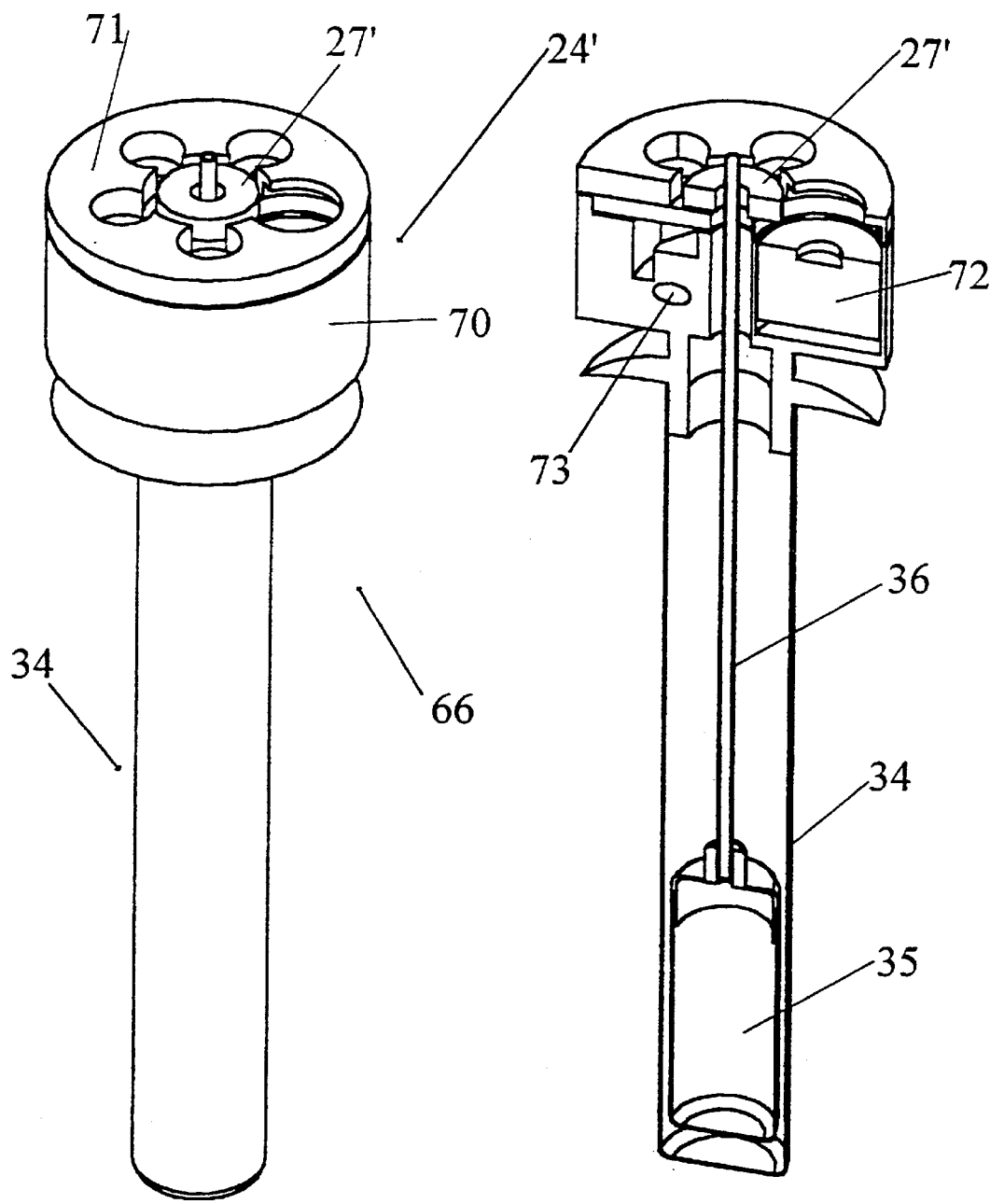
FIGS. 10A, B illustrate, in perspective and perspective cross-section, respectively, a liquid level monitoring and control apparatus, according to FIG. 1, the various components of which are integrated into a kit.

FIGS. 10A, and 10B are perspective views of a kit designed according to the aspect of the invention illustrated in FIG. 1. The kit, which can be applied to the lid of the vessel, as has been already shown before, is transferable from one vessel to another. In FIG. 10A, the kit is generally indicated at 66, and comprises a sensing assembly 24' an actuator magnet 27', and a tubular-like screen filter 34. FIG. 10B is a perspective axial cross-section of the kit 66, showing the float 35, the rod 36 and some components of the sensing assembly like the buzzer 72 and the reed switch 73.

Figure 11:
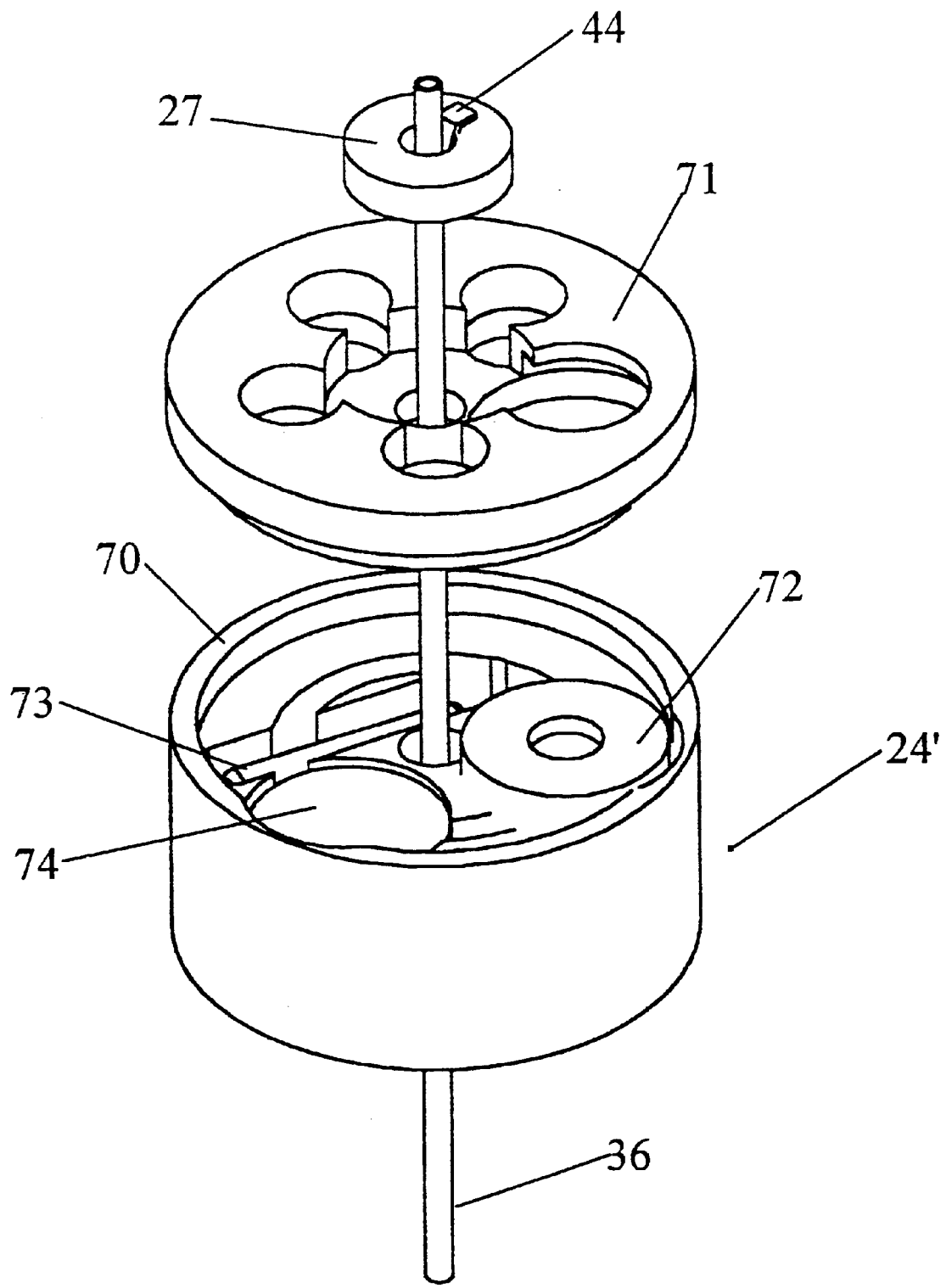
FIG. 11 is an exploded perspective view of some components of the kit described in FIGS. 10A and 10B.
Figure 12:
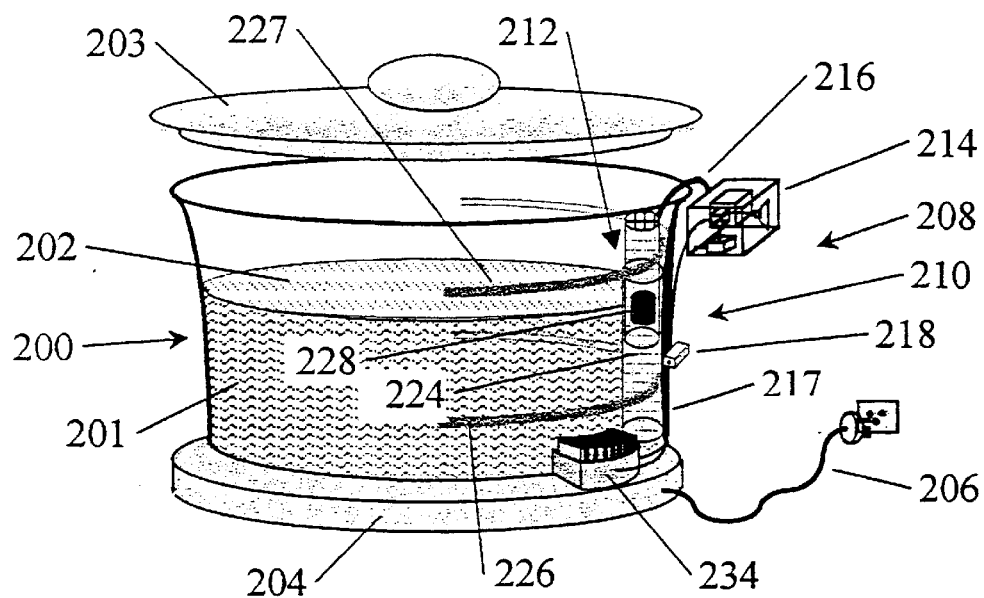
FIG. 12 is a perspective view of a cooking pot with a liquid level apparatus configured according to an embodiment of Mode A of the second aspect of the present invention.

FIG. 11, is an exploded perspective view, mainly of the sensing assembly of the kit shown in FIGS. 10A and 10B. The casing of the sensing assembly comprises a body 70 and a lid 71, provided with the openings for the aeration of the components of the sensing assembly, in order to avoid overheating, each opening having a size matching the cooling requirements of the underlying component. These components comprise a buzzer 72, a reed switch 73 and a battery 74. The opening above buzzer 72 is provided for minimizing the blockage of the audio signal.

FIGS. 12 to 26 illustrate several embodiments according to a second aspect of the invention. Reference is first made to FIGS. 12–16, showing a cooking pot 200 containing a liquid 201 at a level 202, provided with a lid 203 and an integral electric heating unit 204, receiving electric power through mains lead 206. Fixed to the cooking pot is a liquid level control apparatus, generally designated at 208, comprising a magnetic switch assembly 210 disposed on the cooking pot's exterior surface, a floating magnet assembly 212 in the cooking pot's interior, and a control apparatus 214, mounted on the cooking pot by means of a hook member 216. The magnetic switch assembly and the control apparatus, together, constitute in this case the sensing assembly.

Magnetic switch assembly 210 consists of a support rod 217 and a displaceable magnetically actuated switch 218 mounted on the rod 217 by means of a sliding element 220, whereby the switch can be fixed at various levels along rod 217. Rod 217 is composed of two parts, 217' and 217", one fitted telescopically into the other, to allow it to assume various lengths for fitting on different vessels.

Floating magnet assembly 212 has a floating magnet retaining sleeve 224, which is the guide sleeve, and a floating magnet device 228, which is accommodated within sleeve 224. Sleeve 224 is made of net and therefore in liquid flow communication with liquid 201 in cooking pot 200, and is supported in place by means of spring-leaf support members 226 and 227 that are attached to sleeve 224.

The control apparatus comprises a control device 230, a retractable-type electrical wiring 232 and an indicator member 233, which, in this specific case, is an audio signal generator, e.g., a loudspeaker. As will be appreciated, the signal may be other than audio, e.g., a light signal.

The apparatus further comprises a thermoelectric unit 234, which generates electricity by the heat provided by heating plate 204.

In operation, the user sets the level of magnetic switch 218, as desired, and then, if the level of the liquid decreases such that the floating magnet member 228 is at the level of switch 218, an alarm signal is generated.

Figure 16:
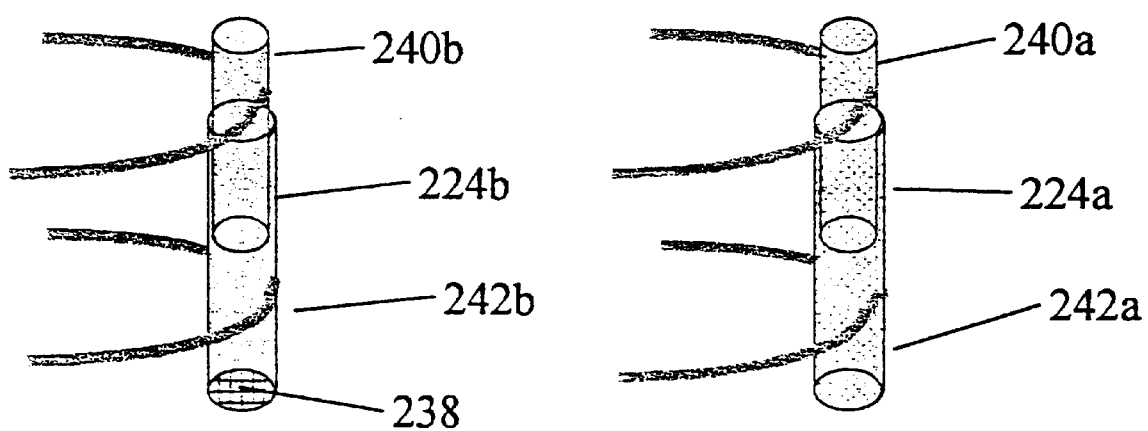
FIG. 16 shows two embodiments of the extendable sleeve-like member accommodating the magnetic device.

Retaining sleeve 224 may have various configurations, of which two embodiments are shown in FIG. 16. Sleeve 240a–242a, shown at the right of FIG. 16, comprises a tubular net, and sleeve 240b–242b, shown at the left of FIG. 16, comprises a tube with a bottom open end, which in this specific case is fitted with a sieve 238, so as to assure that the magnet is retained therein. As can be seen, both sleeve members comprise two portions, 240a, 240b and 242a, 242b, with the former fitted into the latter in a telescopic manner, to allow the retaining sleeve member to assume various lengths, whereby it can be fitted into different containers.

Similarly, the sensing and control assembly 230 is removable for fixing onto different containers.

Figure 17:
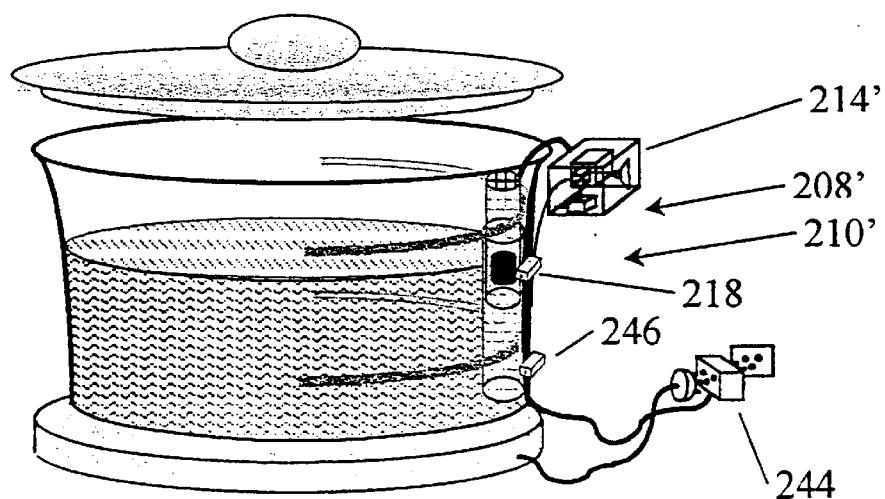
FIG. 17 is a perspective view of a cooking pot comprising a liquid level apparatus, which is similar, but with some modifications, to the embodiment of FIG. 12.
Figure 13:
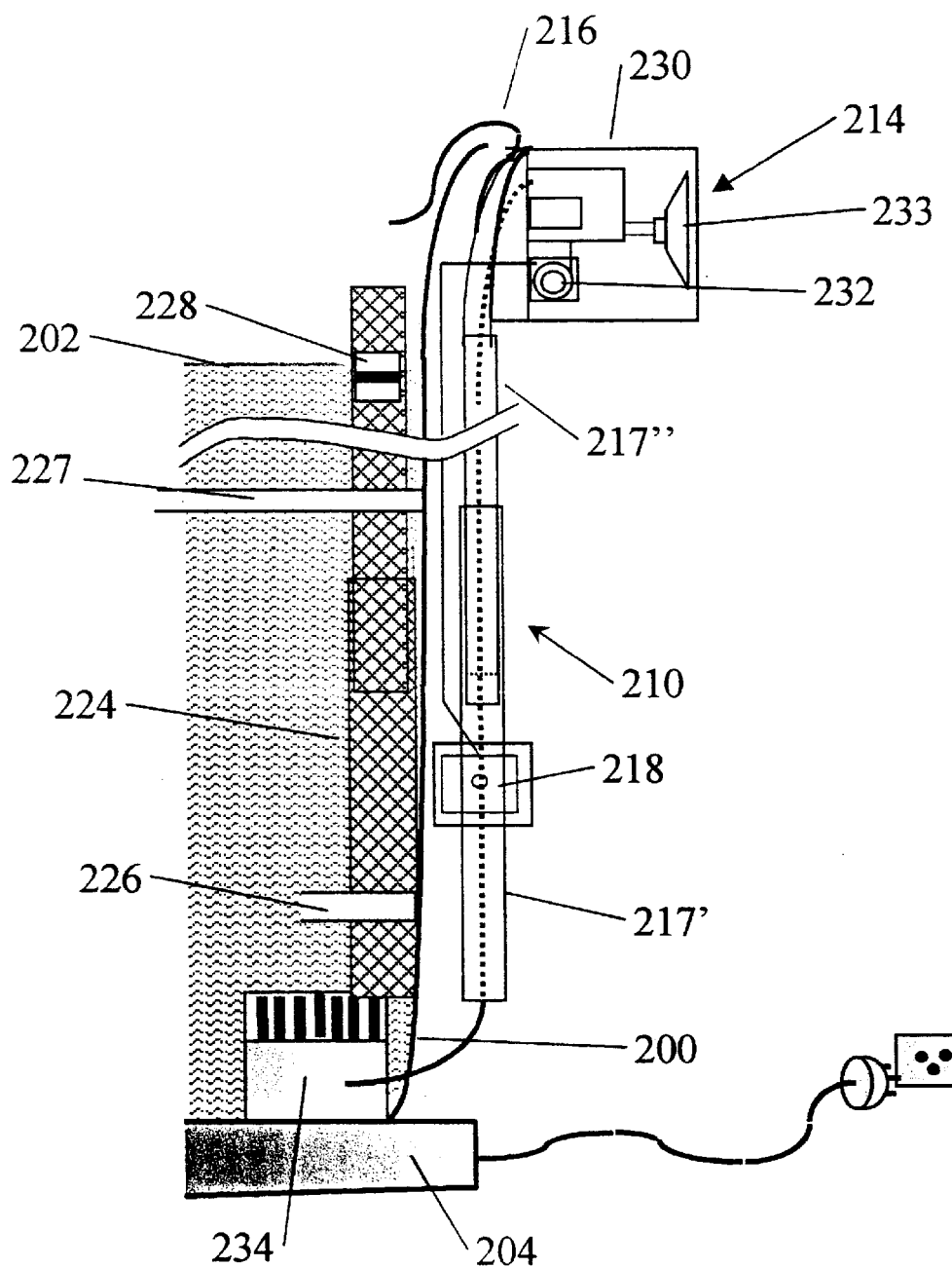
FIG. 13 is a close-up cross-sectional view of the liquid level control apparatus of FIG. 1.
Figure 14:
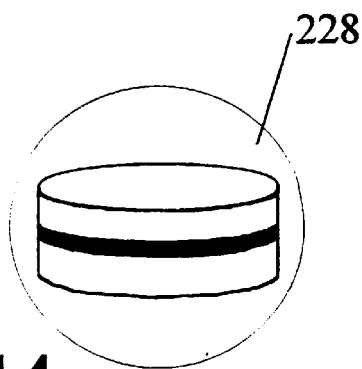
FIGS. 14 and 15 are enlarged perspective views of the two components, the floating magnet device and the magnetic switch, respectively, of the liquid level control apparatus of FIG. 13.
Figure 15:
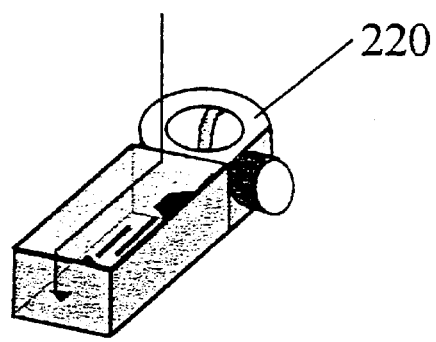

FIG. 17 illustrates an apparatus embodiment very similar to that of FIG. 11 but with some modifications. The difference between the embodiments of FIG. 17 and that of FIG. 12 lies in the presence, in FIG. 17, of circuit breaker 244, and a second magnetic switch 246, in addition to switch 218. Circuit breaker 244 provides the electric power supply to control apparatus 214', and is further capable of disconnecting the electric power supply to mains lead 206. In the case of this embodiment, if the liquid level falls to the level of magnetic switch 218, an alarm is generated. If the level is reduced further to the level of magnetic switch 246, in addition to an alarm, the control apparatus disconnects the electric supply to main lead 206, whereby heating is terminated. It will be appreciated that the switching off of the heat source may be achieved by various means other than those shown. For example, in the case of a gas heater, the control apparatus may switch off the gas supply by providing an electric signal to an electric switch in the gas system.

Reference is now made to FIG. 18, showing the electric kettle 250 containing a liquid 251 at a level 252, having a lid 253, and an integral heating element 254, connected to mains lead 256. The kettle has a hollow handle 258, which is in liquid flow communication with the interior of kettle 250, and accommodates a floating magnet member 260, shown in perspective view in FIG. 19. In this case, the magnet has the shape of an annulus. The hollow handle, in this case, is a guide sleeve. Fitted on the external surface of handle 258 are a liquid level sensing and control apparatus 262, comprising a telescopic sliding support member 264, a sensing and control device 266 which includes a magnetic switch 267 attached to a control member 268, shown in perspective view in FIG. 20. Thus, when the liquid level decreases to a level below that set by the user, an alarm signal is generated.

Figure 21:
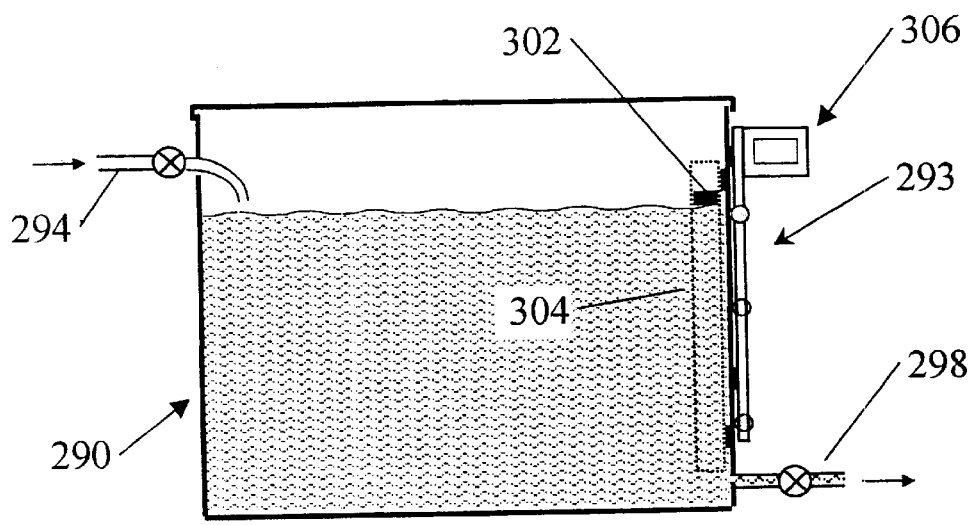
FIGS. 21 and 22 show two embodiments of a liquid reservoir fitted with a liquid level apparatus configured according to Mode-A and Mode-B, respectively, embodiments of the invention.
Figure 23:
FIG. 23 is an enlarged perspective view of the floating magnet device of the liquid level control apparatus of FIG. 21.
Figure 22:
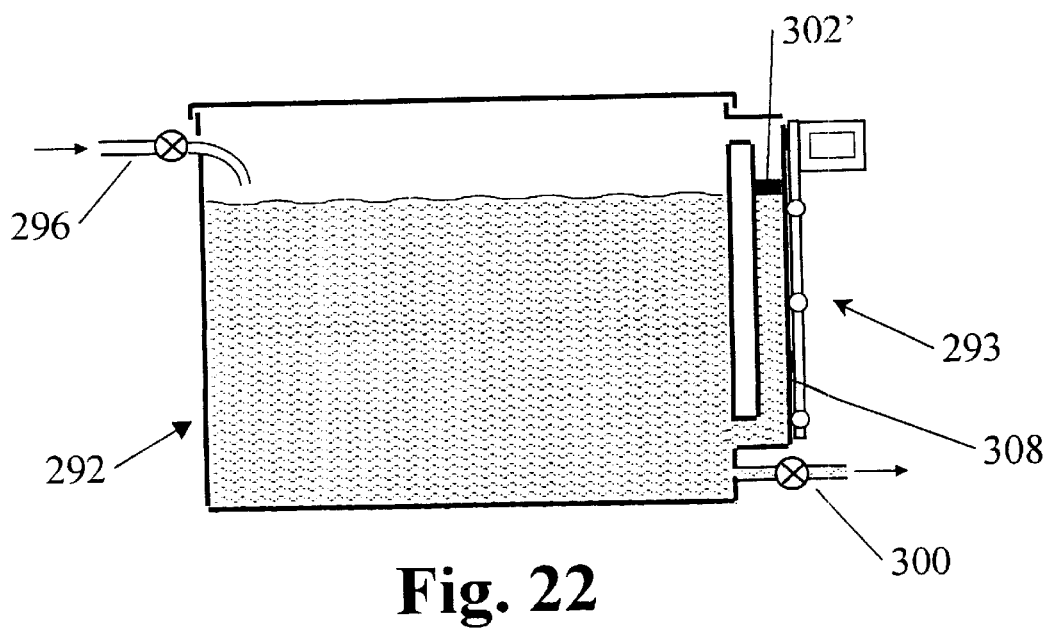

FIGS. 21 and 22 show two liquid reservoirs, 290 and 292, which are fitted each with liquid level control apparatus, 293 and 293' respectively, and having respective liquid inlets 294 and 296, and respective outlets, 298 and 300. In FIG. 21, reservoir 290 has a floating magnet member 302, accommodated within a sleeve 304, within the reservoir, and a sensing and control unit assembly 306, as that described in FIG. 12. In distinction from FIG. 21, the liquid level apparatus in the embodiment of FIG. 22 is very similar to that described in FIG. 18, with a magnetic accommodating tube, 308, accommodating magnet 302', but otherwise, the manner of the sensing and control assembly in the embodiment of FIG. 22 is essentially similar to that of FIG. 21.

Figure 24:
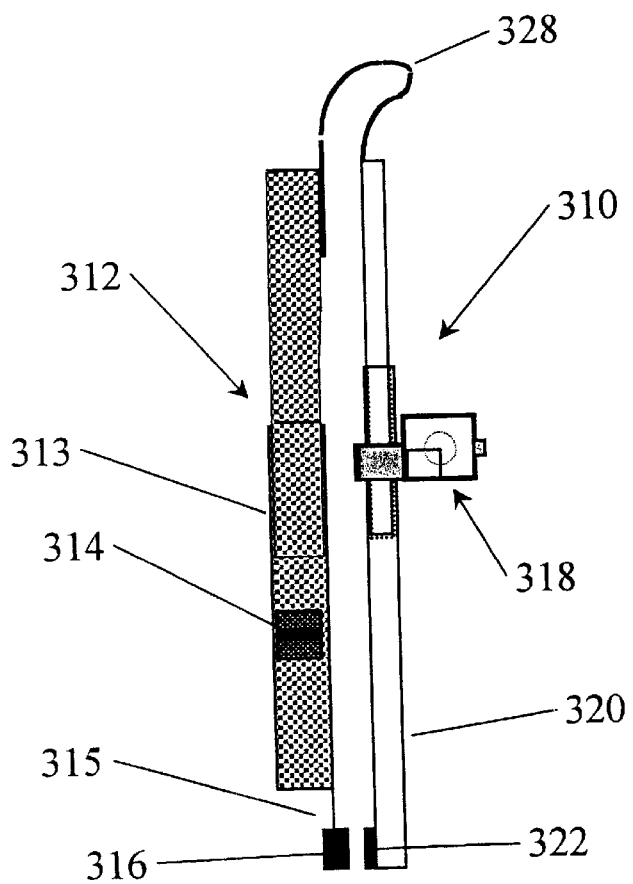
FIG. 24 shows a longitudinal cross-sectional view of a liquid level apparatus kit designed according to Mode-A configuration.
Figure 26:
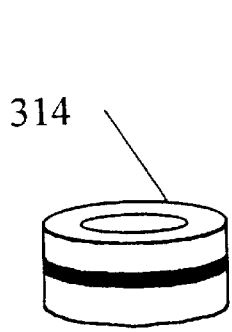
FIGS. 25 and 26 are enlarged perspective views of the sensing unit and of the float of the liquid level vertical apparatus in FIG. 24.
Figure 25:
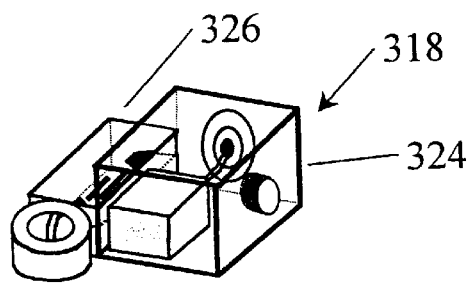

Reference is now made to FIG. 24, showing an embodiment of a liquid level control apparatus kit of said second aspect of the invention. The liquid level apparatus kit 310 comprises: a floating magnet assembly 312, which includes a telescopic sleeve-like net 313, holding a floating magnet 314 and fitted at its bottom with a magnet support member 315 holding a magnet 316 and a sensing and control assembly 318, including a telescopic sliding support member 320, fitted at its bottom with a magnet 322 with its magnetic poles being such so as to be attracted to magnet 316, and a control device 324 accommodating a magnetic switch 326, shown in perspective view in FIG. 25. The floating magnet unit assembly 312 and the sensing unit assembly 318 are connected to each other by a pliable wire or band 328. In the use of the liquid level apparatus kit 310, the floating magnet assembly 312 is positioned inside a vessel (not shown), while the sensing unit assembly 318 is positioned outside the vessel. The floating magnet assembly and the sensing and control assembly are kept in close proximity to the vessel's interior wall and to the exterior wall, respectively, and also to each other by the pliable wire or band 328 at the top, and by the two magnets 316 and 322 at the bottom. The function of the control apparatus kit 310 is similar to that described in connection with the previous embodiments, and reference is made to the description of these latter for a more detailed explanation.

Figure 27:
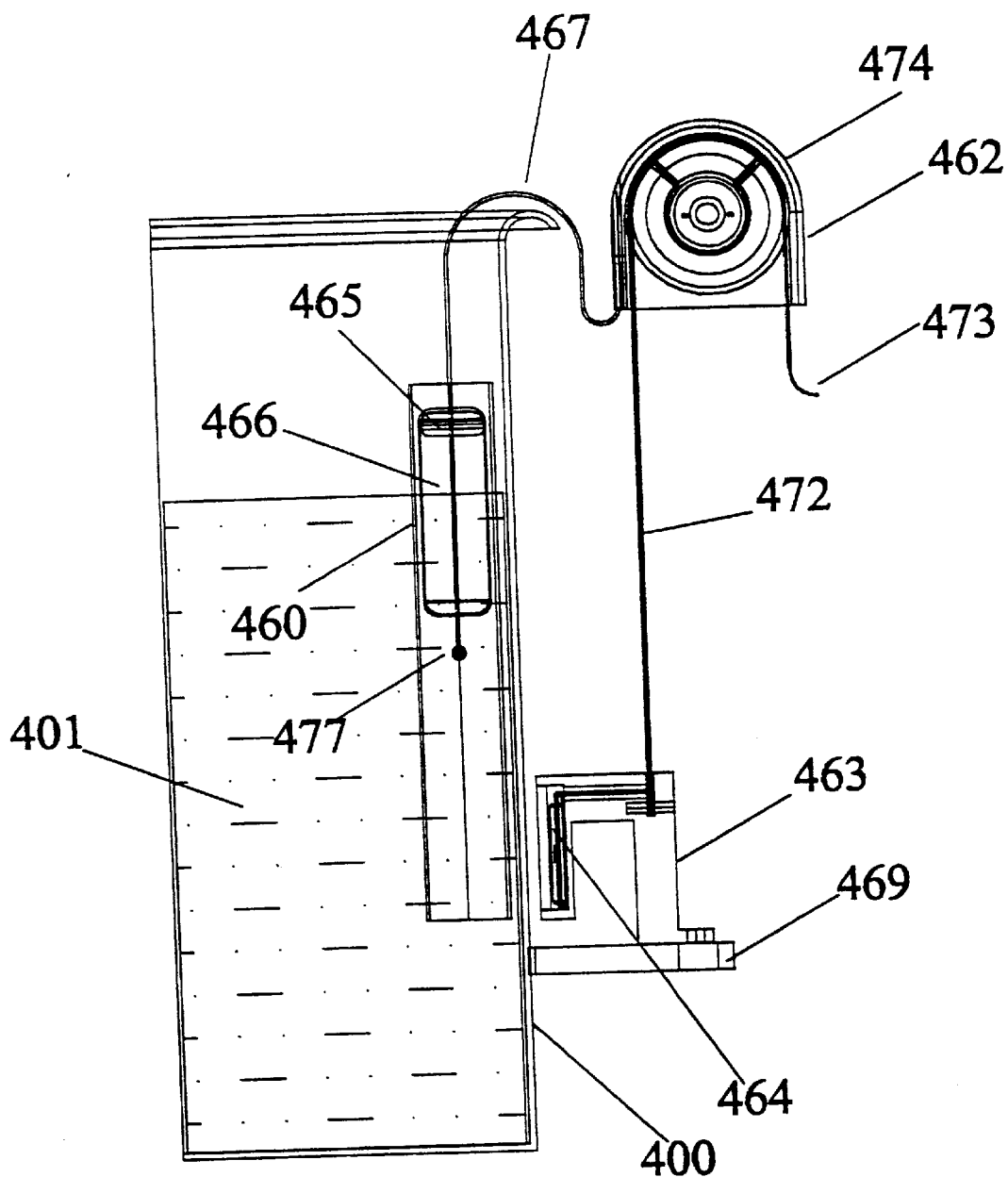
FIG. 27, illustrates a vertical cross-sectional view of another liquid level control apparatus, configured according to Mode-A of the present invention.
Figure 28A:
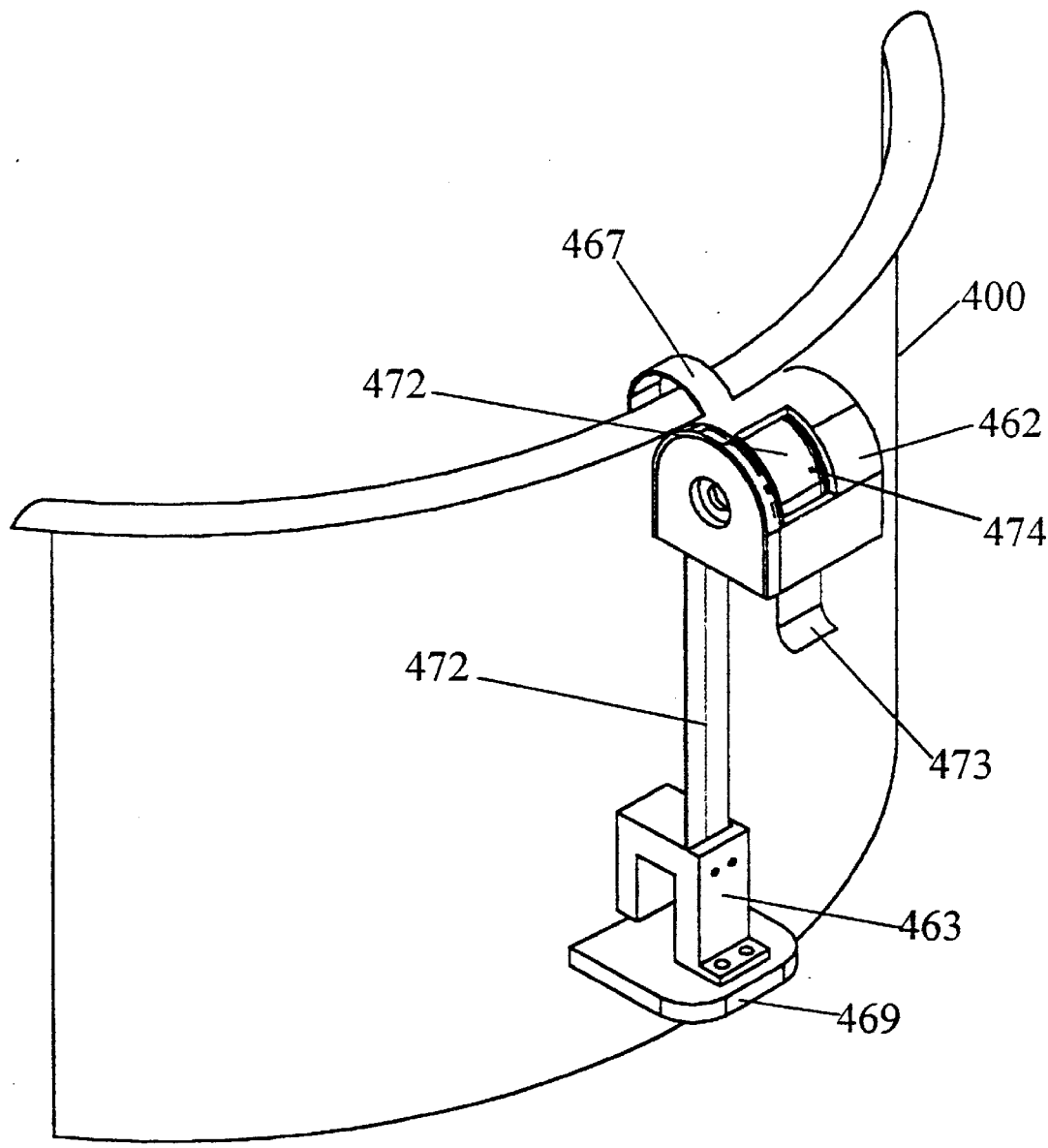
FIGS. 28A and B are, respectively, perspective views of the apparatus shown in FIG. 27, and enlarged cross-sectional view for part of the sensing assembly.

FIG. 27 illustrates another embodiment of liquid-level apparatus according Mode-A of the present invention. FIG. 27 illustrates a liquid vessel 400, partially shown; a guide screened sleeve 460, in which a floating magnet, comprising a permanent magnet 465 encapsulated within float 466, is located; the housing and the suspensions of the various parts of the apparatus. The sleeve 460, preferably made of mesh material, has free flow communication with the liquid 401 in vessel 400. In this embodiment, the components of the sensing assembly are contained in housing 462, except the magnetic switch 464, which is housed in a base 463. The housing 462 also houses a strap 472 made of a couple of conjugated elastic stainless steel leaf springs which are electrically insulated from each other by an appropriate coating. The strap 472 has several, very important, functions: a) it supports the magnetic switch 464, by holding the magnetic switch housing 463; b) it enables to set the magnetic switch at a selected level; c) it serves as the electrical connection between the magnetic switch located in base 463, to other components of the sensing assembly located within housing 462; d) during operation, thanks to the elasticity of the leaf-springs of which it is made, it keeps the magnetic switch always in intimate contact with the vessel's wall 400, whereby to bring said magnetic switch as close as possible to the path of the floating magnet located inside the vessel. The adjustment of the magnetic switch 464, to any selected level, is done by drawing the strap 472 in or paying it out by its terminal portion 473, or by drawing the strap 472 through the window 474 of housing 462, as is also shown in FIG. 28A. The bending of strap 472 in housing 462, in addition of reducing the space of the apparatus, also prevents the strap 472 from sliding down by gravity. The plate 469, which is the lower part of the magnetic switch housing 463, keeps the magnetic switch from being overheated by the heat-source (not shown) located under vessel 400.

Figure 28B:
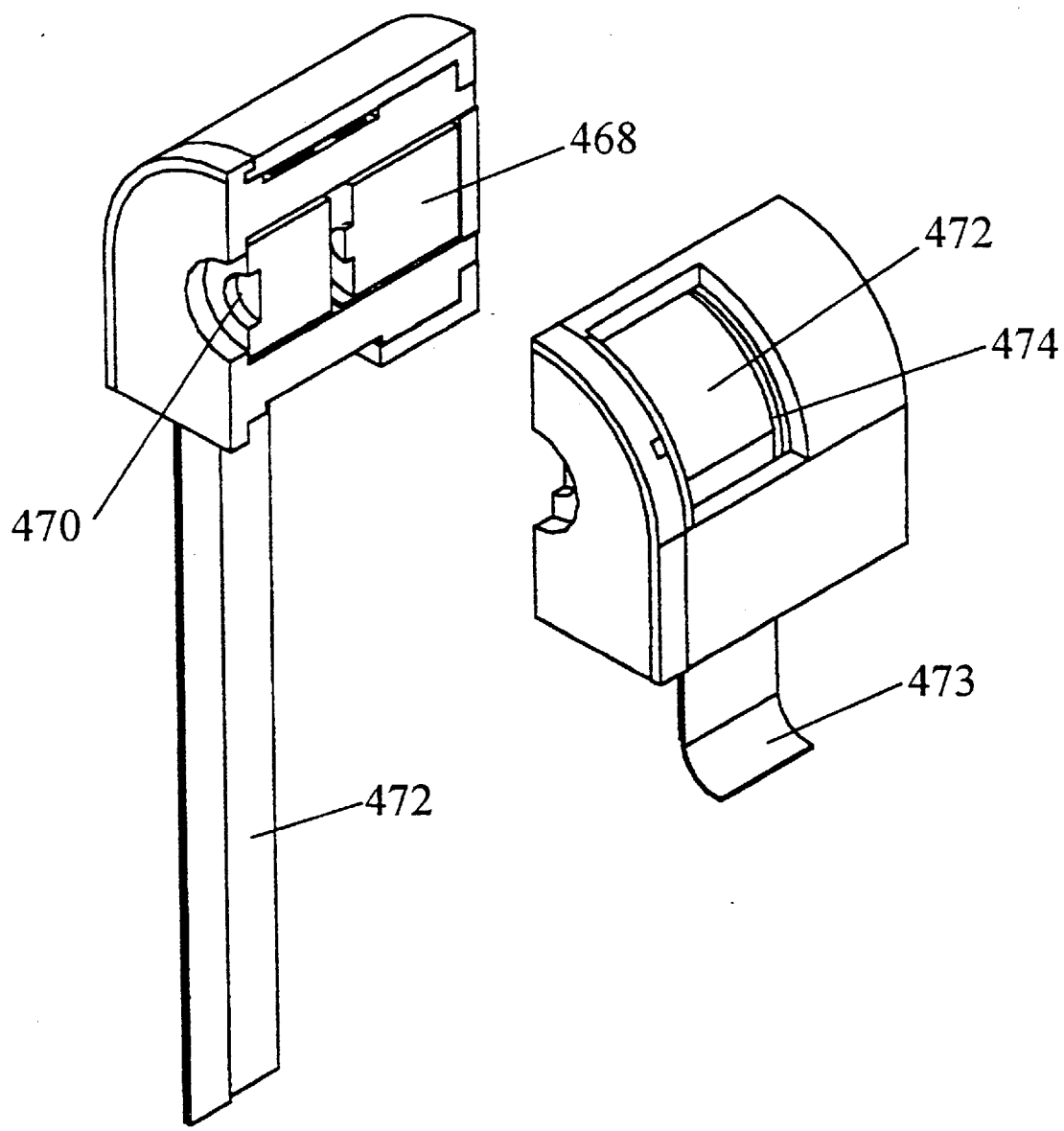

FIGS. 28A and 28B, are perspective views of the items of FIG. 27, and with the same numbering of the items. As can be seen in FIG. 28B, all the components of the sensing assembly, except the magnetic switch 464, are compactly arranged inside the housing 462. In these components are included a battery 468 and a buzzer 470. The opening (window) 474 in housing 462 has a dual purposes: a) it is a place where the user can draw, by his or her finger, the strap 472 for adjusting the level of the magnetic switch 464; b) graduated marks (not shown) on the strap 472, which can be seen through the window 474, provides a visual mark of the liquid level at which magnetic switch 464 will be actuated.

Figure 29:
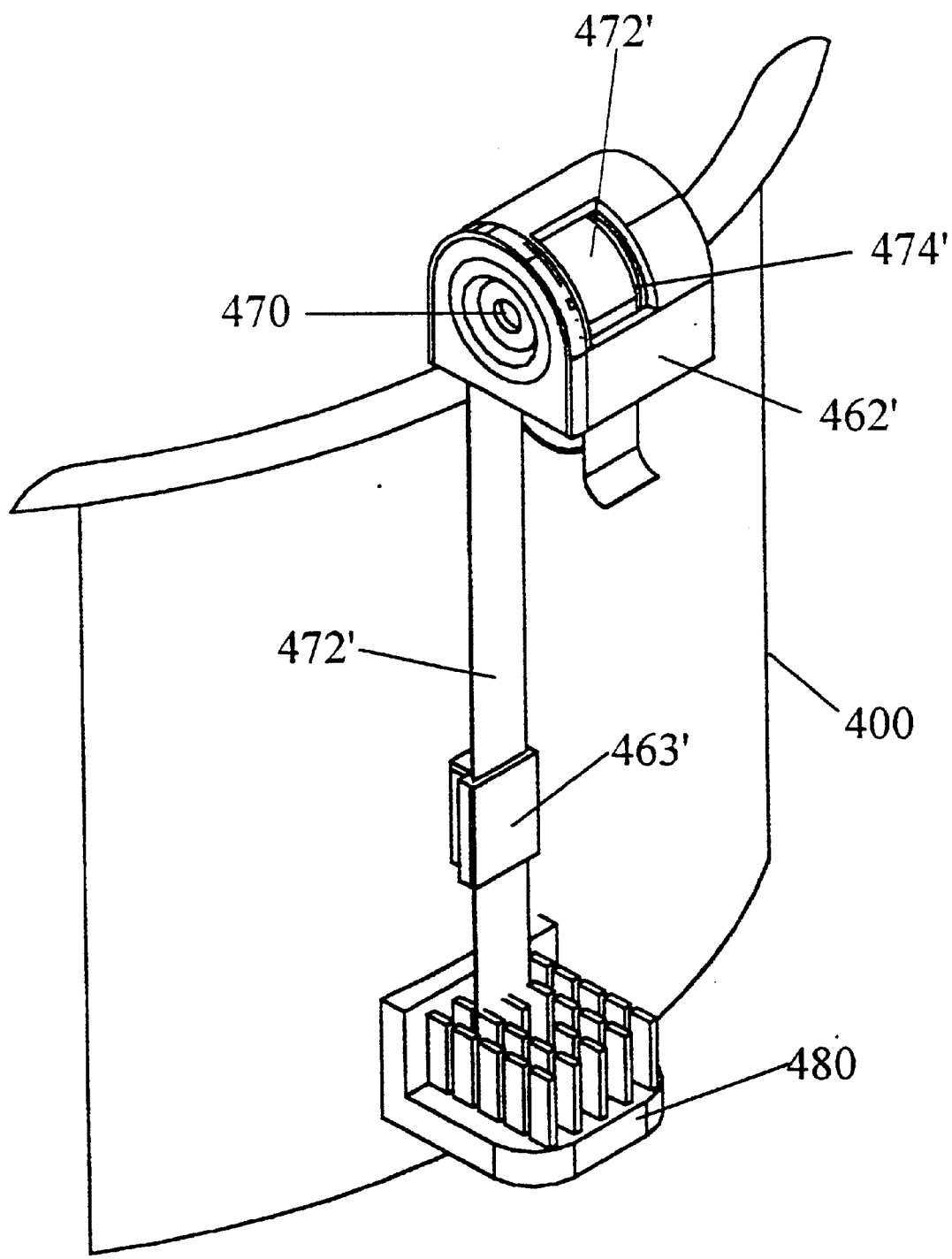
FIG. 29, is a perspective view of a liquid level apparatus, similar to that of FIG. 28, comprising a thermoelectric generator.

FIG. 29 illustrates an apparatus similar to that of FIG. 28, with some modifications. In the embodiment of FIG. 29 the housing 462' does not contain a battery as a power supply. Instead, a thermoelectric generator 480, located under magnetic switch 463', powers the buzzer 470. Like strap 472 of FIG. 28, strap 472' in the present embodiment comprises two conjugated and electrically insulated straps. Also, like strap 472 of FIG. 28, strap 472', has several functions: a) it supports the thermoelectric generator 480, which is hung on it; b) it enables the adjustment of the level of the thermoelectric generator 480 by a mechanism similar to that described for the adjustment of the level of magnetic switch housing 463 of FIG. 28; c) it serves as the electrical communication between the magnetic switch (not shown), the thermoelectric generator 480 and other parts of the sensing assembly, located in housing 462'. In addition, strap 472', which slidingly passes through magnetic switch housing 463', enables manually to displace, by sliding mechanism, magnetic switch housing 463', in which the magnetic switch (not shown) is located, and to fix it at any selected level. In this embodiment of FIG. 29, the thermoelectric generator 480 has dual functions. Firstly, it supplies power to the buzzer 470 and secondly, since it is in close intimate contact with the wall of the heated vessel 400, it protects the magnetic switch from any overheating that can be caused by the heat source (not shown) located under vessel 400.

Figure 30:
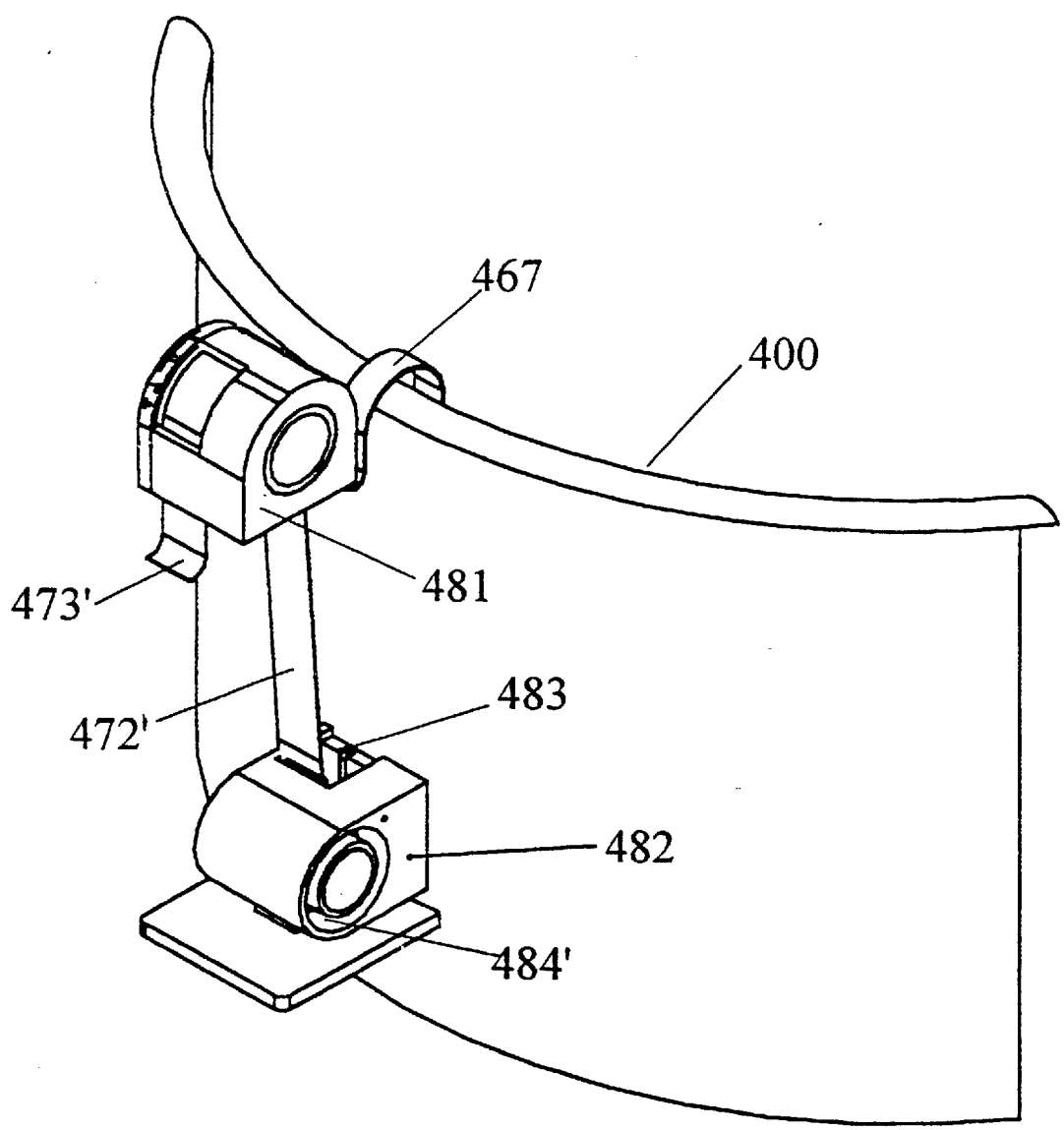
FIG. 30 illustrates in perspective view another embodiment of liquid level apparatus, similar to FIG. 27, in which almost all components of the sensing assembly are packaged within one compact compartment, and suspended by a spring-leaf member.
Figure 31:
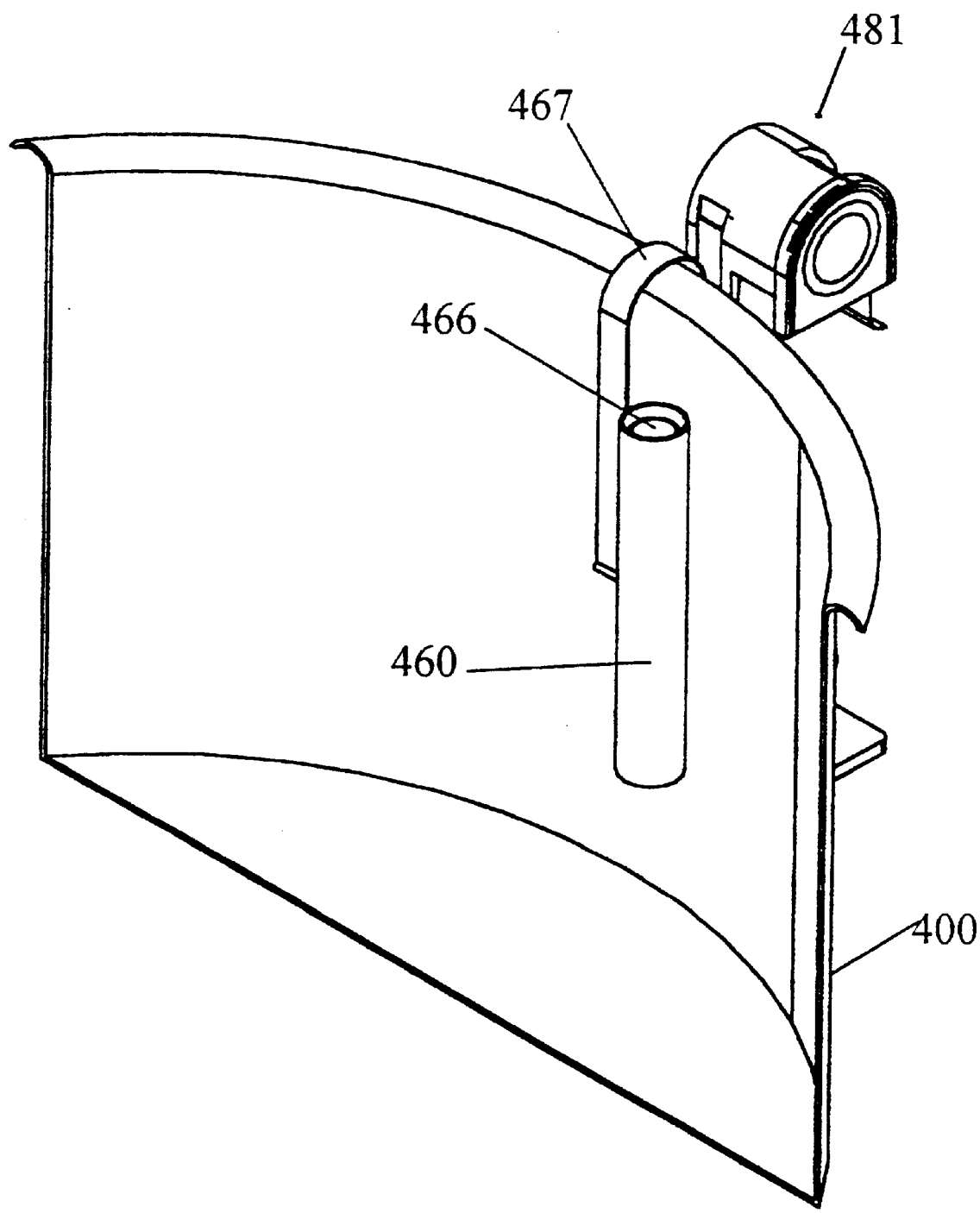
FIG. 31 is a perspective view opposite to FIG. 30.
Figure 32C:
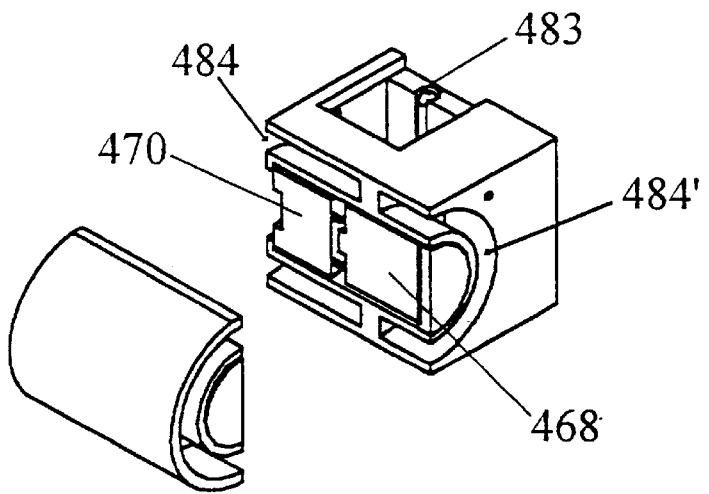
FIGS. 32A, B and C illustrate in detail the sensing assembly of FIG. 30.
Figure 32B:
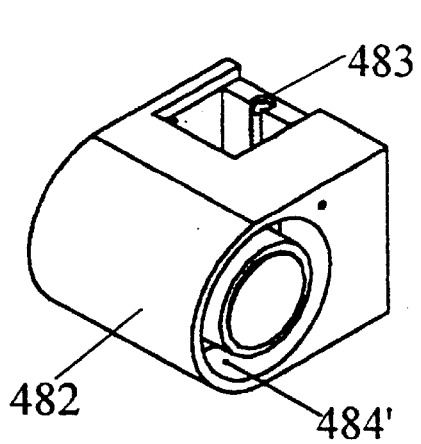
Figure 32A:
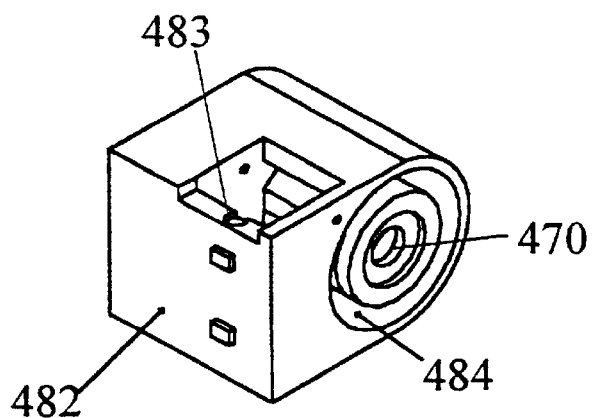

Reference is now made to FIGS. 30 to 32, which are perspective views of another embodiment similar, in some sort, to that of FIG. 28. Contrary to FIG. 28, in the embodiment of FIGS. 30 to 32 all of the elements of the sensing assembly are housed in a housing 482, and housing 481, which is hung on the vessel's rim by a hook 467, functions as a support to strap 472'. The sensing assembly has the structure illustrated in FIG. 32, which shows an outer perspective view seen from two opposite directions in FIGS. 32A and B, while it is seen in exploded view, divided into two parts, in FIG. 32C.

As seen in FIGS. 32A to 32C, housing 482 which has in both sides aeration openings 484 and 484' for preventing overheating, contains a reed switch 483, a battery 468 and a buzzer 470. The strap 472' of FIG. 30 functions in a similar way to that of strap 472 of FIG. 27, except that in the embodiment of FIG. 30 strap 472' is not used for electrical communication.

Figure 33:
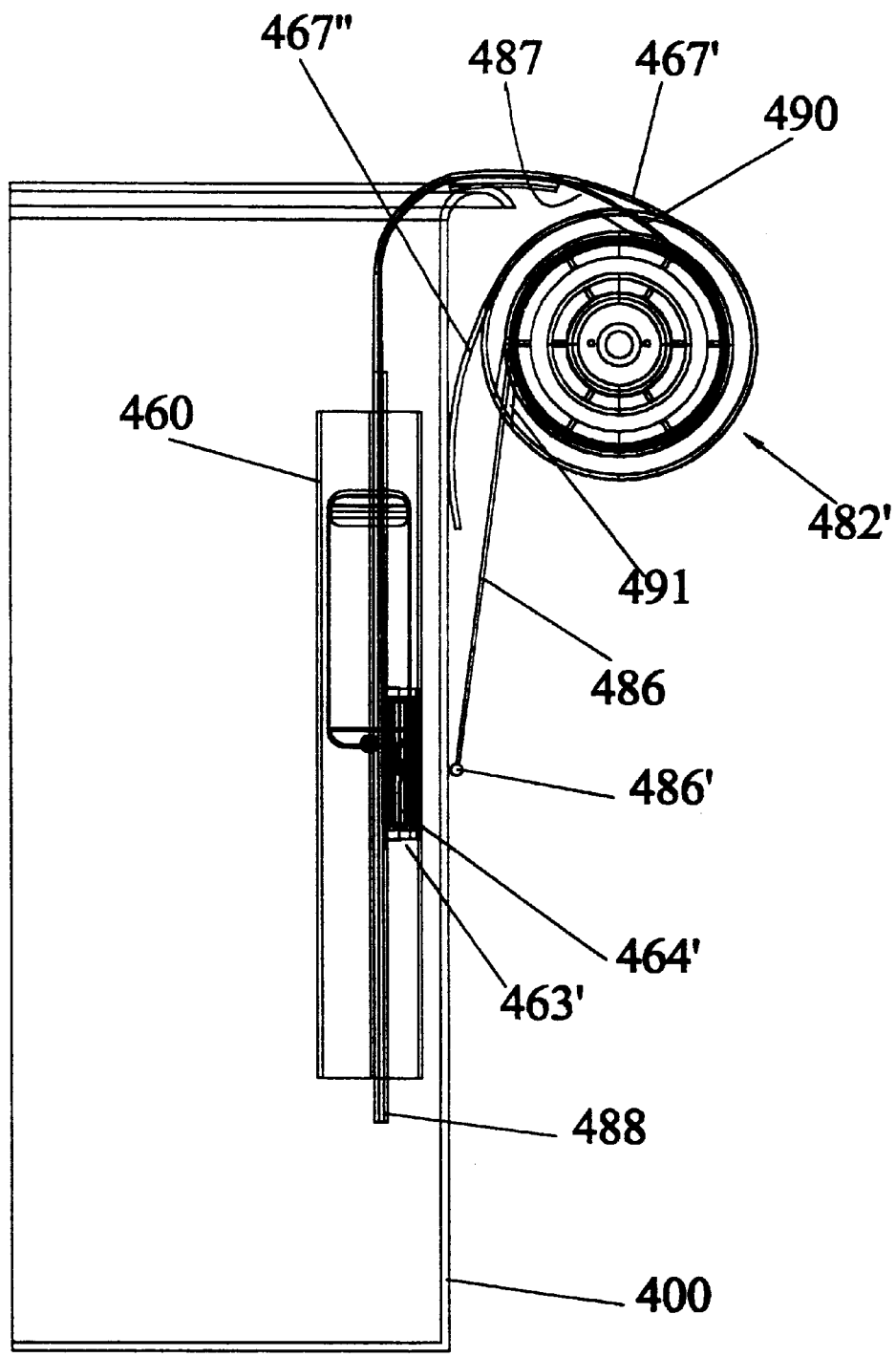
FIG. 33, is a vertical cross-sectional view of liquid level apparatus, similar to that of FIG. 27, in which the displaceable magnet is located and displaced along the interior side of the vessel's wall.
Figure 34:
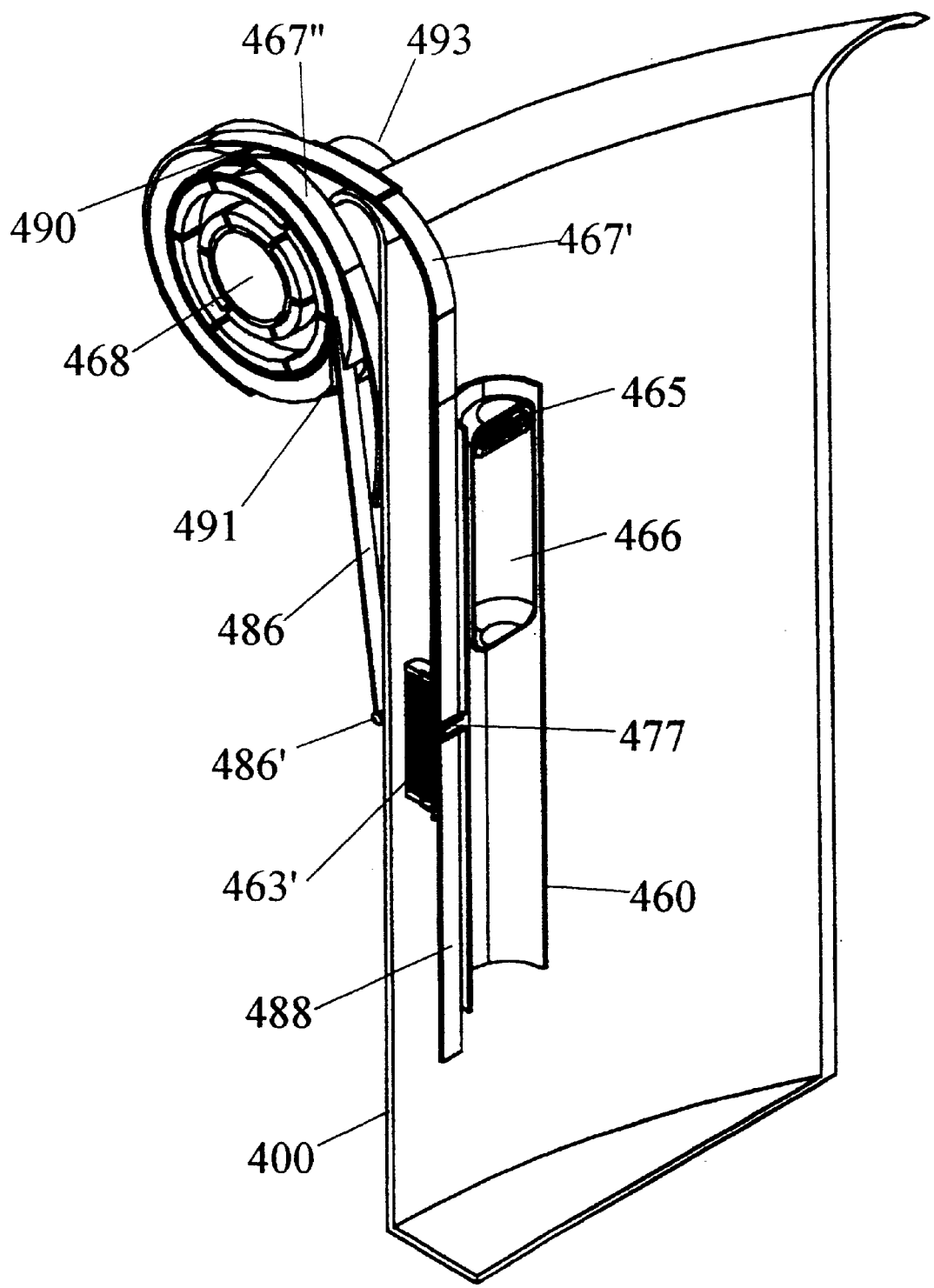
FIG. 34 is a perspective vertical cross-sectional view of the apparatus of FIG. 33.
Figure 36:
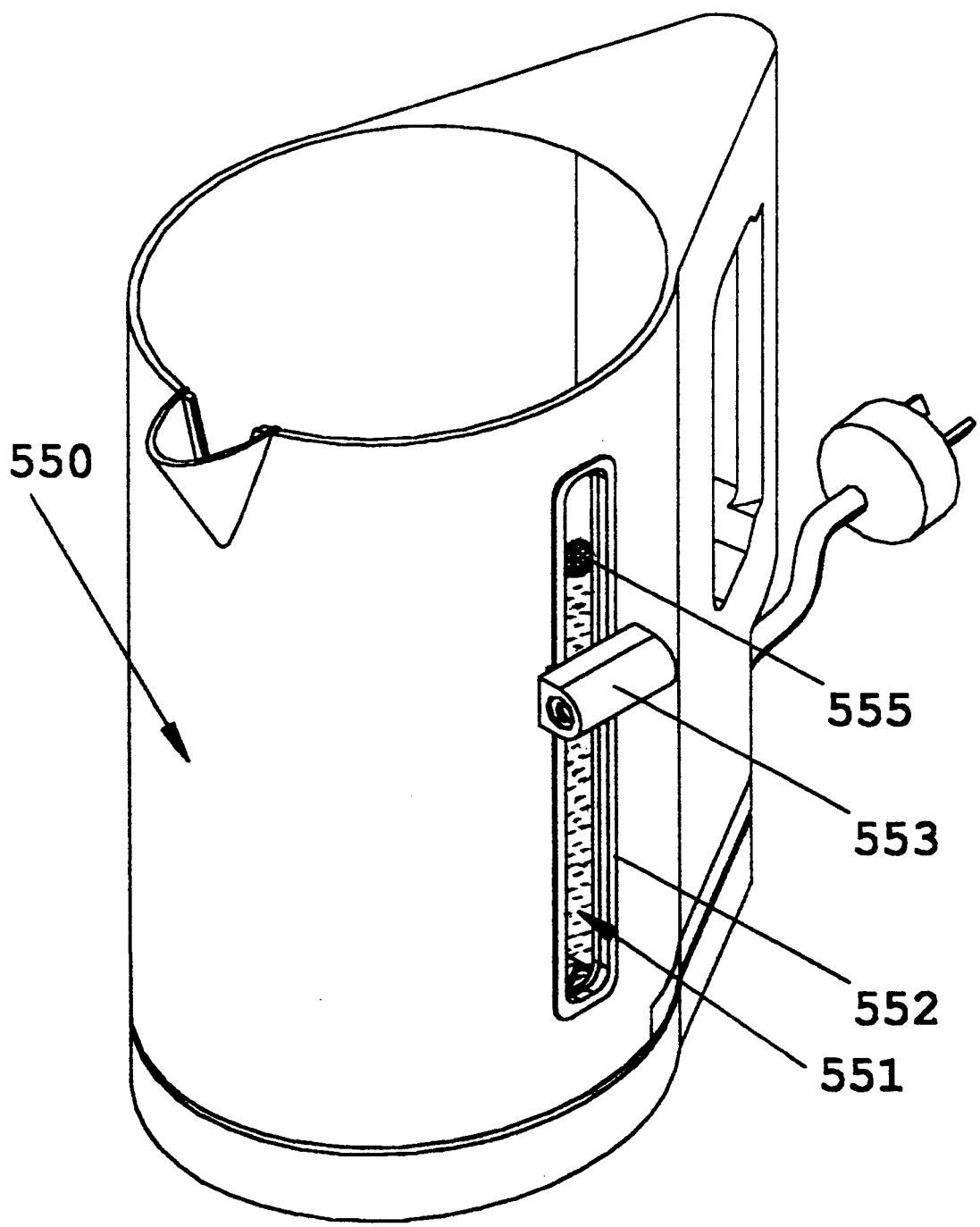
FIG. 36 is a perspective view of a vessel on which an optical apparatus, according to an embodiment of the second aspect of the invention, has been attached.

FIGS. 33 and 34 are vertical cross-sectional views that illustrate another embodiment, similar to the apparatus shown in FIG. 28, except that in the embodiment of FIGS. 33 and 34 the displaceable magnetic switch housing 463', in which magnetic switch 464' is located, is supported by strap 487 and is located inside the vessel in juxtaposition to the sleeve 460. The mechanism for adjustment the level of the magnetic switch 464' is based, in this case, on a rolling mechanism that is controlled by knob 493, seen in FIG. 34. In the embodiment of FIGS. 33 and 34, the battery and the buzzer (not shown) are contained within housing 482', which is provided with outlets 490 and 491. In this embodiment, strap 487 behaves and functions in a similar way to strap 472 of FIG. 27. Strap 487 is rolled within housing 482', while its other end passes through outlet 490 to be attached to the magnetic switch housing 463'. Like strap 472 of FIG. 27, strap 487 also serves as electrical communicator between magnetic switch 464 and other part of the sensing assembly located in housing 482'.

Strap 486 is, functionally, a marking or a visual indicator strip. This strip, which is rolled in housing 482' and passes through outlet 491, runs generally parallel to strap 487. Like strap 487, strap 486 is also controlled by knob 493 in such way that turning knob 493 will cause rolling or unrolling of straps 486 and 487 within housing 482'. However, in contrast to strap 487, where one of its ends runs inside vessel 400, and more precisely within rail 488, for supporting the magnetic switch housing 463', the respective end of strap 486' runs outside the vessel 400. The location of the exposed end 486' of strap 486, which runs in close proximity to the vessel's wall, provides the observer with a visual indication about the location of the usually unseen switch 464', located inside vessel 400. Rail 488, which is integrally connected to support 467', is the member within which strap 487 moves when the magnetic switch housing 463' is displaced to a new selected level. During that displacement, rail 488 constrains the displacement of housing 463' to the vertical direction and keeps that housing in close proximity to the vertical path of the floating magnet.

FIGS. 35A, B and C are side views of part of the floating magnet assembly of FIG. 27, where the sleeve-like member can be pivotally rotated to increase the functional range of the apparatus. FIGS. 35A and B illustrate a screened sleeve 460 containing a float 466 within and at the top of which a permanent magnet 465 is encapsulated. Sleeve 460, which is provided with an axis-rod 477', is connected to hook 467 via tubular member 477, which is the lower part of hook 467, in such that sleeve 460 with its content can be pivotally rotated by axis 477'. FIG. 35C is the same as FIG. 35B except that in sleeve 460 with its content was rotated around pivot 477' by 180°. As can be seen, in FIG. 34B the transition range of the floating magnet within the sleeve is the range 461, which, practically, is one of the operation ranges of the apparatus. However, the corresponding range according to FIG. 35C is the range 461' that enables another operation rage for the apparatus. Thus, the capability of sleeve 460 to be rotated by 180°, provides the apparatus with two operation ranges, presented in FIGS. 35B and 35C as range 461 and 461', respectively, which means broader operation range of the apparatus.

Figure 37:
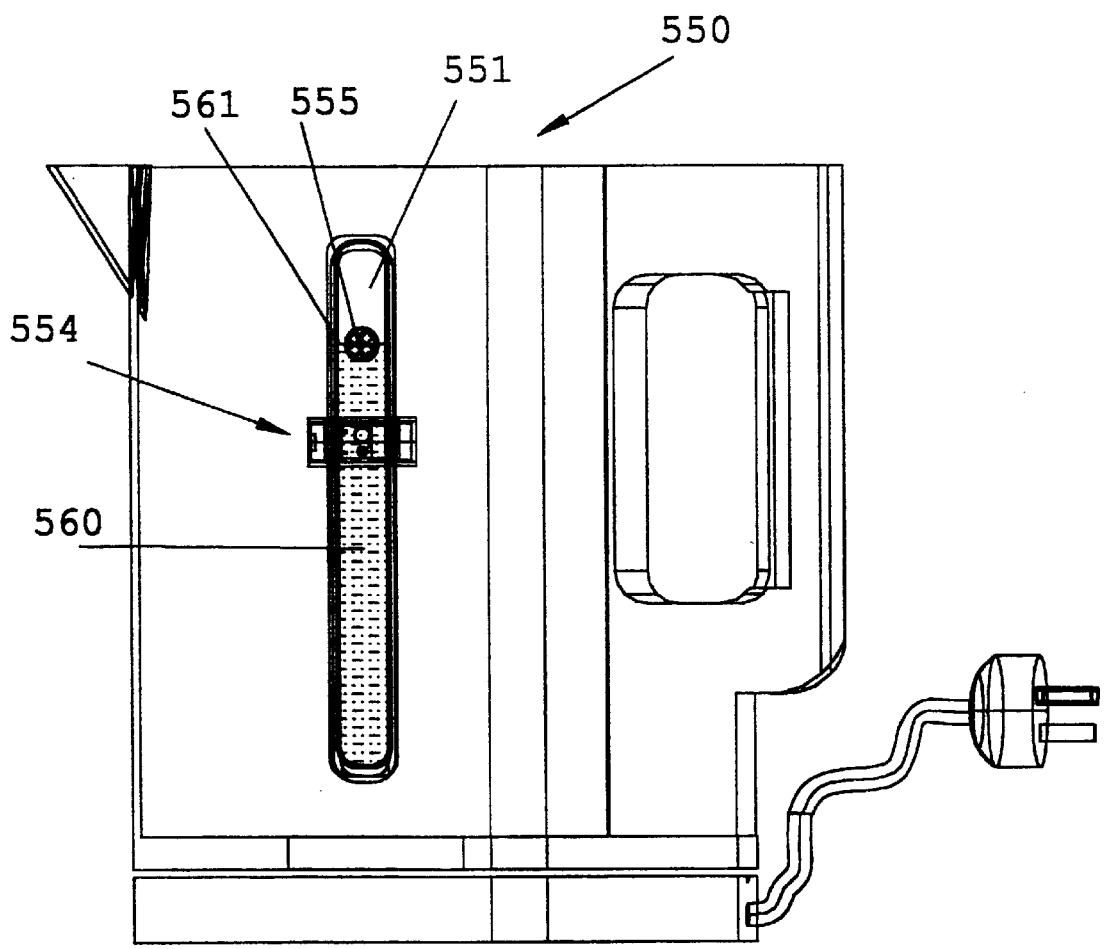
FIG. 37 is a side view of the embodiment of FIG. 36.
Figure 38B:
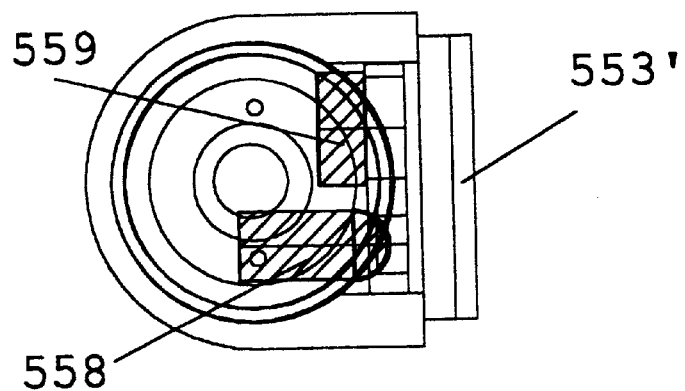
FIGS. 38A, B are, respectively, a horizontal cross-sectional view, at a larger scale, schematically illustrating the sensing assembly of FIG. 37 associated with a liquid container, and an enlarged side view of the sensing assembly.
Figure 38A:
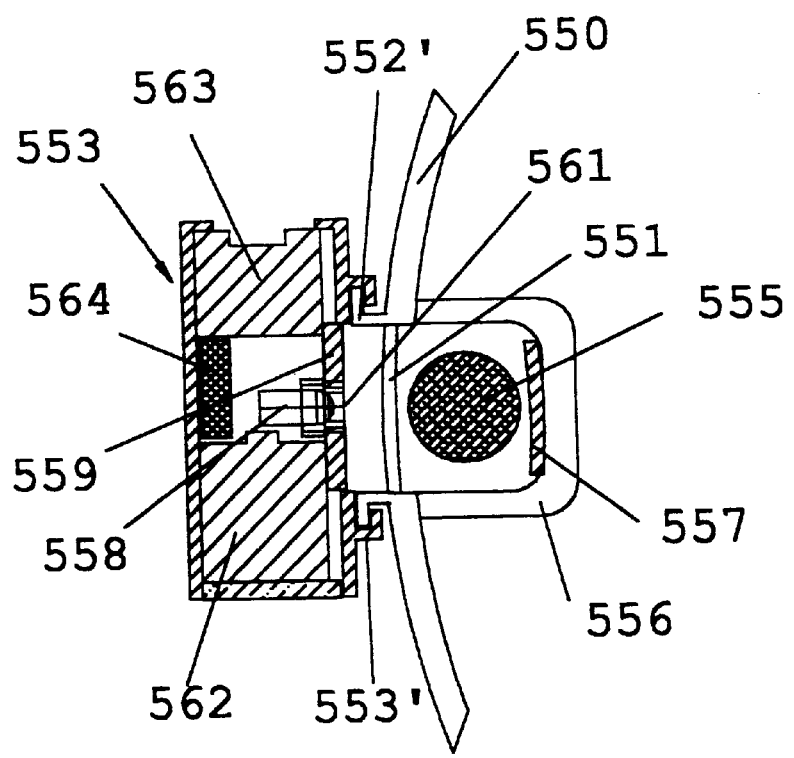
Figure 39:
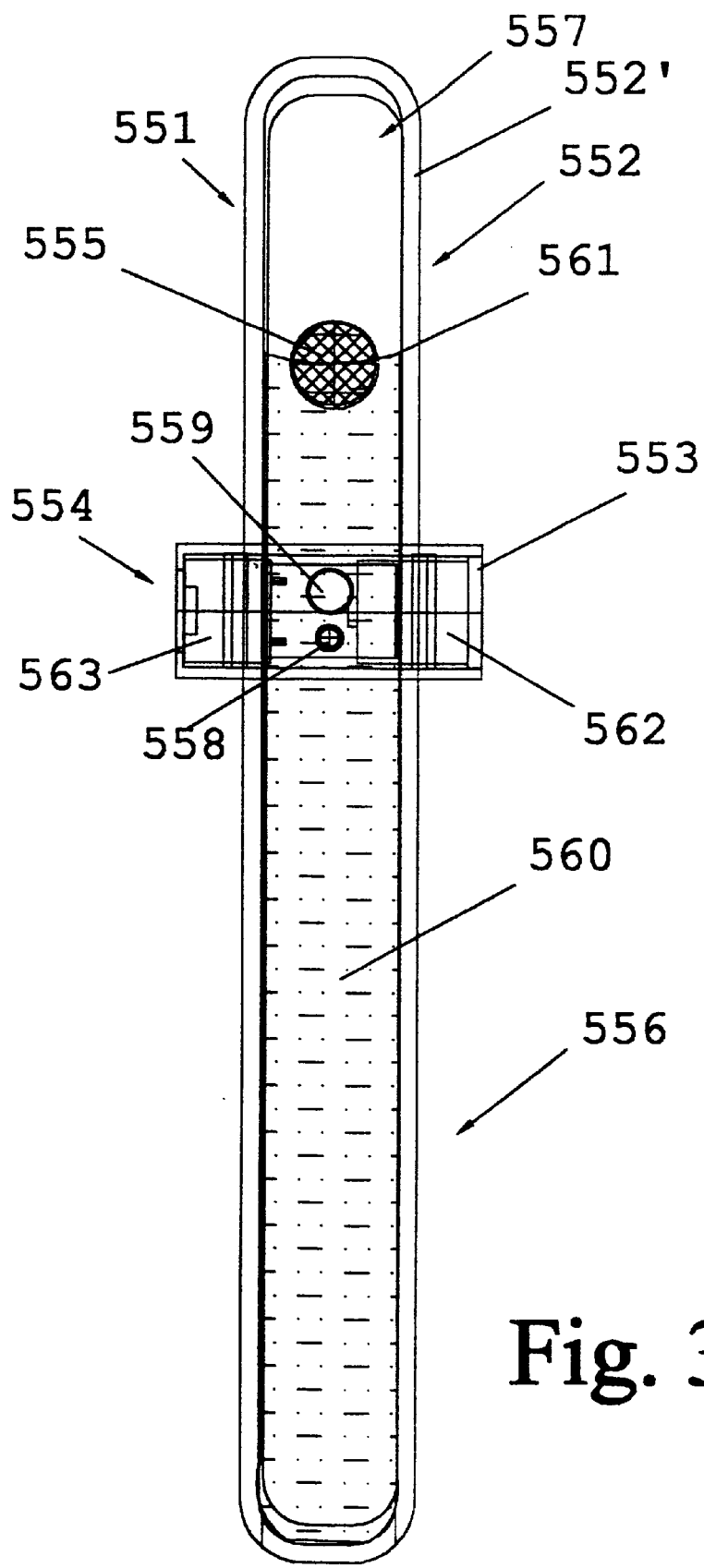
FIG. 39 is a detail of FIG. 37, showing on a larger scale the sensing assembly and cooperating parts.

FIGS. 36 to 39 illustrate an embodiment of optical apparatus according to the second aspect of the present invention. The vessel 550 is a kettle, but can be another type of vessel and have any configuration, contains a liquid 560, assumed to be water, at a level 561. Said kettle is provided with a window 551 that is transparent to radiation in the infrared (hereinafter, briefly, "IR") range, and with a duct 556. The duct 556, which has free liquid communication with vessel 550, is provided with an optical reflector 557, which can be a mirror, attached to the inner wall of said duct, wherein the reflection side of said reflector is faced to the emitter and the detector of the sensing assembly, located outside the duct. Provided in duct 556 is a float 555, shown as being an opaque spherical body, which floats on top of said liquid. The sensing assembly, generally indicated as 554 in FIG. 37 and presented in more details in FIGS. 38 and 39, is located in the sensing assembly housing 553 that is supported by support 552. In this embodiment, support 552, which can be also an integral part of vessel 550, is a frame comprising extended ribs 552' that is attached to the outer wall surface of vessel 550 around the window 551 which is transparent to radiation in the infrared range. Housing 553, which contains the sensing assembly, has a grooved channel 553' which is slidable on said ribs 552' and has such a frictional engagement with them so as to remain at any height at which a user may set it to determine the liquid level at which the apparatus will generate the alarm signal. Of course, other means for retaining the housing 553 at any selected level might be provided by skilled persons. In this embodiment, as detailed in FIGS. 38A, B and in FIG. 39, the sensing assembly housing contains: a LED 558 as an infrared light emitter; an integrated photo-detector 559; a battery 562; a buzzer alarm 563; and an electronic control unit 564. The opening 566 in casing 553 and the window 551, which is transparent to IR radiation, allows optical communication of the emitter 558 and the detector 559, located outside vessel 550, with inner species in duct 556, such as the liquid 560, the float 555 and the mirror 557.

Various optical actuating principles can be applied in such optical embodiments. Thus, for example, in the specific embodiment presented in FIGS. 36 to 39 the actuation is based on a predetermined threshold detected signal and is very similar to those described in FIG. 9A to FIG. 9D. The infrared radiation emitted from LED 558 passes through window 551 to interact with inner species in duct 556, and part of that light is scattered and/or reflected to pass back through window 551 and be detected by the photo-detector 559. The threshold optical value can be defined and determined, for example, as the optical signal which hits photo-detector 559 when the liquid level is above the path of the light emitted from emitter 558 and when no opaque float is present between the emitter 558 or the detector 559 and the inner species in the duct 556. Such a situation is illustrated in FIGS. 37 to 39, where the liquid 551 is at a level 561 and the opaque float 555, which floats on said liquid, is at a level above the optical paths of emitter 558 and photo-detector 559. However, when the liquid level decreases and float 555 get to a position where it is interposed in the path of the light emitted from LED 558, a significant reduction, for example, in the signal sensed by the photo-detector will occur. Such a situation will be identified by the control unit of the sensing assembly as a signal that is out of the threshold optical value, and consequently a buzzer 563 will be activated to generate an alarm.

As stated hereinbefore, many variations are possible in this embodiment of the invention. For example, a separate duct 556, such as shown in FIG. 38A, need not be defined in the vessel or attached to it. It could be missing, and the mirror 557 could be attached to the vessel interior or exterior wall surface, in such a position as to permit reflected radiation to be directed to the photo-detector of the sensing assembly. However, if a float is used to intercept the light between the emitter and the photo-detector, guide means would have to be provided to assure that the float should remain, as it floats, in the appropriate position with respect to the transparent window. The light emitter and the light photo-detector can be of any type, as described in connection with the preceding embodiments. Also, instead of using radiation reflectors, other optical means can be used or involved in the actuation of the apparatus. Among such means are: fluorescent materials, light absorbers and light scattering plates.

In contrast to the embodiment of FIGS. 36 to 39, the present invention also provides apparatus that not rely on a float for their actuation. In such devices, no float is necessary and actuation of the apparatus may occur, for example, as a result of changes in the detected signal in correspondence to change in the level of the liquid mass itself. Thus, for example, FIGS. 40A and B illustrate a modified embodiment that is similar to the embodiment of FIGS. 36 to 39, except that it does not use a float for apparatus actuation. In the embodiment shown in FIG. 40A, the actuation of the apparatus relies on differences in interaction of radiation, preferably electromagnetic radiation, with species related to said liquid, whether the liquid-mass itself, the gaseous phase above said liquid or the meniscus of said liquid.

FIGS. 41A to C illustrate, schematically, the principal operation of an optical apparatus presented in FIG. 40A, wherein the actuation of the displaceable radiation switch, located in housing 553, is based on the detection of reflected and scattered radiation, and wherein the meniscus of the liquid functions as the actuator. Thus, for example, in FIG. 41A the meniscus 561 is highly above the sensing assembly and above the actuation range of optical-switch 559. In that situation the radiation switch is not activated, since the reflected radiation 565 that hits the optical detector of the radiation switch, is within the predetermined threshold range. However, when the liquid level drops and the meniscus of said liquid reaches the path of the emitted radiation 568, as shown in FIG. 41B, as a result of interaction of the emitted 568 with the meniscus 561', the reflected and scattered radiation which hits the detector of the radiation switch is significantly lower than the predetermined threshold value, and consequently the radiation switch of the sensing assembly 554 will be actuated. Now, when the liquid level drops further, to reach the level presented in FIG. 41C, the emitted radiation 568 does not interact with the meniscus 561" and the reflected and scattered radiation that hits the detector is again within the predetermined threshold value.

FIGS. 42A and 42B, present, respectively, a cross-sectional perspective view and a front view of a sensing assembly arrangement that is similar to FIGS. 39 and 40A but with two main modifications: a) the optical emitter, preferably also in the IR range, and the optical switch are located in different housing; b) while, in this modified embodiment as well, the optical switch 579 is displaceable, the optical emitter 578 in FIGS. 42A and B is not displaceable but fixed on top of a duct 576'. As described for the embodiment of FIGS. 36 to 41, the duct 576' is part of a vessel 570 and has free flow communication with that vessel, through opening 575. Housing 574, which is slidable along rib 572' of frame 572 and in front of window 571, houses an optical switch 579, a battery 582 and a buzzer 583. On top of duct 576' is a IR-emitter 578 that directs radiation to the meniscus of the liquid in duct 576'.

Figure 43C:
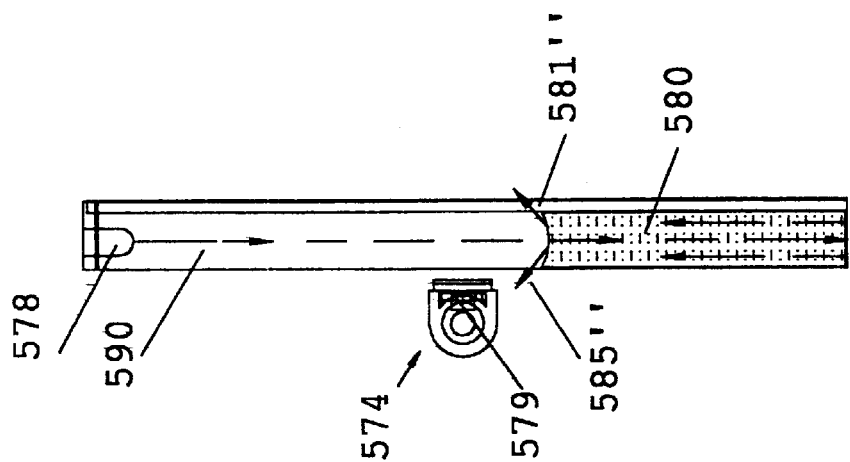
FIGS. 43A, B and C illustrate, schematically, one of the optional operation principal of the embodiment of FIG. 42A.
Figure 43B:
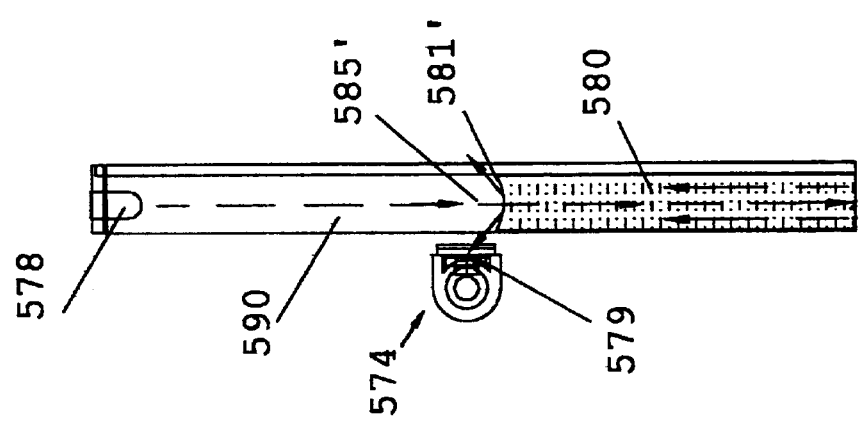
Figure 43A:
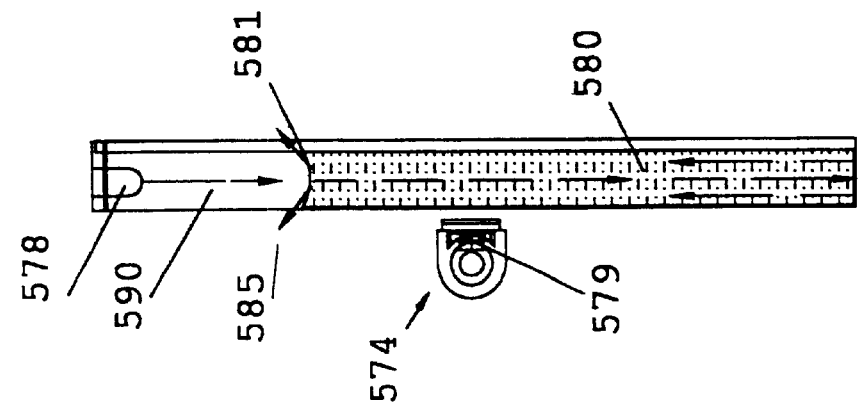

FIGS. 43A, B and C illustrate the principle of the operation of the embodiment of FIG. 42A, where a emitter 578 is fixed on top of duct 576' while housing 574, in which optical switch 579 is housed, is displaceable along ribs 572'. FIG. 43A represents a situation in which the meniscus 561' of the liquid is above the actuation range of optical switch 579. In that situation, only a small part of the reflected and scattered radiation 585, which are produced as a result of interaction of the emitted radiation 590 with the liquid 580, hits the optical switch 579 with an intensity which is in the range of the pre-determined threshold value. However, when the liquid level reduces to a situation where the meniscus of the liquid is close to the level of the detector of switch 579, as shown in FIG. 42B, a higher amount of reflected and scattered radiation 585' hits optical switch 579, with an intensity that is significantly higher then the pre-determined threshold value, and consequently the switch will be activated. FIG. 43C represents the case when the liquid level drops further to a situation where meniscus 581" is lower then the detector of switch 579, so that the reflected and scattered radiation 585" that hits the detector is of lower intensity and is within the predetermined threshold value.

Figure 44A:
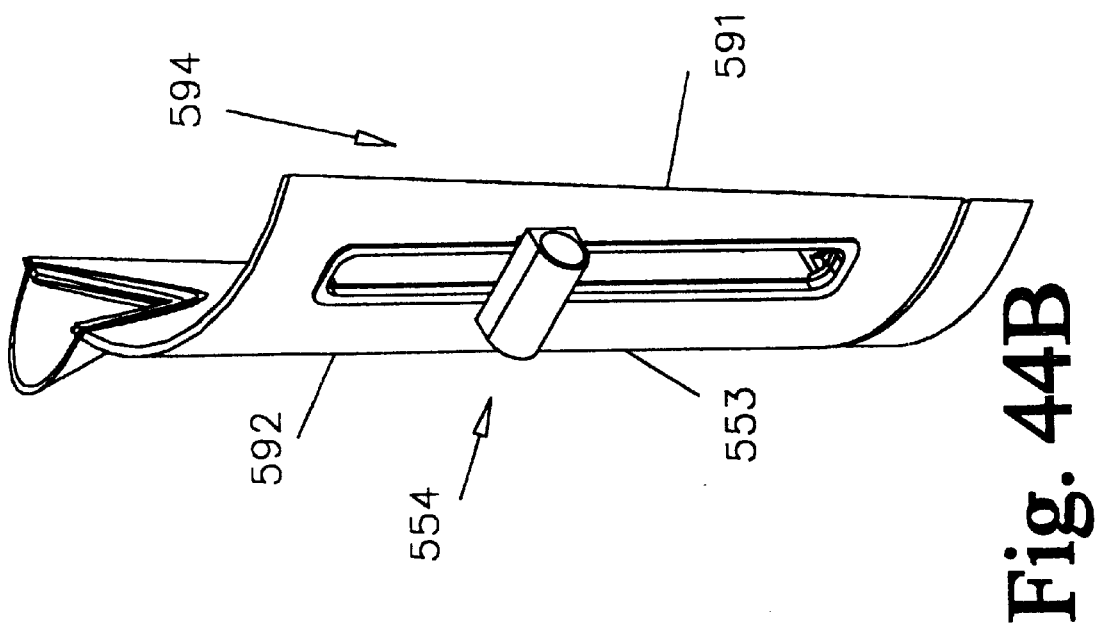
FIGS. 44A and B present in perspective views, respectively, a kit similar to FIGS. 36 an 40A, before and after the sensing assembly and the removable frame are attached to the vessel.
Figure 44B:
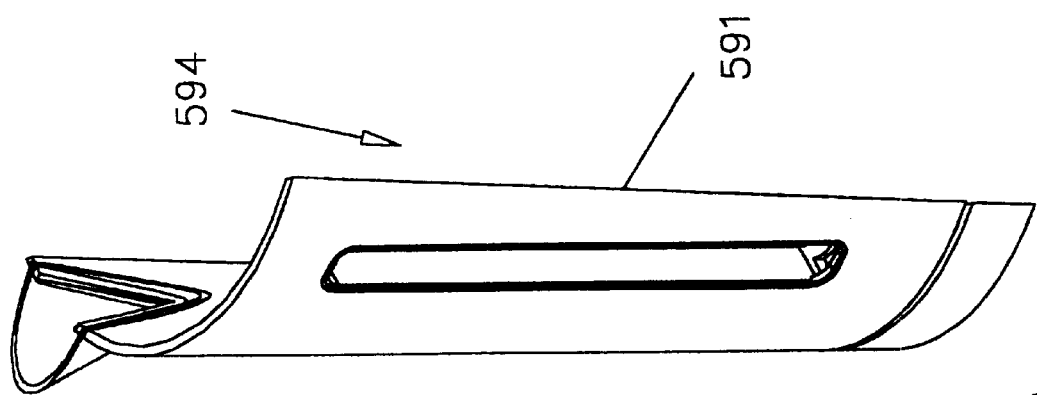

FIGS. 44A and B illustrate in perspective views a set of an apparatus kit similar to that described in FIG. 39 and in FIG. 40A, but with a removable and attachable frame on which the sensing assembly is mounted and can be slidingly displaced. FIG. 44A illustrates the main components of the kit, before this is attached to vessel 594 having a duct, not shown. The kit includes the sensing assembly 554 located within housing 553 and a removable and attachable frame 592 with ribs 592'. FIG. 44B illustrates the kit of FIG. 44A after it was assembled and attached to the front window 591 of vessel 594. The attachment of frame 592 in front of window 591 can be done by various means, such as using VELCRO fastener or some sort of adhesive. It has to be emphasized that suck an apparatus kit is transferable to other vessels and can be easily adaptable to other transparent vessels.

Figure 45:
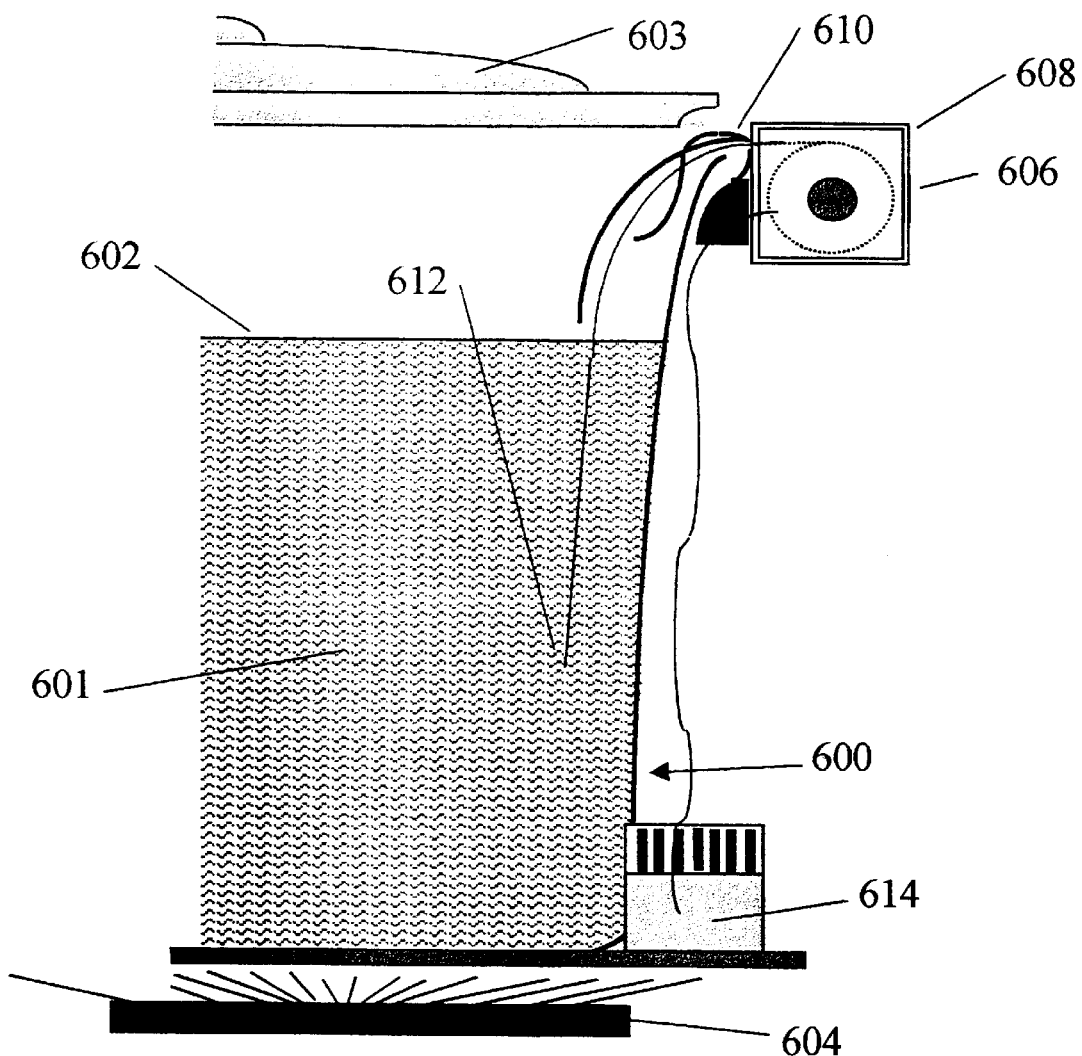
FIG. 45 is a partial vertical cross-section of a cooking pot fitted with an optical apparatus designed according to a third aspect of the present invention.

An embodiment of said third aspect of the invention is illustrated in FIGS. 45 to 48. In FIG. 45, a cooking pot 600, containing a liquid 601 to a level 602, having a lid 603, and which pot is seen herein heated by gas burner 604, is fitted with a liquid level control apparatus 606. Apparatus 606 has a control device 608, mounted on the cooking pot by means of a hook member 610, a sensing probe 612, and a thermo-electric unit 614, which provides electric power generated by the heat emitted by gas burner 604. As can be seen in the enlarged cross-sectional view in FIG. 46, sensing probe 612 contains two optical waveguides, 615 and 616, the distal ends of which, viz. the ends housed in a sensing tip, interact optically with a prism 620 or equivalent optical device.

Figure 47A:
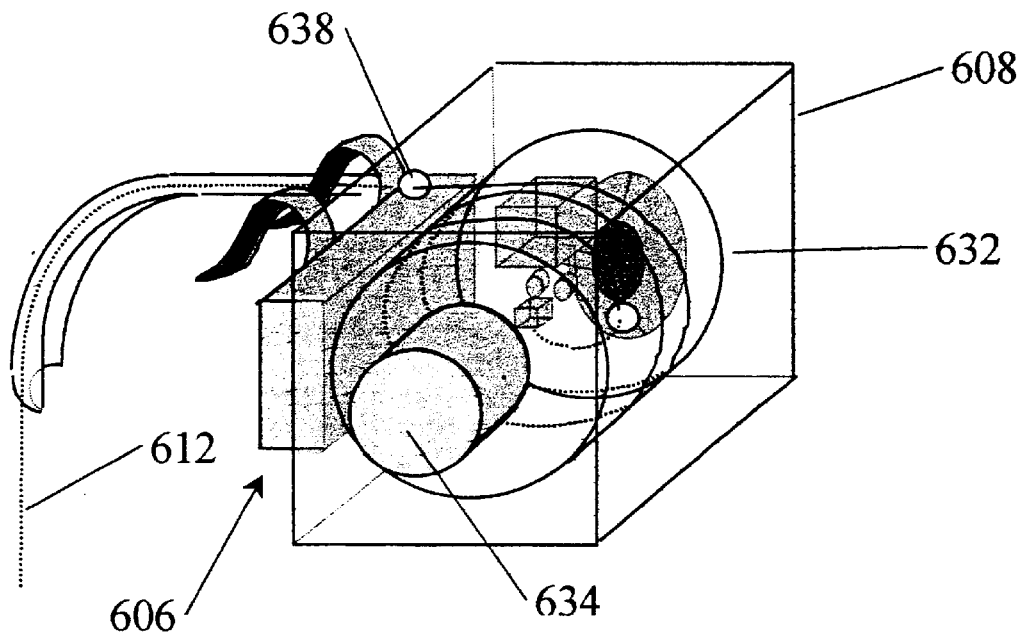
FIGS. 47A and 47B are, respectively, a close-up perspective view and a cross-section of the control unit shown in FIG. 45.
Figure 47B:
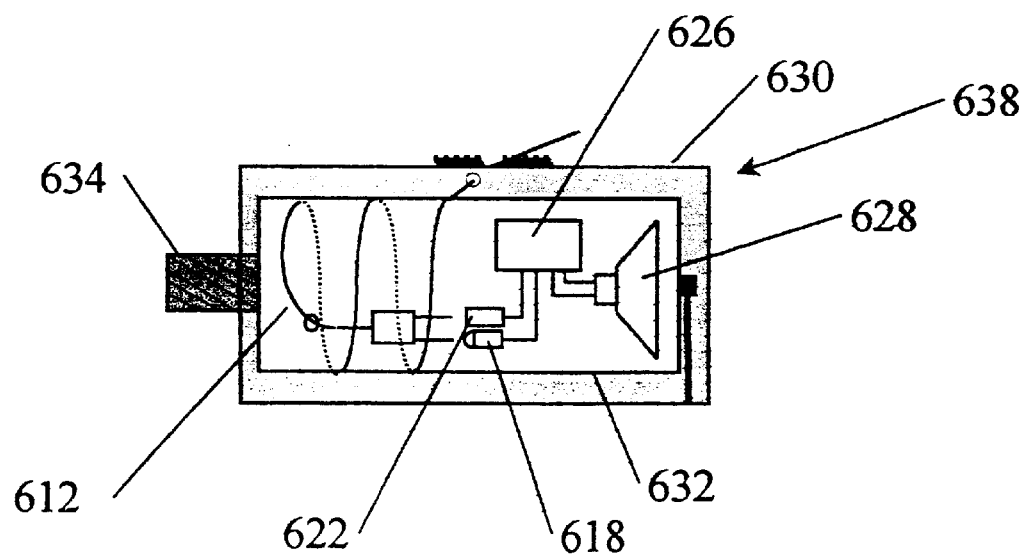

While waveguide 615 leads light emitted from light source 618, shown in FIG. 47B, to prism 620, the other waveguide, 616, leads light back from prism 620 to the photo-detector 622 (see FIG. 47B).

Figure 46:
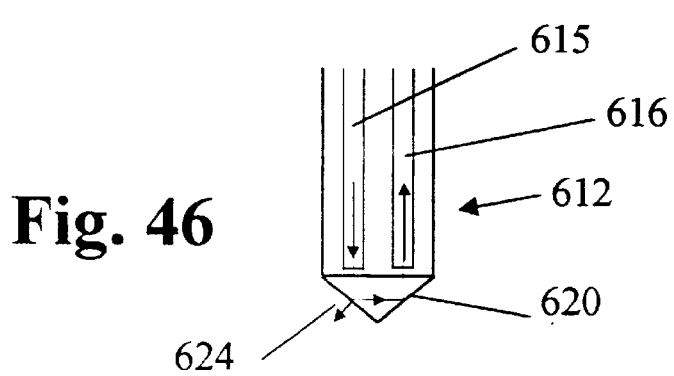
FIG. 46 is a enlarged cross-sectional view of the sensing tip of the apparatus of FIG. 45.

As long as the sensor tip is immersed in liquid, a certain amount of light will be dispersed into the liquid, as represented by arrow 624 in FIG. 46, and once the liquid level goes down below the sensing tip, more light will be reflected through waveguide 616 to the photo-detector 622, and then an alarm signal will be generated.

The structure of the control device 606 can be seen in FIGS. 47A and 47B. It comprises an external housing 630 and an internal cylindrical housing 632, which is rotatable within the external housing. This rotation can be induced by means of control knob 634. The sensing probe 612 is wound or has a proximal segment which is wound onto internal housing 632, and thus, by rotation of knob 634, the probe, comprising the two waveguides and the sensor tip, can be extended or retracted through opening 638 in external housing 630, with a corresponding change in the level of the sensor tip within the liquid, said level being the actuating level. In this embodiment, therefore, the prism or equivalent optical device, together with the waveguides, is the actuator, and the photo-detector is the actuatable member.

As can further be seen in FIG. 46B, in addition to the light source 618, which may be a light-emitting diode (LED) or a laser, and photo-detector 622, the control device further comprises a control processor 626 and an alarm signal generator 628, e.g., an audio signal generator.

Figure 48:
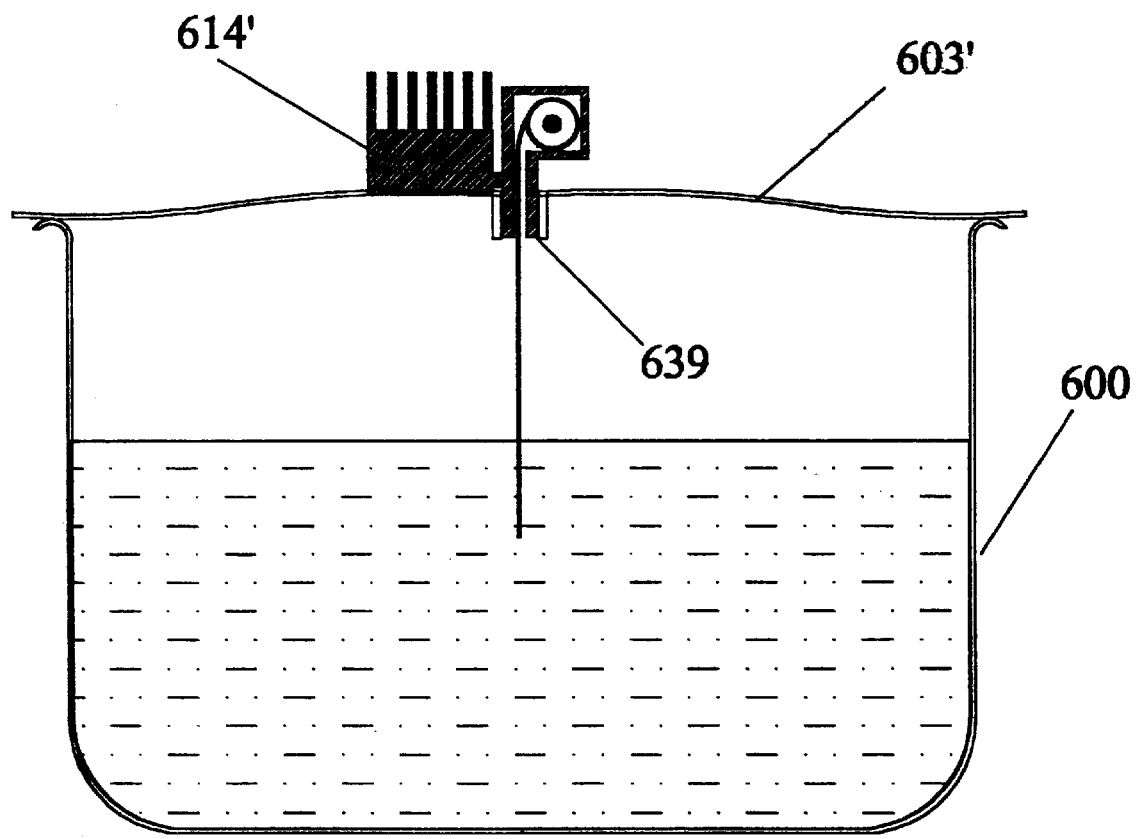
FIG. 48 is a side cross-sectional view of an apparatus, similar to that of FIG. 45, mounted on a lid and conjugated to a thermoelectric generator.

FIG. 48 illustrates the same optical liquid-level apparatus of FIG. 45, except that, in the embodiment of FIG. 48 the apparatus is mounted on a lid 603' of vessel 600. The mounting of the apparatus on lid 603' is done through a passage 639 in lid 603'. In addition, thermoelectric generator 614', as a power supply, is conjugated to the apparatus.

While specific embodiments of the invention have been described for the purpose of illustration, it will be understood that skilled persons may carry the invention into practice with many modifications, variations and adaptations, without exceeding the scope of the claims.

What is claimed is:

1. A liquid level apparatus for monitoring and controlling the liquid level in a liquid containing vessel, said apparatus comprising:
    a floating-rod assembly comprising a rod rigidly conjugated to a float wherein, in operation, said floating rod floatingly moves, in response to changes in the level of said liquid, in such a way that the longitudinal axis of said rod is generally parallel to the vertical direction, and wherein the lower part of said rod is connected to said float while the upper end of said rod is exposed above said liquid;
    at least one displaceable and fixable actuator, mounted on said rod and fixable at a user selected level, wherein said actuator floatingly moves with said floating-rod
    means for displacing said actuator along the longitudinal axis of said rod and fixing it at a selected position on said rod;
    a sensing assembly, comprising: a) at least one actuatable member, wherein said actuatable member can be actuated by said actuator once the level of said liquid reaches a predetermined level, or when said displaceable actuator is positioned within the actuation range of said actuator; b) an indicator; and c) a power supply, wherein said power supply energizes at least part of said sensing assembly; and wherein said sensing assembly, comprising a control unit, issues an output signal once said actuatable member has been actuated by said actuator;
    means for guiding and restraining the transition of said floating rod to the vertical direction;
    a support member, mounted on the rim of said vessel, on which at least part of the components of said apparatus are mounted
    a casing member, housing at least part of the components of said apparatus.

2. Apparatus according to claim 1, wherein said actuator is annular-shaped, slipped on said rod to be positioned coaxial to the longitudinal axis of said rod.

3. Apparatus according to claim 1, wherein the same actuator can cause actuation of said actuatable member at least at two, significantly different, pre-selected levels, to generate, correspondingly, at least two separate output signals.

4. Apparatus according to claim 1, wherein said means for displacing and fixing said displaceable actuator, to hold it at a selected level on said rod, is based on a sliding mechanism.

5. Apparatus according to claim 1, wherein said means for displacing and fixing displaceable actuator at a selected level, comprise means for connecting said actuatable member to a sliding element provided with an arrest member allowing to slide it along said rod and to fix it at a user selected level.

6. Apparatus according to claim 1, wherein said rod is removably attached to said float.

7. Apparatus according to claim 1, wherein said floating rod is extendable.

8. An apparatus according to claim 1, comprising structural features provided in the casing of the sensing assembly and in the vessel lid for mutually and removably connecting them to each other.

9. Apparatus according to claim 1, wherein said float is located inside a filter-like member, wherein said filter-like member has a free flow communication with said liquid while keeping out particles which might disturb the free vertical translation of said float within said filter-like member, for allowing a free vertical translation of said floating rod.

10. Apparatus according to claim 9, wherein said filter-like member includes a net-mesh type screen.

11. Apparatus according to claim 9, wherein said filter-like member is removably attached to other component of the apparatus.

12. Apparatus according to claim 1, wherein at least part, but preferably most, of components of said sensing assembly are located in a single compartment.

13. Apparatus according to claim 1, wherein said support member is a lid and wherein said lid is mounted on the rim of said vessel.

14. Apparatus according to claim 1, wherein said support member is a hook mounted on said vessel.

15. A casing member according claim 1, having means for guiding and restraining the motion of said rod to allow, in operation, a free translation of said rod in a generally vertical direction along the longitudinal axis of said rod.

16. Apparatus according to claim 1, having an appropriate outlet aperture for minimizing liquid-vapor condensation, resulting from said liquid, in some area of the apparatus wherein such vapor might disturb the free translation of the floating rod.

17. Apparatus according to claim 1, wherein the actuation of the actuatable member by the actuator is based on at least one physical property.

18. An apparatus according to claim 17, wherein said physical property is of a magnetic type.

19. Apparatus according to claim 18, wherein at least one of said actuators is a permanent magnet and at least one of said actuatable members is a magnetic switch.

20. An apparatus according to claim 17, wherein said physical property is of an electromagnetic radiation type.

21. Apparatus according to claim 20, comprising at least one radiation source; at least one actuatable radiation switch, wherein said switch comprises a radiation detector; and at least one displaceable actuator, wherein said actuator can actuate said actuatable radiation switch once a signal detected by said switch crosses a predetermined threshold signal.

22. Apparatus according to claim 21, wherein the same displaceable actuator can actuate the corresponding actuatable switch at least at two, significantly different, pre-selected liquid-levels.

23. Apparatus according to claim 21, wherein at least two separate actuators, each separately displaceable along a rod, are mounted on said road at different levels, wherein one of said actuators can cause actuation of said actuatable switch when the liquid level reaches one predetermined level, while the other actuator can cause actuation of the same actuatable switch, when the liquid level reaches another predetermined liquid level, significantly different from the first one.

24. Apparatus according to claim 21, wherein said actuator is a reflector of the actuating radiation.

25. Apparatus according to claim 21, wherein said actuator is a body opaque to the actuating radiation.

26. Apparatus according to claim 21, wherein said radiation source is an electromagnetic radiation source, preferably a LED, and said radiation switch comprises a detector for electromagnetic radiation.

27. Apparatus according to claim 21, wherein said radiation source is an acoustic source, and said radiation switch comprises an acoustic detector.

28. An apparatus according to claim 17, wherein said physical property is of an audio type.

29. Apparatus according to claim 28, comprising at least one radiation source; at least one actuatable radiation switch, wherein said switch comprises a radiation detector; and at least one displaceable actuator, wherein s aid actuator can actuate said actuatable radiation switch once a signal detected by said switch crosses a pre-determined threshold signal.

30. An apparatus according to claim 17, wherein said physical property is of an electrical conductivity type.

31. Apparatus according to claim 21, wherein said actuator is a mechanical actuator and said actuatable member is an electrical switch with electrical conductors, so that once said mechanical actuator touch at least one of said conductor said electrical switch is actuated, causing an output signal generation.

32. An apparatus according to claim 1, wherein a similar backbone of the casing and the floating rod assembly of said apparatus, is compatible with different types of pairs of actuator and actuatable member.

33. Apparatus according to claim 1, wherein components of said apparatus is integrated to form a compact and transferable unit.

34. Apparatus according to claim 1, wherein said apparatus is a kit.

35. Apparatus according to claim 1, wherein said vessel is a heated vessel holding liquid, to be heated.

36. Apparatus according to claim 35, wherein the vessel is a cooking pot or a kettle.

37. Apparatus according to claim 35, having a thermoelectric power supply, with a thermoelectric unit, for powering at least one electric component of said apparatus.

38. Apparatus according to claim 37, wherein said thermoelectric power supply is heated directly by the heating source.

39. Apparatus according to claim 37, wherein said thermoelectric power supply is attached to a hot surface, wherein said surface is heated by heating source.

40. Apparatus according to claim 39, wherein said hot surface is hot walls of said vessel.

41. Apparatus according to claim 39, wherein said hot surface is a lid to said vessel.

42. Apparatus according to claim 1, wherein the liquid is water.

43. Apparatus according to claim 1, wherein said signal activates an alarm.

44. Apparatus according to claim 1, wherein said signal interrupts the action which gives rise to a reduction in the liquid level.

45. A liquid level apparatus for monitoring and control the liquid level in a liquid containing vessel, comprising:
  a floating actuator assembly comprising a floating actuator member accommodated within said vessel or in a liquid duct that is in liquid communication with said vessel, wherein said floating actuator floats on said liquid and is guided to move with the liquid level in a vertical path, proximal to an internal wall of said vessel or said duct; and
  a sensing assembly, located outside of said vessel, comprising; a) at least one displaceable and fixable actuatable switch, wherein said switch is fixable at a user-selected level proximal to the vessel's exterior surface and parallel to said vertical path of said actuator, and wherein said actuatable switch can be actuated by said actuator once the level of said liquid reaches a predetermined level, or once said actuatable switch is positioned within an actuation range of said floating actuator; and b) said sensing assembly, comprising an indicator; a power supply; and a control-unit; wherein said sensing assembly is issuing an output signal once said actuatable member has been actuated by said actuator.

46. Apparatus according to claim 45, wherein the vertical movement of said floating actuator is guided by an elongated sleeve-like member situated proximal to the vessel's interior surface and having free liquid flow communication with said vessel.

47. Apparatus according to claim 46, wherein the sleeve-like member is pivotally suspended from a support member and is rotatable about the suspension pivot point, so that by flipping said sleeve together with said floating actuator, upside down, the operation range of said apparatus is changed.

48. Apparatus according to claim 45, wherein said sleeve is extendible.

49. Apparatus according to claim 45, wherein said sleeve is a filter-like member, keeping out particles present in said vessel from entering inside said sleeve, whenever said particles are such that they may disturb the free vertical translation of said floating actuator.

50. Apparatus according to claim 45, wherein said displaceable actuatable switch is positioned directly onto the exterior wall of said vessel.

51. Apparatus according to claim 45, wherein said displaceable actuatable switch is positioned at a user-selected level by a hook-and-pile type fastening means.

52. Apparatus according to claim 51, wherein said displaceable actuatable switch is connected to a sliding element provided with an arrest member allowing the siding of said actuatable switch along said support member and the fixing thereof at a user selected level.

53. Apparatus according to claim 45, wherein said displaceable actuatable switch is attached to a support member.

54. Apparatus according to claim 53, wherein said support member is extendible.

55. Apparatus according to claim 45, wherein the floating actuator assembly and the sensing assembly are separate assemblies.

56. Apparatus according to claim 55, wherein said strap serves as an electrical communication between said switch and other parts of the sensing assembly.

57. Apparatus according to claim 53, wherein said actuatable switch is supported by a strap, preferably made of elastic stainless steel leaf spring, wherein said strap preferably passes through a control housing and is supported therein, in such a way that it may be paid out of the control housing or withdrawn into it, said strap being connected to said actuatable switch, whereby to adjust the level of said switch at a selected level.

58. Apparatus according to claim 45, wherein said floating actuator assembly and said sensing assembly are integrally connected to one another.

59. Apparatus according to claim 45, wherein the floating actuator device has an external shape and diameter such that it is fitted snugly within the vessel, with the actuator device's external rims in close proximity to the interior surface of said vessel.

60. A liquid level Apparatus according to claim 59, wherein said vessel is cylindrical and said floating actuator has an annular shape.

61. Apparatus according to claim 60, wherein said floating actuator is disposed in a vertical tube which is located outside said vessel and which is in liquid flow communication with said vessel.

62. Apparatus according to claim 59, wherein said floating actuator is disposed in a vertical tube which is located outside said vessel and which is in liquid flow communication with said vessel.

63. Apparatus according to claim 45, wherein said floating actuator is a floating permanent magnet and said actuatable switch is a magnetic switch.

64. Apparatus according to claim 45, wherein the physical property that controls the actuation of the actuatable switch by the actuator is of electromagnetic radiation type.

65. Apparatus according to claim 64, wherein said vessel is transparent to said electromagnetic radiation, or provided with a window or with a duct that is transparent to said radiation, and wherein said duct has free flow communication with said vessel, said apparatus being provided with a sensing assembly having: at least one radiation-emitter; and at least one displaceable radiation-switch, wherein said switch comprises a radiation detector and wherein the locations of said emitter and said detector are such that allow their communication with species located inside said vessel or said duct, and wherein said species can be: said floating actuator: the liquid mass itself; the gaseous phase above said liquid; the meniscus of said liquid; the wall of said vessel or said duct, radiation reflector; flourescent body; or a like; wherein said emitter emits radiation that interacts with at least one of said species, and said detector can detect radiation generated as a result of that interaction, and wherein said actuator can actuate said switch once a radiation, detected by said detector, crosses a predetermined threshold signal.

66. Apparatus according to claim 45, wherein said vessel is transparent to said electromagnetic radiation, or provided with a window or with a duct that is transparent to said radiation, and wherein said duct has free flow communication with said vessel, said apparatus being provided with a sensing assembly having: at least one radiation-emitter; and at least one displaceable radiation-switch, wherein said switch comprises a radiation detector and wherein the locations of said emitter and said detector are such that allow their communication with species located inside said vessel or said duct, and wherein said species can be: said floating actuator: the liquid mass itself, the gaseous phase above said liquid; the meniscus of said liquid; the wall of said vessel or said duct, radiation reflector; fluorescent body; or a like; wherein said emitter emits radiation that interacts with at least one of said species, and said detector can detects radiation generated as a result of that interaction, and wherein said actuator can actuate said switch once a radiation, detected by said detector, crosses a predetermined threshold signal.

67. Apparatus according to claim 66, a housing of said displaceable switch is supported by a support member, wherein said support member is attached in front of said window to allow optical communication of said switch with said species, and wherein said support member is an integral part of said vessel or said duct.

68. Apparatus according to claim 67, wherein said support member is not an integral part of said vessel or said duct, but is removably attached to said vessel or said duct, by a fastener or a hook.

69. Apparatus according to claim 67, wherein said support member is a frame.

70. Apparatus for monitoring and control the liquid level in a vessel, wherein said vessel is transparent to electromagnetic radiation, or provided with a window or with a duct that is transparent to said radiation, wherein said duct has free flow communication with said vessel, said apparatus comprising:

a sensing assembly, located outside said vessel or said duct, comprising; a) at least one emitter of electromagnetic radiation; and b) at least one displaceable radiation switch having a radiation detector; wherein the locations of said emitter and the detector of said switch are such that allow their communication with species located inside said vessel or said duct, and wherein said species can be: the liquid mass itself; the gaseous phase above said liquid; the meniscus of said liquid; the wall of said vessel or said duct, radiation reflector; fluorescent body; or a like; wherein said emitter emits radiation that interacts with at least one of said species, and said detector can detects radiation generated as a result of that interaction, and wherein said switch is actuated once a radiation, detected by said detector, crosses a predetermined threshold signal; and c) said sensing assembly comprising a control unit for controlling operation of said apparatus;

a power supply;

an alarm generator;

a housing for said displaceable switch;

a support for said housing permitting vertical displacement of the displaceable switch, whereby to set it at a the pre-selected liquid level at which the apparatus will be actuated.

said alarm generator and said power supply being part of said sensing assembly and housed in the housing of said switch.

71. Apparatus according to claim 70, wherein an interaction of said emitted radiation with the meniscus of said liquid results in radiation phenomena, such that the detected signal crosses said predetermined threshold signal, to actuate said switch, wherein said radiation phenomena can be scattering, reflection, or a like, and wherein when said emitted radiation interacts mainly with species located above or under said meniscus, being it the liquid mass itself or the gaseous phase above said liquid, the detected signal is within said pre-determined threshold signal and no actuation occurs.

72. Apparatus according to claim 70, wherein said emitter is housed within the same housing of said displaceable switch, for parallel, concurrent and equal displacement with said displaceable switch.

73. Apparatus according to claim 70, wherein said emitter is not housed with said displaceable switch, but it is displaced parallel, concurrently and of equal displacement with said displaceable switch.

74. Apparatus according to claim 70, wherein said switch is positioned at the same side of said transparent window, preferably, conjugated to each other.

75. Apparatus according to claim 70, wherein said switch and said emitter, each is positioned on a different side of said vessel or said duct.

76. Apparatus for monitoring and control the liquid level in a vessel containing liquid, comprising;

At least one displaceable and flexible sensing probe comprising a sensing tip located inside said vessel, for sensing a physical property related to said liquid, and at least one communicator, wherein said communicator communicates between said sensing tip and a control unit, and wherein said communication is based on said physical property;

a control unit device, communicated with said sensing tip by said communicator, for issuing an output signal when the level of said liquid reaches pre-selected level or when the sensing tip senses a signal which crosses a threshold signal; and a housing of said control device comprising also a power supply and an alarm.

a rotatable sensing tip displacement unit comprising a rotatable support for said sensing probe and means for rotating said support to pay out or withdraw said flexible sensing probe, whereby to position said sensing tip at a selected level in said vessel.

77. Apparatus according to claim 76, wherein said physical property is of electromagnetic radiation type and wherein said communicators are optical fiber waveguides.

78. Apparatus according to claim 77, wherein the rotatable support for the sensing probe is also a rotatable support for the waveguides, whereby the paying out or withdrawal of the probe is achieved by winding or unwinding the waveguides about the axis of said rotatable support.

79. Apparatus according to claim 77, comprising an electromagnetic emitting source and a detector for electromagnetic radiation, and wherein the sensing probe comprises a first optical waveguide connected to said emitter, a second optical waveguide connected to said detector, and a sensing tip housing means for guiding the radiation issuing from said first waveguide into said second waveguide.

80. Apparatus according to claim 76, wherein said physical property is electric conductivity.

\* \* \* \* \*

UNITED STATES PATENT AND TRADEMARK OFFICE
CERTIFICATE OF CORRECTION

PATENT NO. : 6,218,949 B1
DATED : April 17, 2001
INVENTOR(S) : David Issachar

It is certified that error appears in the above-identified patent and that said Letters Patent is hereby corrected as shown below:

Claim 23,
Line 3, change "road" to -- rod --.

Claim 56,
Line 1, change "55" to -- 57 --.

Claim 67,
Line 1, after "66," insert -- wherein --.

Claim 70,
Line 30, delete "the".

Claim 76,
Line 16, delete ",".

Signed and Sealed this

Fifteenth Day of January, 2002

Attest:

JAMES E. ROGAN
*Director of the United States Patent and Trademark Office*

*Attesting Officer*